United States Patent [19]

Yoshida et al.

[11] Patent Number: 5,031,179
[45] Date of Patent: Jul. 9, 1991

[54] DATA COMMUNICATION APPARATUS

[75] Inventors: Takehiro Yoshida; Susumu Matsuzaki, both of Tokyo, Japan

[73] Assignee: Canon Kabushiki Kaisha, Tokyo, Japan

[21] Appl. No.: 267,541

[22] Filed: Nov. 4, 1988

[30] Foreign Application Priority Data

| Nov. 10, 1987 | [JP] | Japan | 62-282029 |
| Nov. 10, 1987 | [JP] | Japan | 62-282032 |
| Nov. 13, 1987 | [JP] | Japan | 62-285597 |
| Nov. 24, 1987 | [JP] | Japan | 62-296445 |
| Nov. 28, 1987 | [JP] | Japan | 62-301016 |
| Nov. 28, 1987 | [JP] | Japan | 62-301017 |
| Nov. 28, 1987 | [JP] | Japan | 62-301018 |

[51] Int. Cl.$^5$ .................................... G06F 11/00
[52] U.S. Cl. ............................ 371/32; 371/5.5; 371/29.1
[58] Field of Search .............. 371/32, 5.1, 5.3, 5.5, 371/29.1

[56] References Cited

U.S. PATENT DOCUMENTS

| 3,534,264 | 10/1970 | Blasbalg et al. | 371/5.5 |
| 4,110,558 | 8/1978 | Kageyama et al. | 371/5.5 |
| 4,332,029 | 5/1982 | Campbell et al. | 371/5.5 |
| 4,390,947 | 6/1983 | DeShon | 371/32 |
| 4,514,847 | 4/1985 | Tateishi et al. | 371/40.2 |
| 4,589,111 | 5/1986 | Adachi | 371/32 |
| 4,628,511 | 12/1986 | Stitzlein et al. | 371/29.1 |
| 4,713,810 | 12/1987 | Chum | 371/5.1 |
| 4,729,033 | 3/1988 | Yoshida | 358/435 |
| 4,736,388 | 4/1988 | Eguchi | 371/5.5 |
| 4,815,121 | 3/1989 | Yoshida | 379/67 |
| 4,829,524 | 5/1989 | Yoshida | 371/32 |

Primary Examiner—Charles E. Atkinson
Attorney, Agent, or Firm—Fitzpatrick, Cella, Harper & Scinto

[57] ABSTRACT

A data communication apparatus having an error retransmission mode allows the operator to ascertain an amount of error data when an error is contained in data and when the error is not corrected despite retransmission of the error a predetermined number of times, or makes it possible to reproduce data with respect to correctly received data by discriminating correct data contained in error data, thereby preventing error data from becoming wasted as practically as possible. In addition, at the time of error retransmission, a transmission mode for retransmitting the error data is changed so as to minimize the number of incidents of error retransmission, thereby to enable efficient data transmission.

26 Claims, 50 Drawing Sheets

FIG. 1(3) (PART 1)
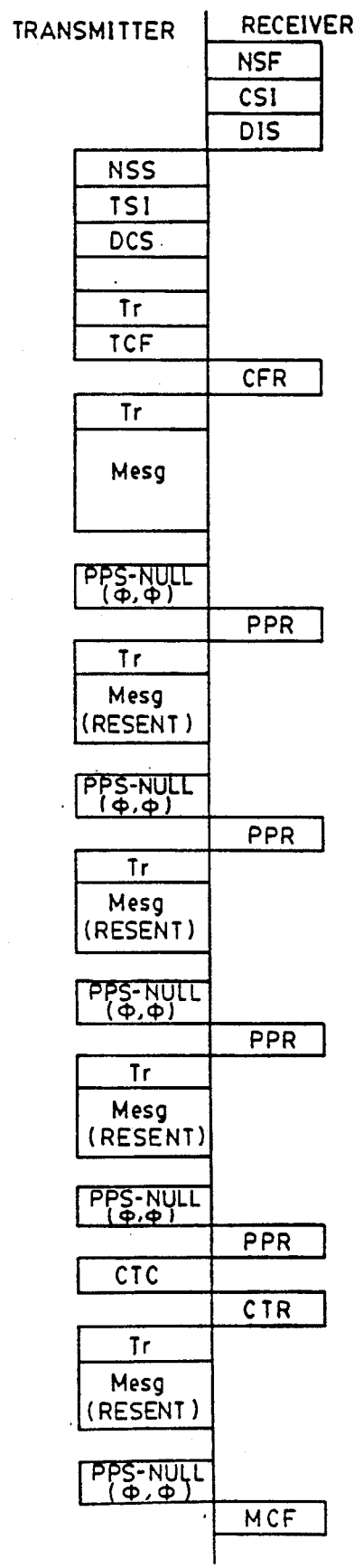
FIG. 1(3) (PART 2)
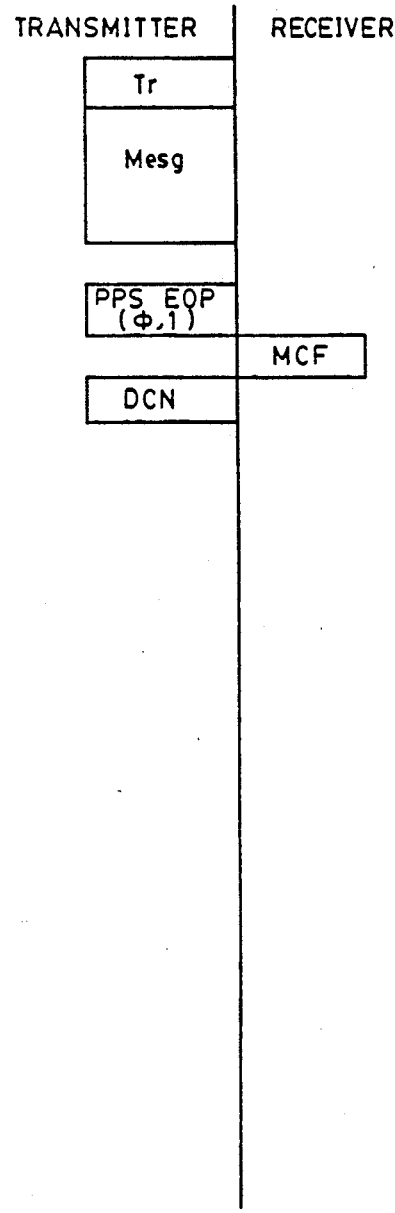

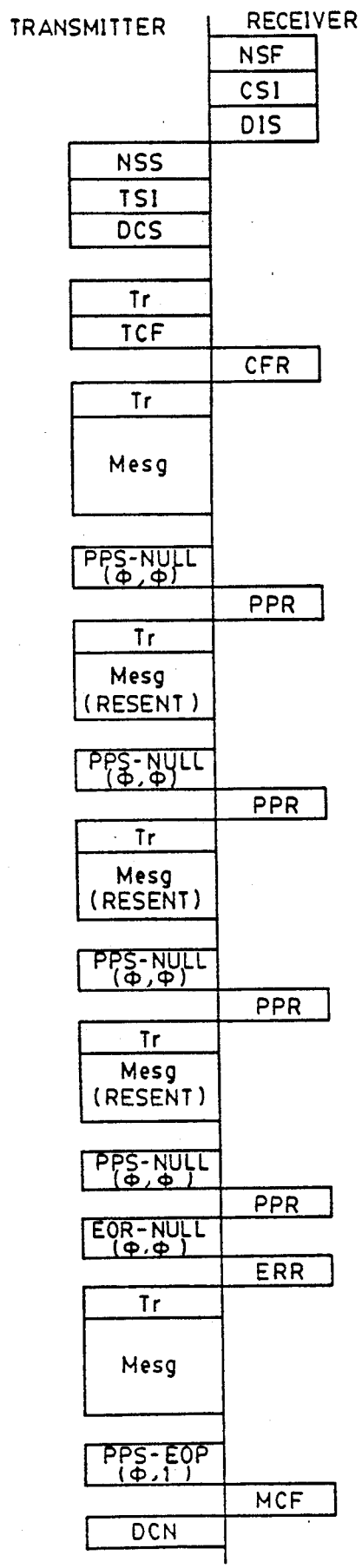
FIG. 1 (4)

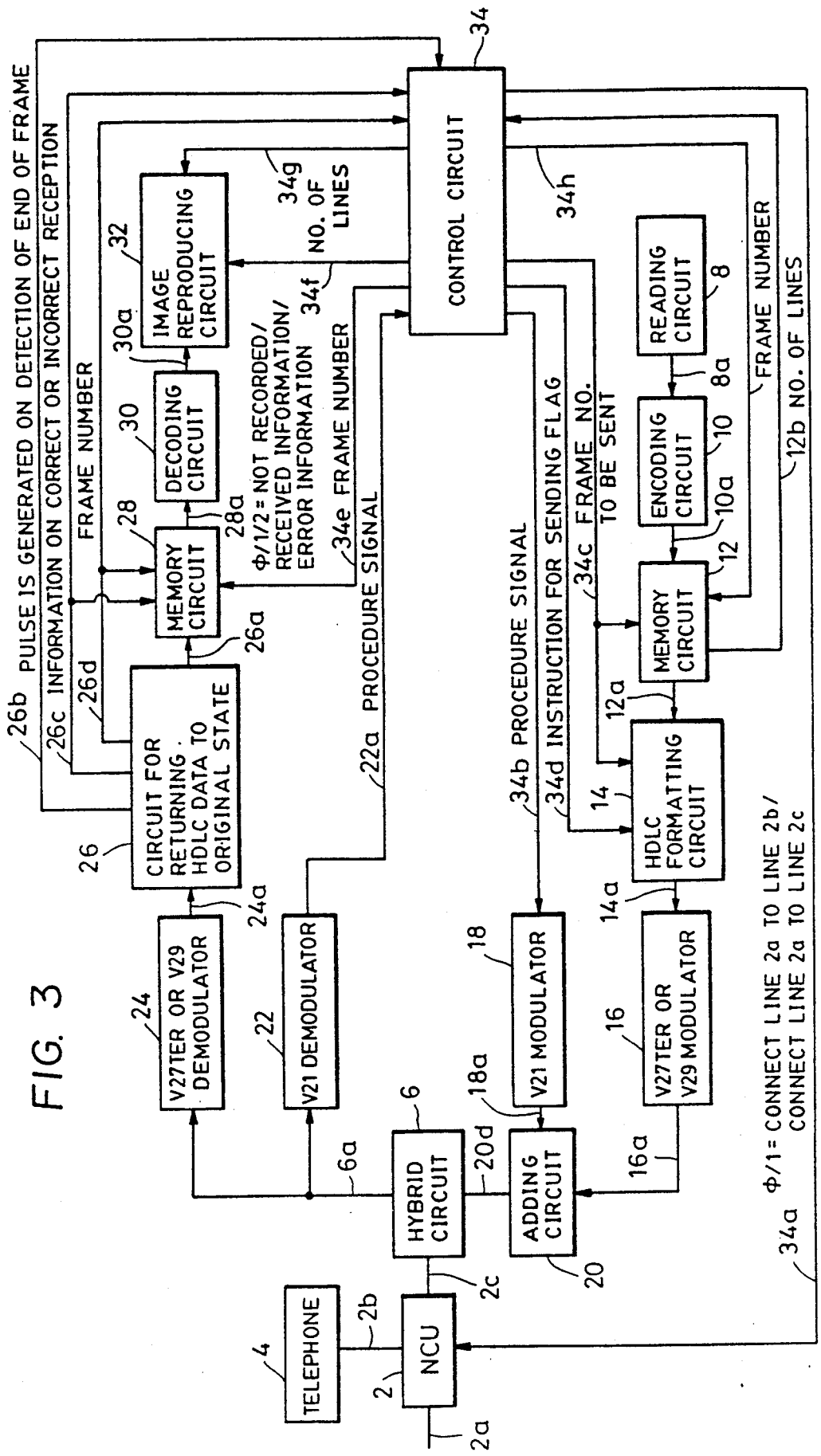

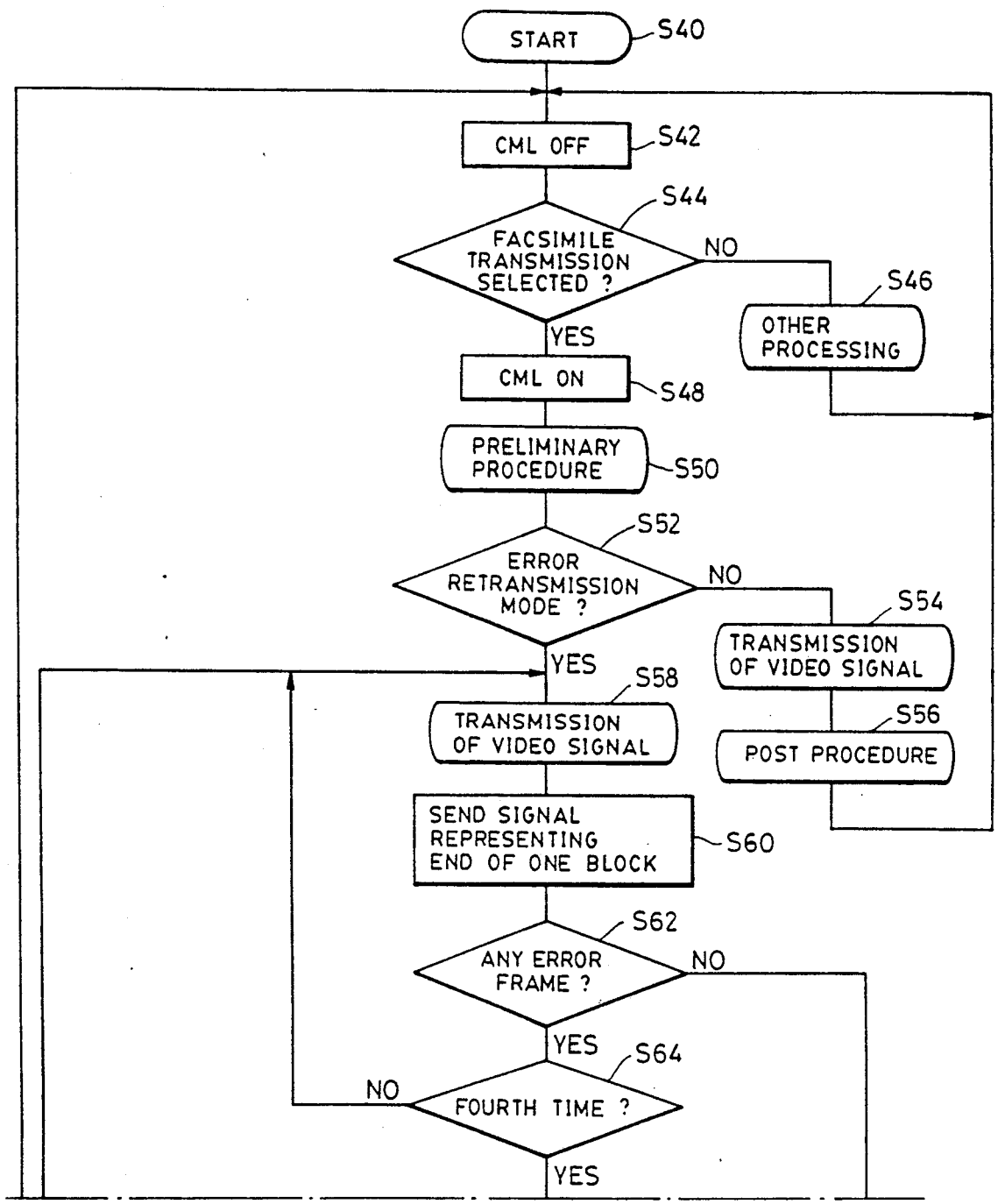

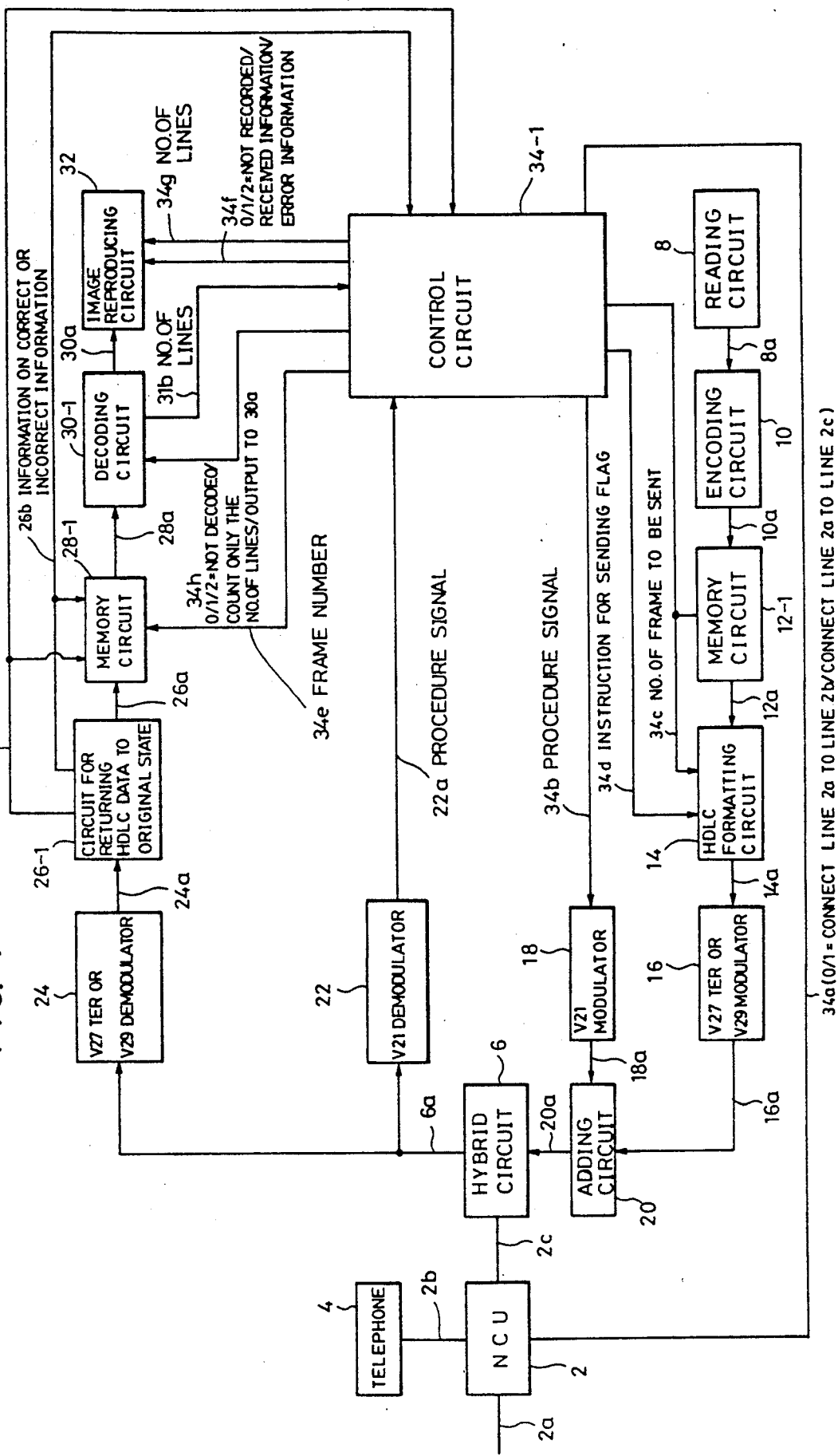

FIG. 5(A)

- START — S90
- CML OFF — S92
- S94 FACSIMILE RECEPTION SELECTED?
  - NO → OTHER PROCESSING — S96
  - YES
- CML ON — S98
- PRELIMINARY PROCEDURE — S100
- S102 ERROR RETRANSMISSION MODE?
  - NO → RECEPTION OF VIDEO SIGNAL — S104 → POST PROCEDURE — S106
  - YES
- RECEPTION OF VIDEO SIGNAL — S108
- S110 ANY FRAME ERROR?
  - YES
  - NO

FIG. 5

| FIG. 5(A) |
| FIG. 5(B) |

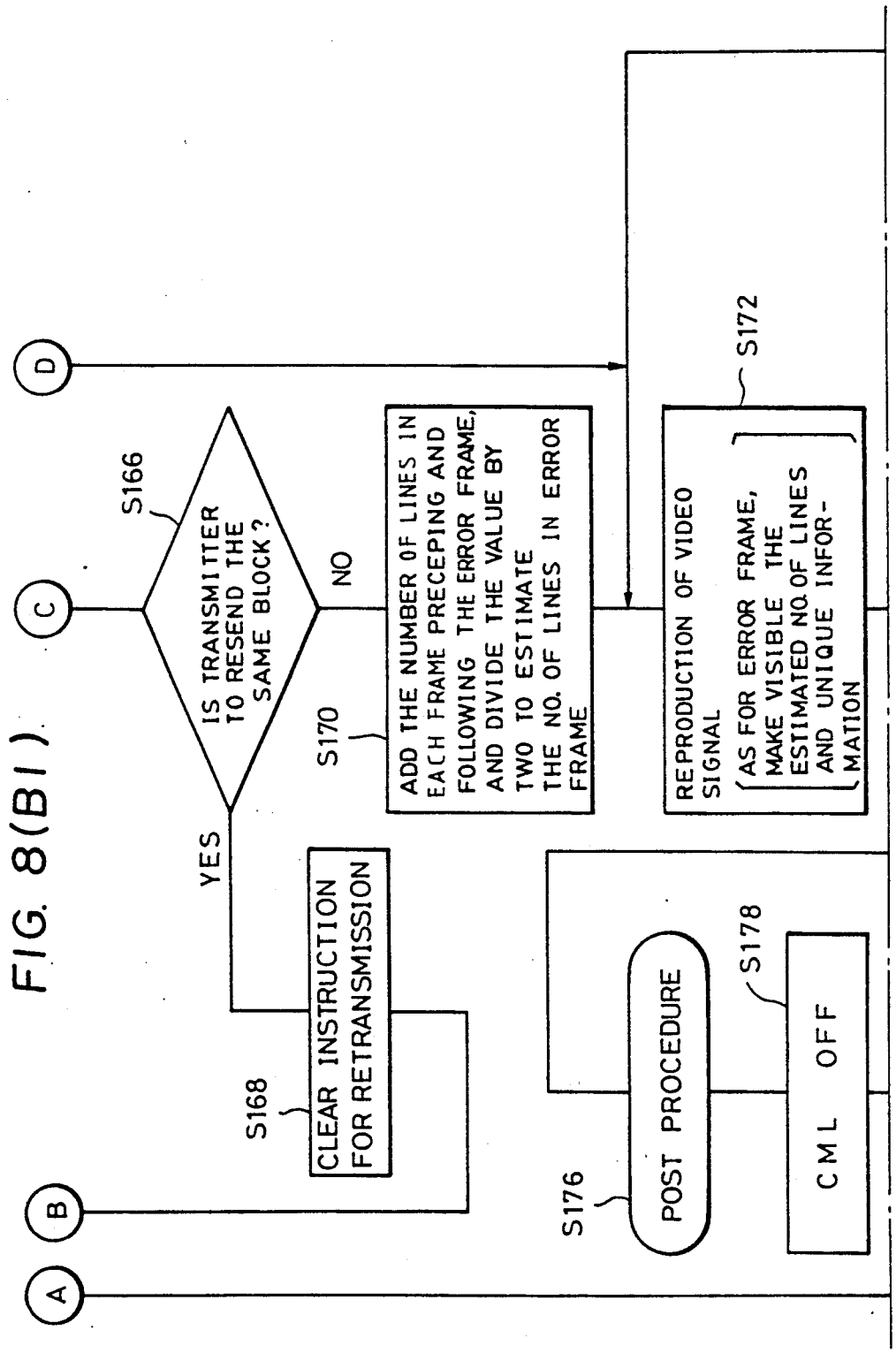

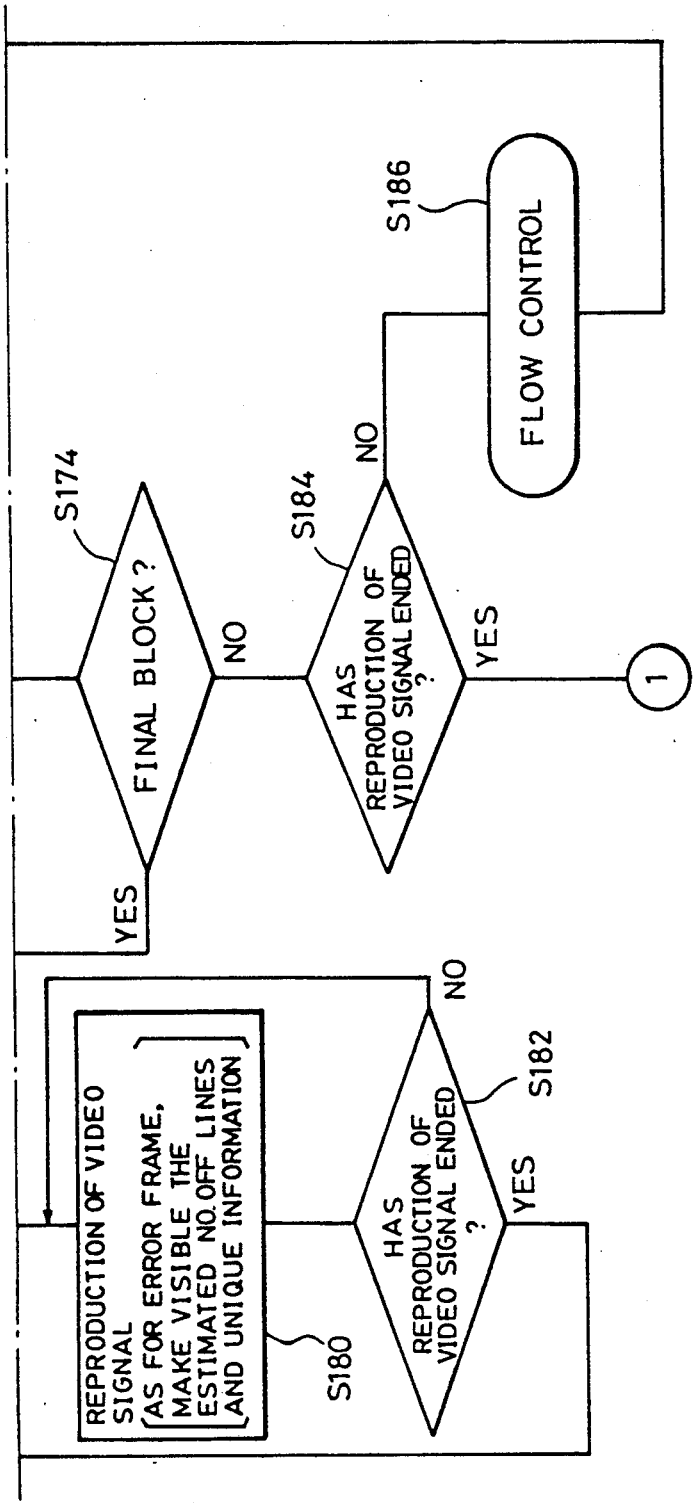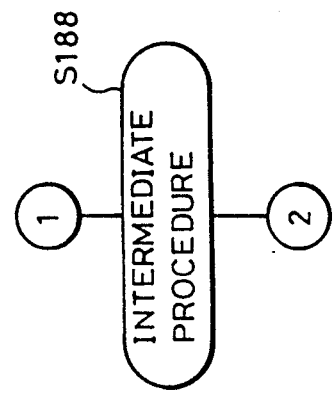

| FIG. 10(A) | FIG. 10(B) |

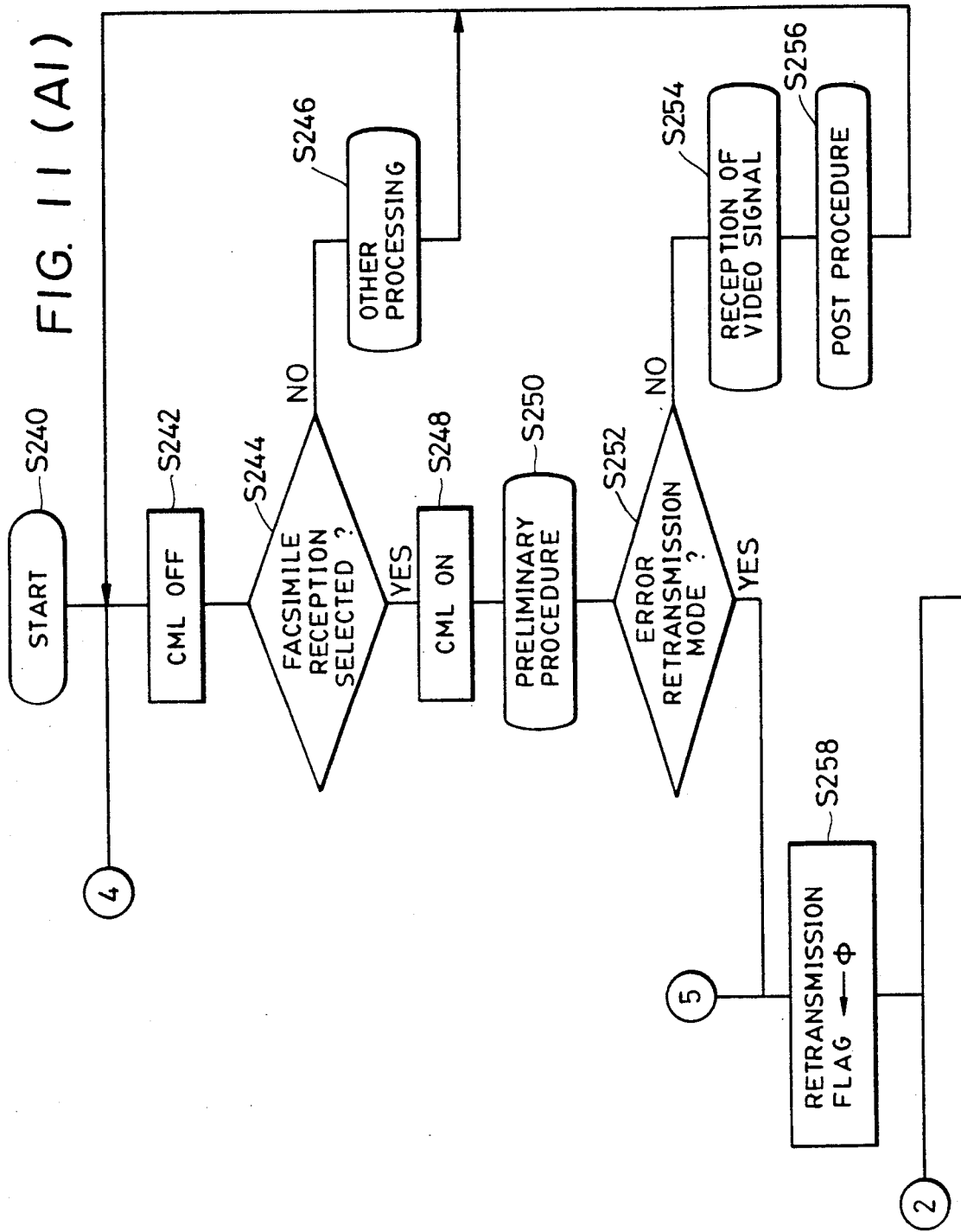
FIG. 11 (A1)

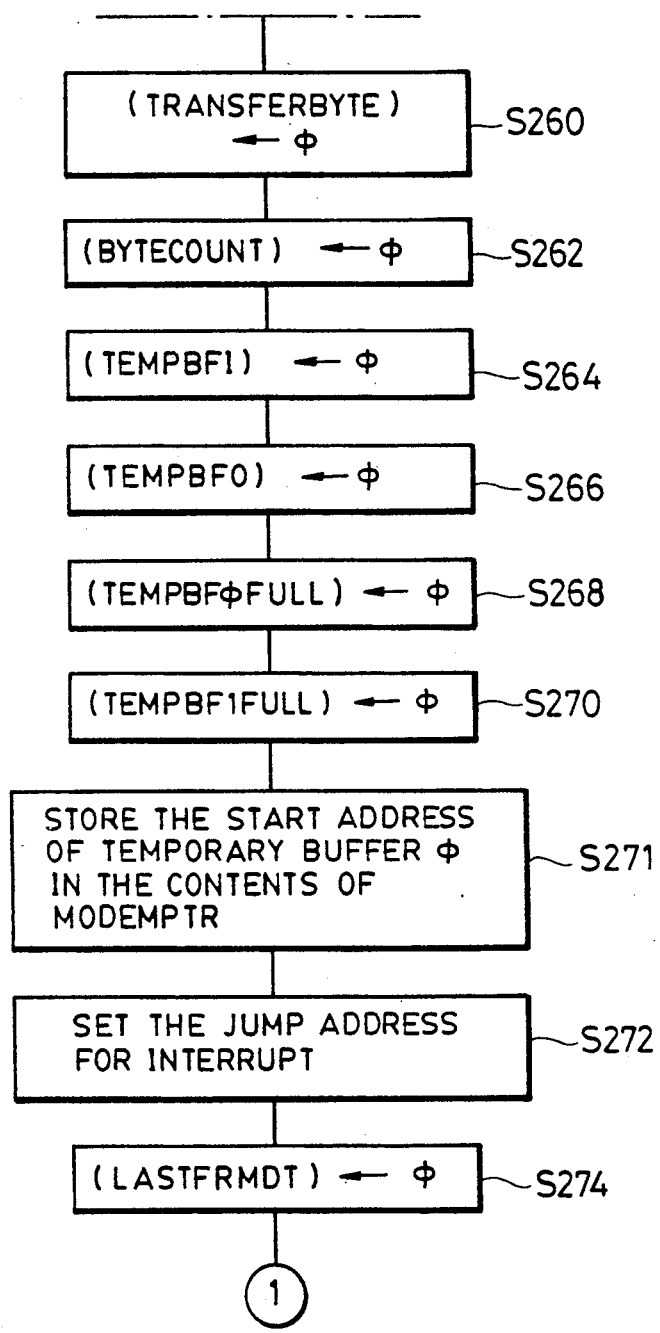

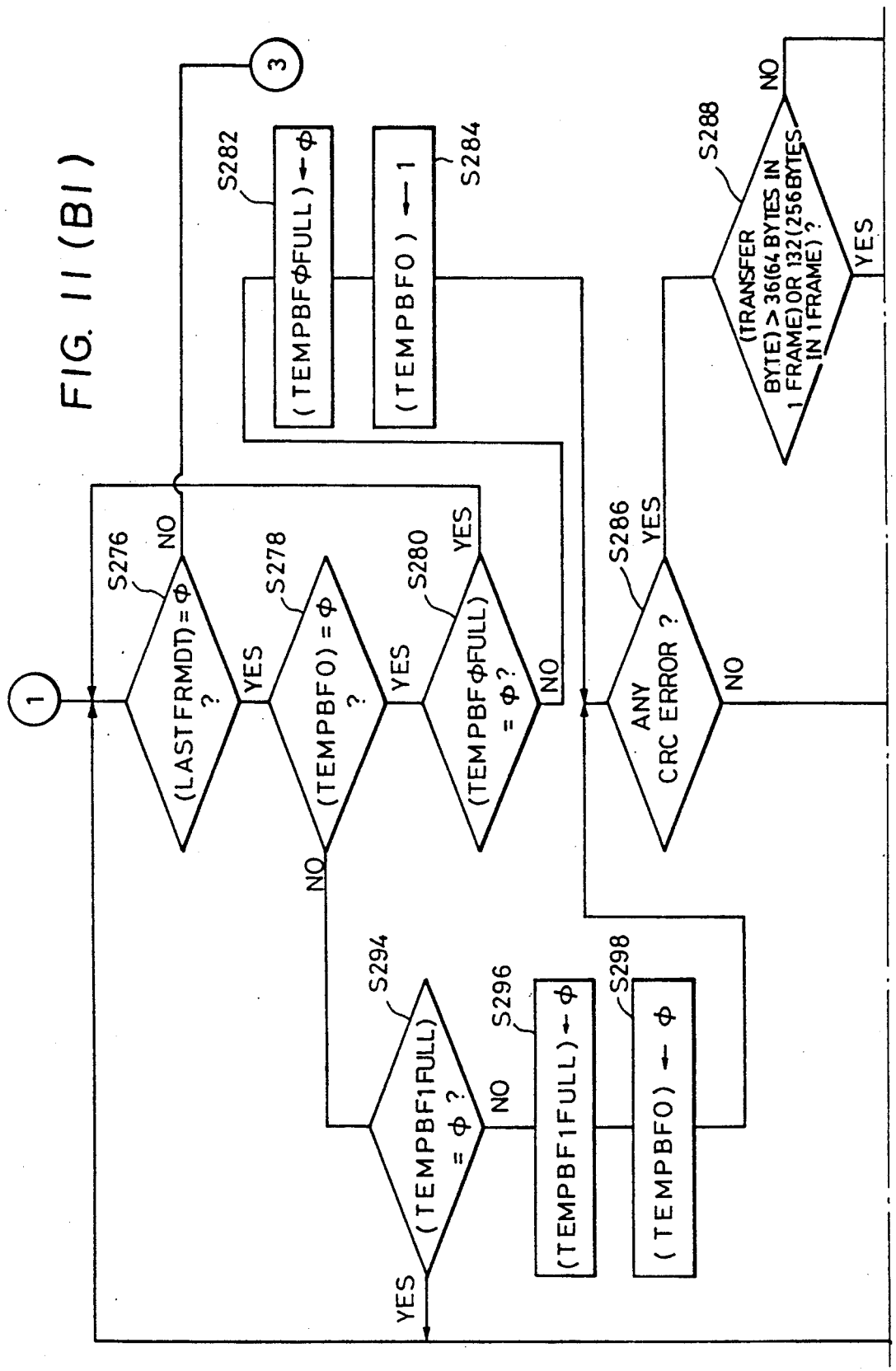
FIG. 11 (B1)

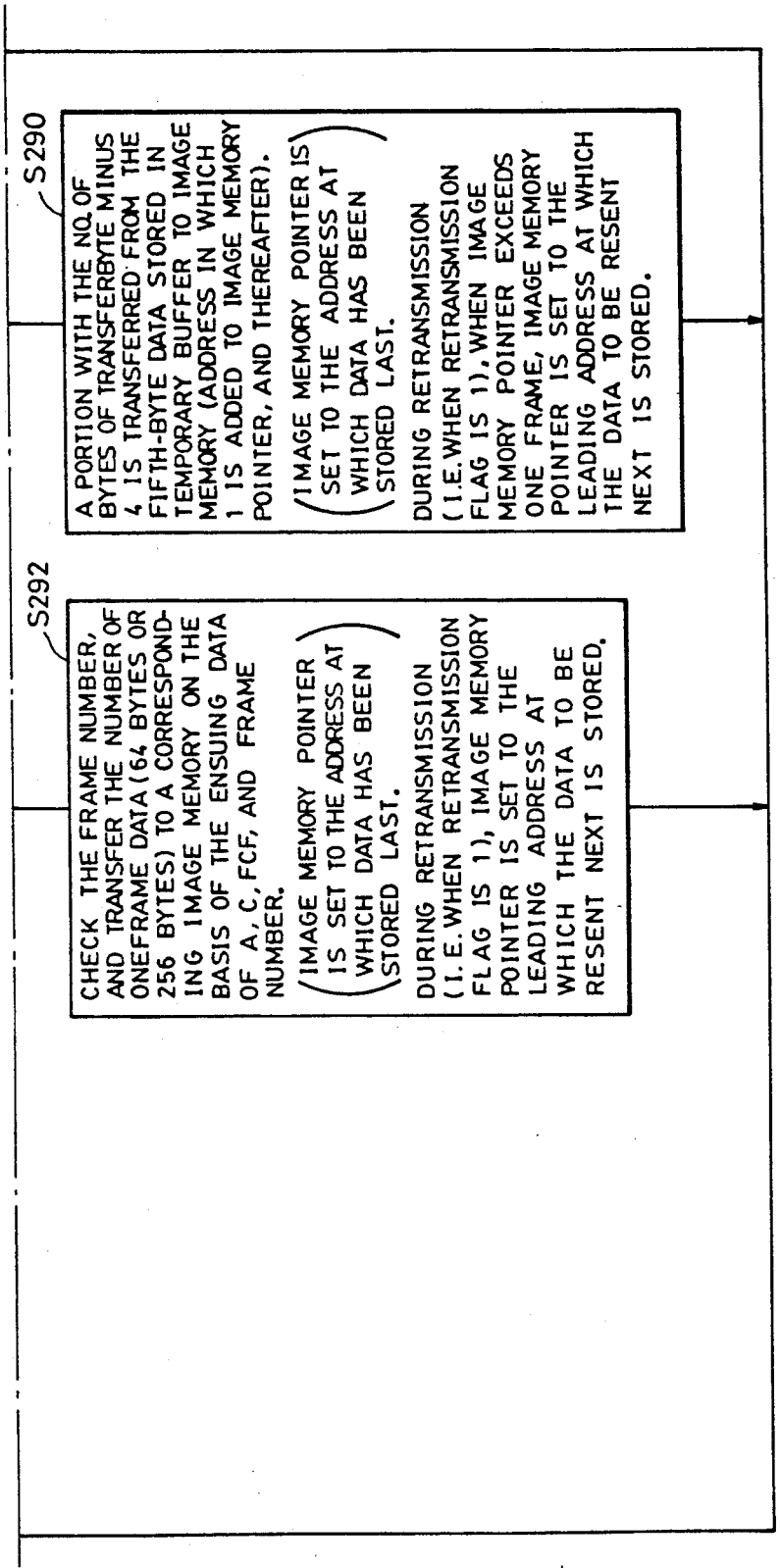

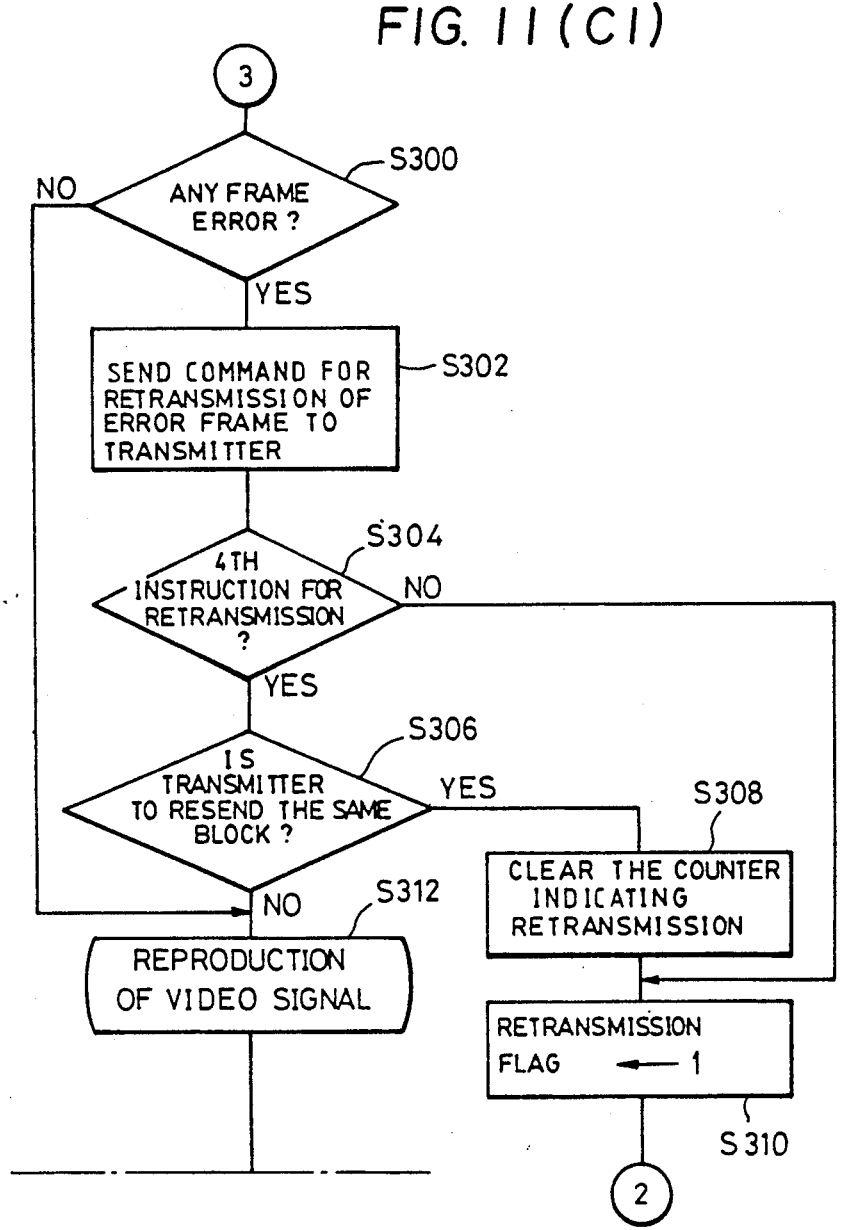

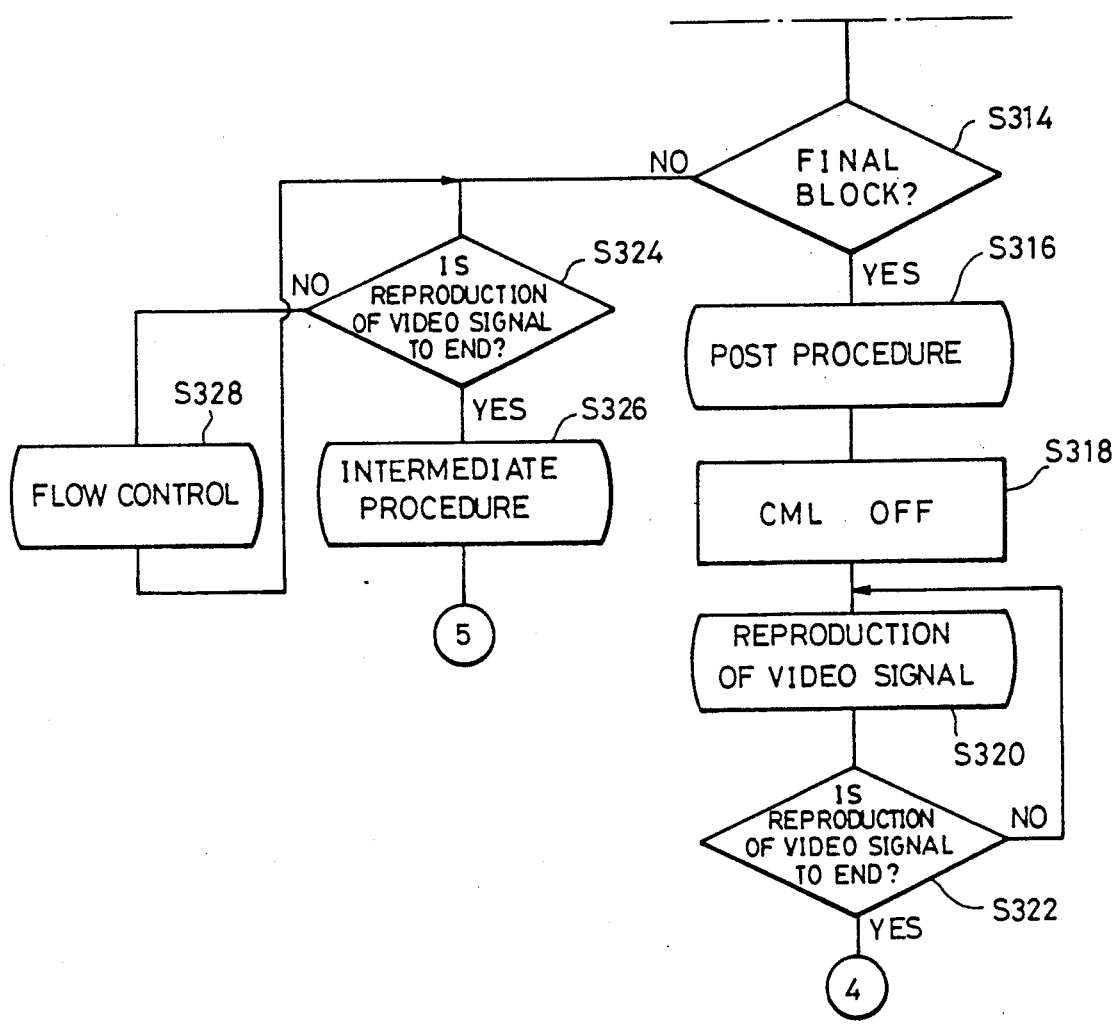
FIG. 11 (C2)

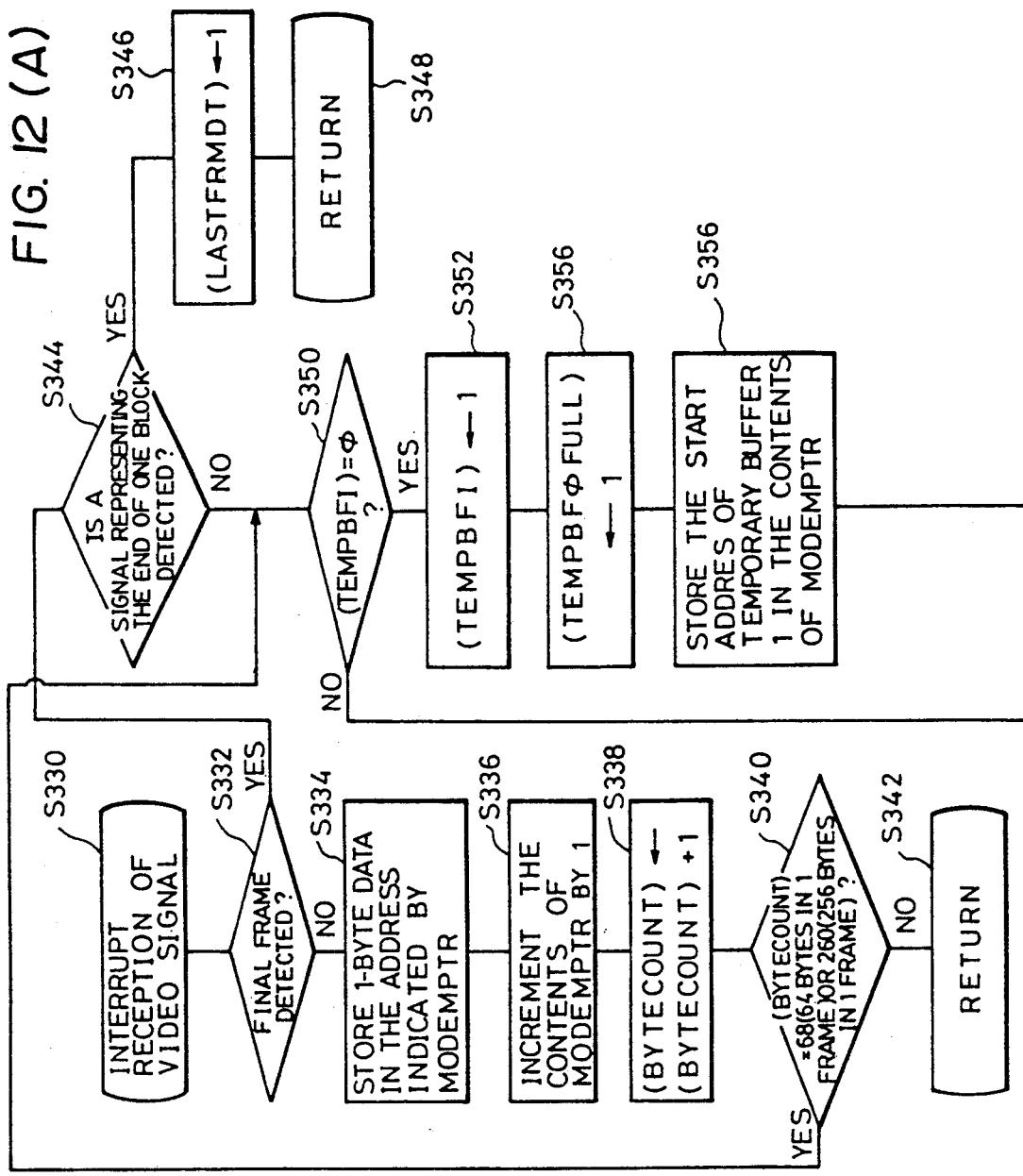

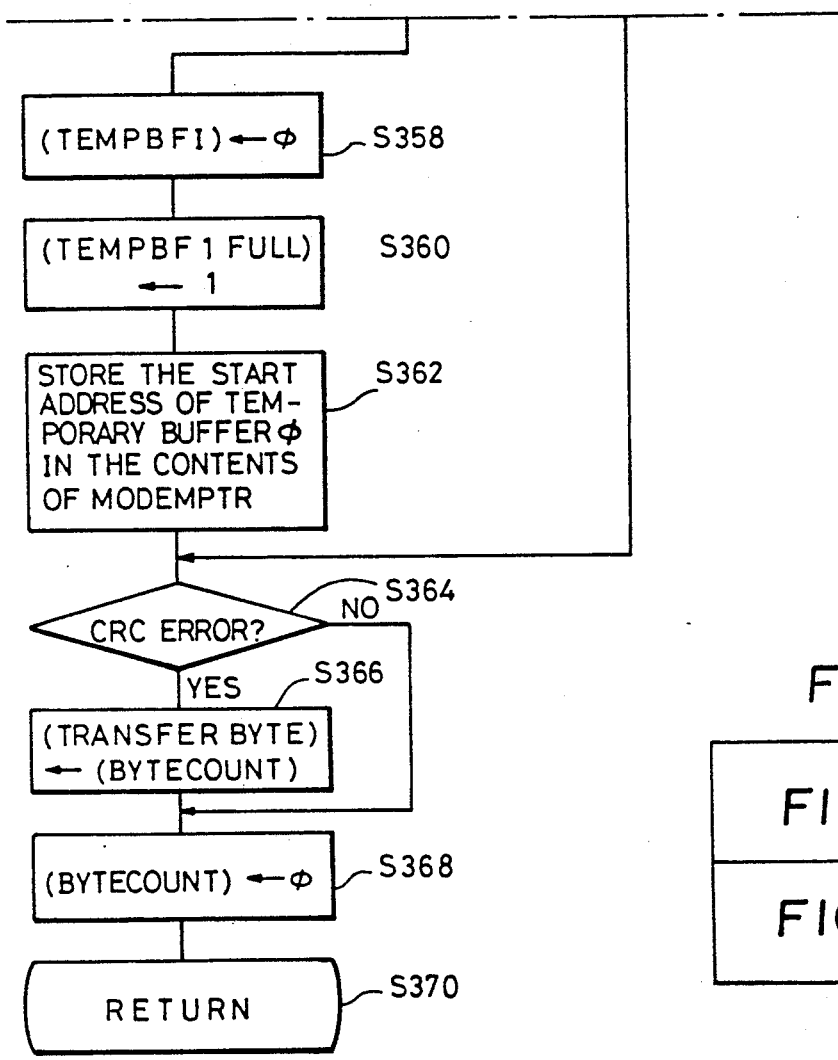

FIG. 14 (1A)
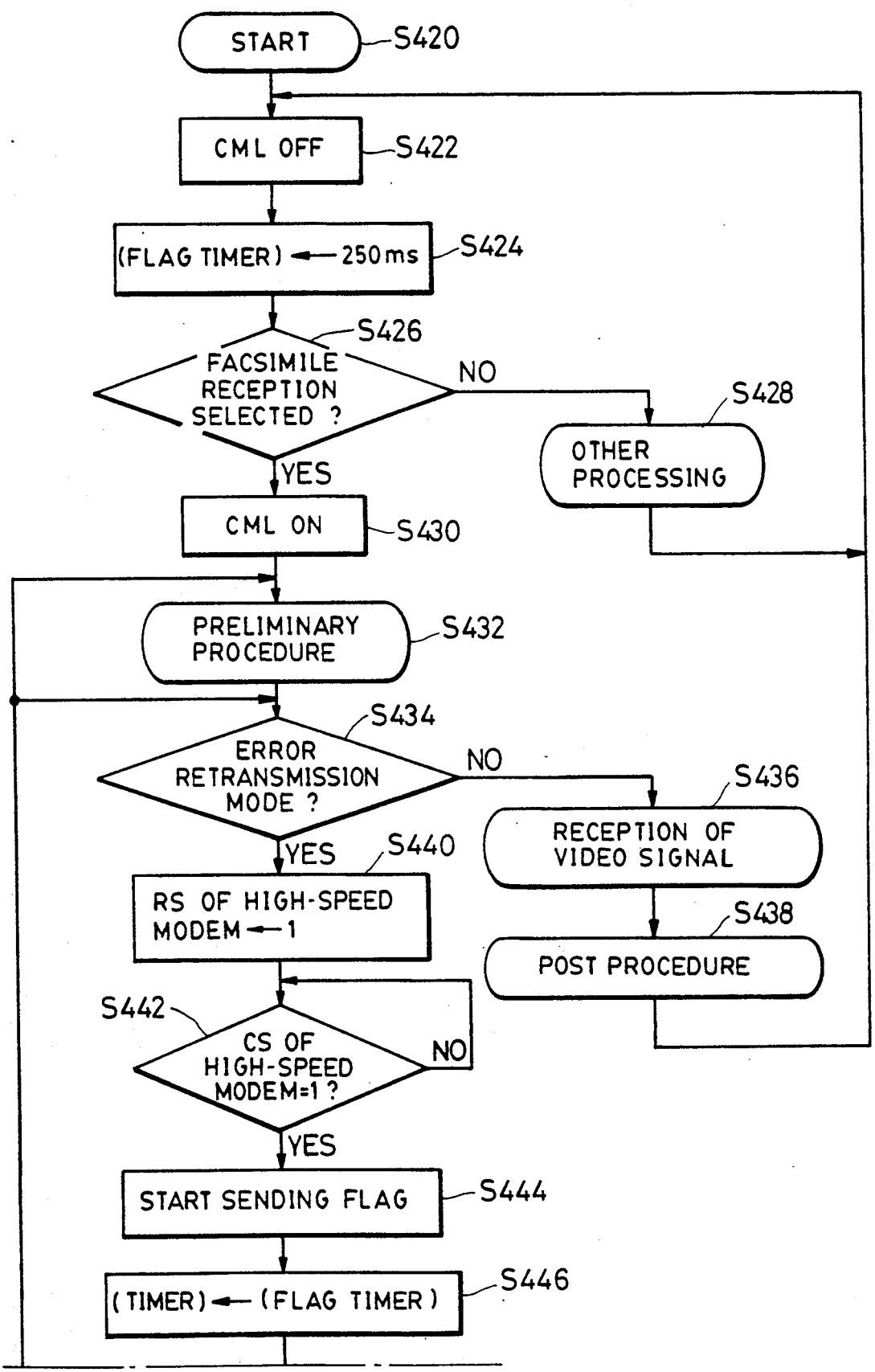

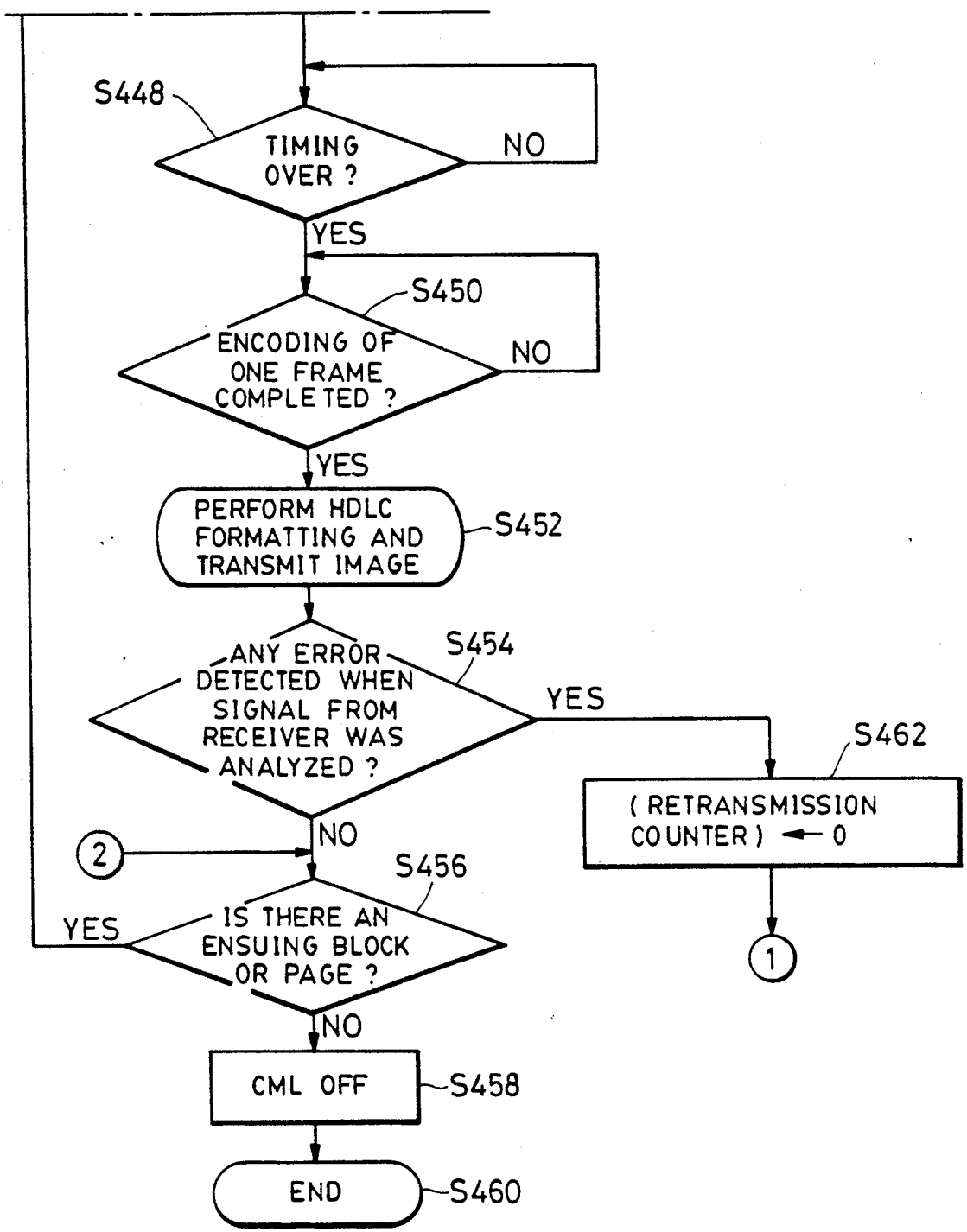

FIG. 14 (2A)
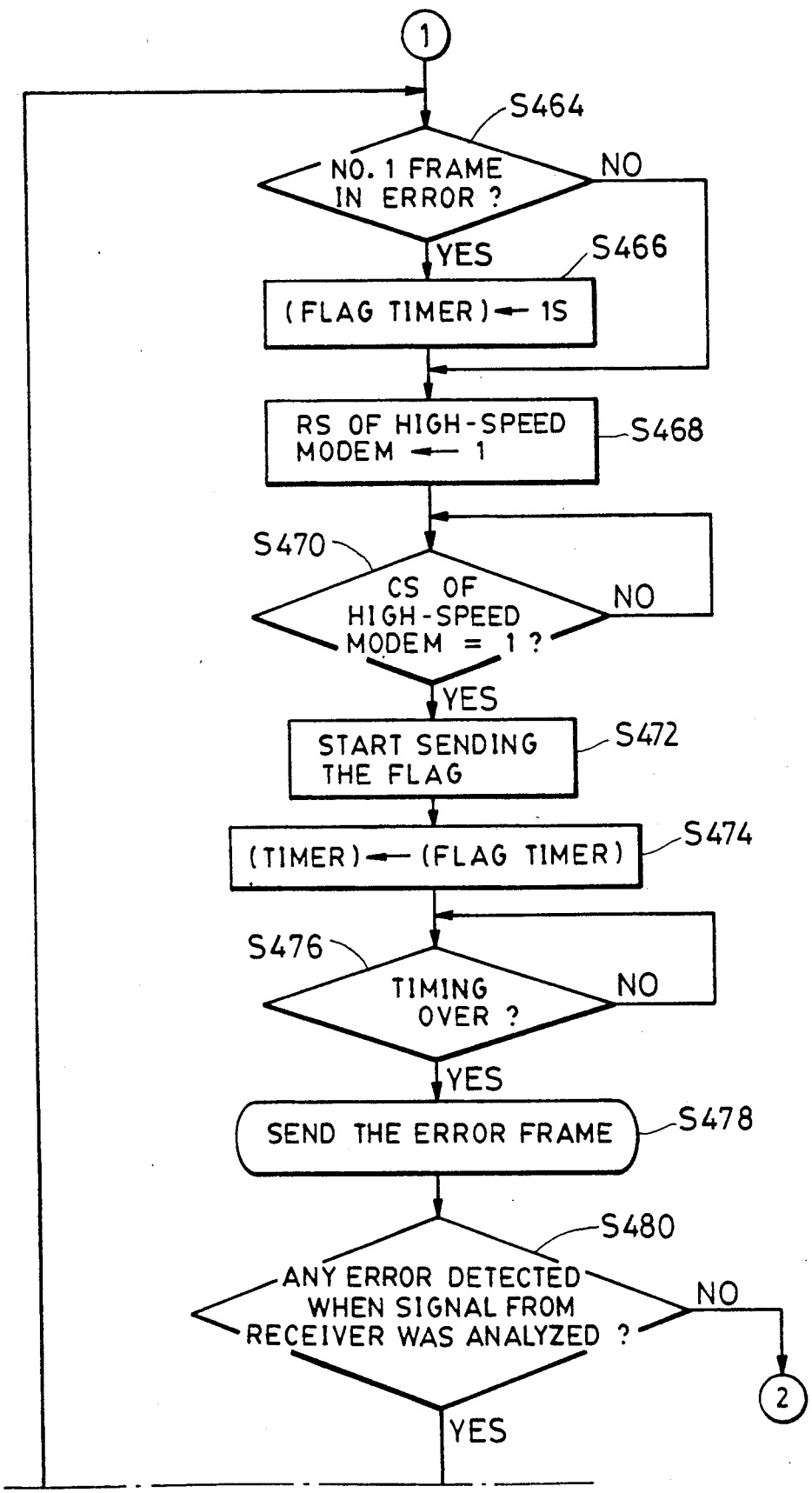

FIG. 14 (2B)
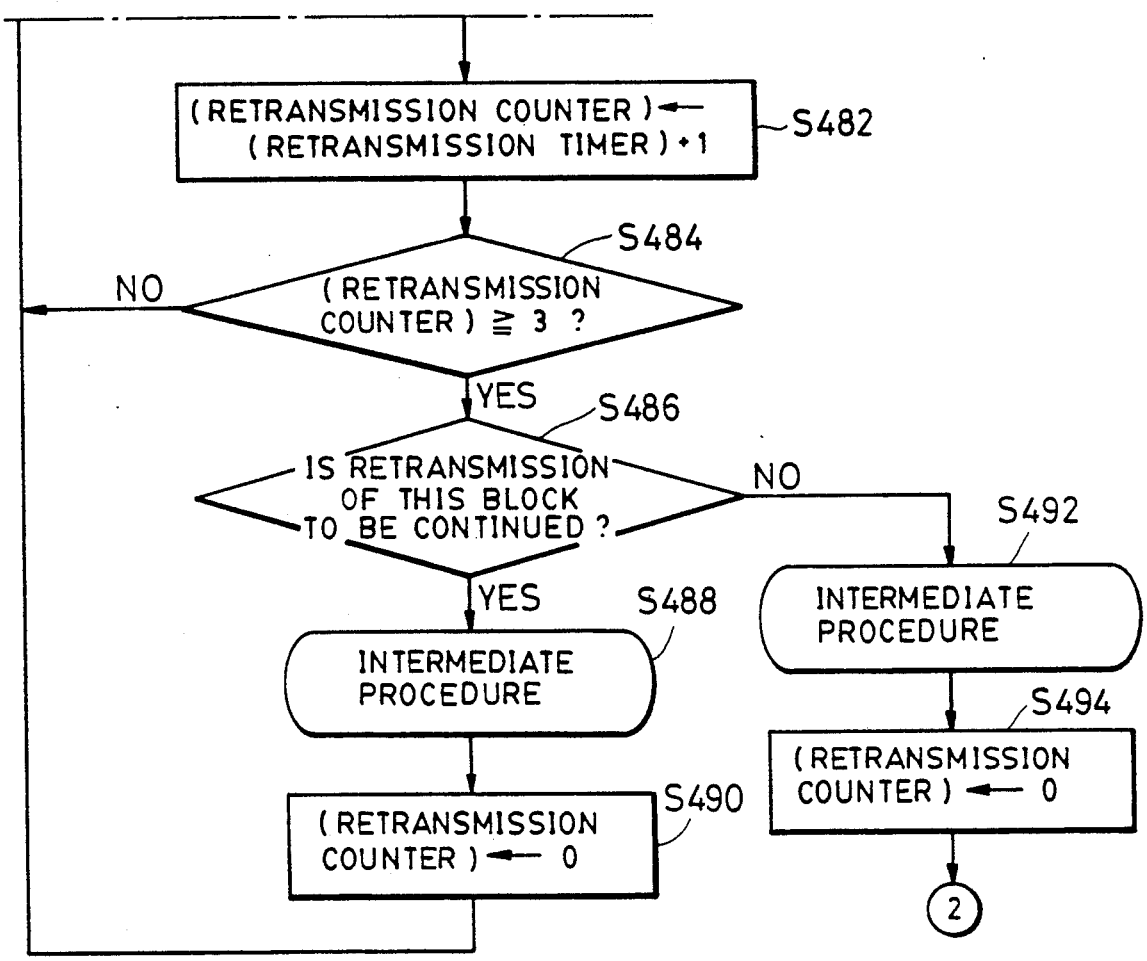
FIG. 14 (2)
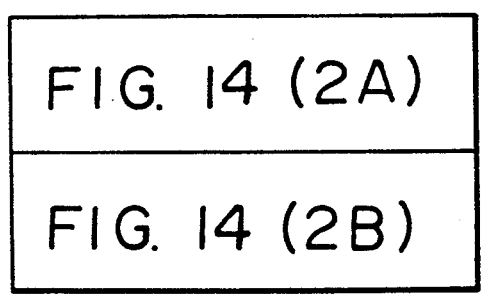

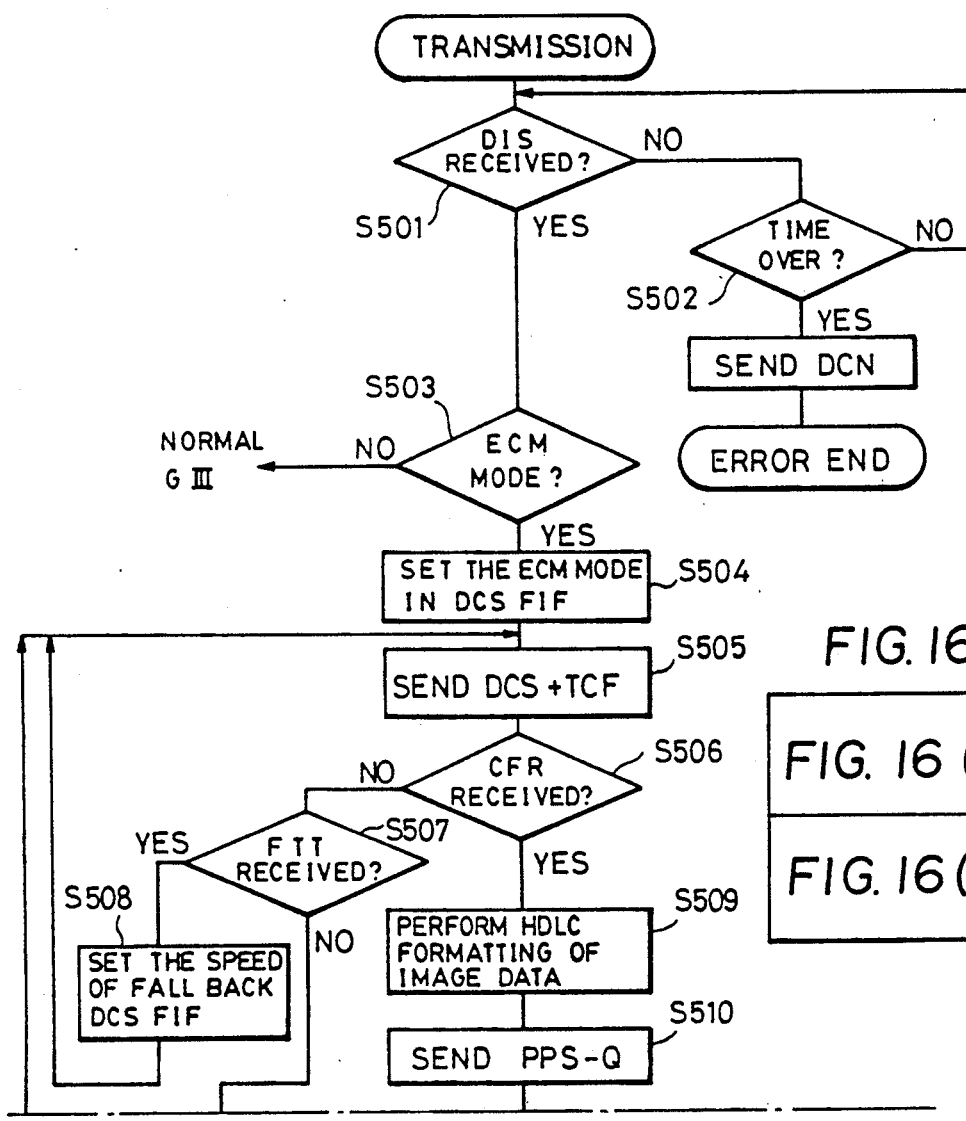

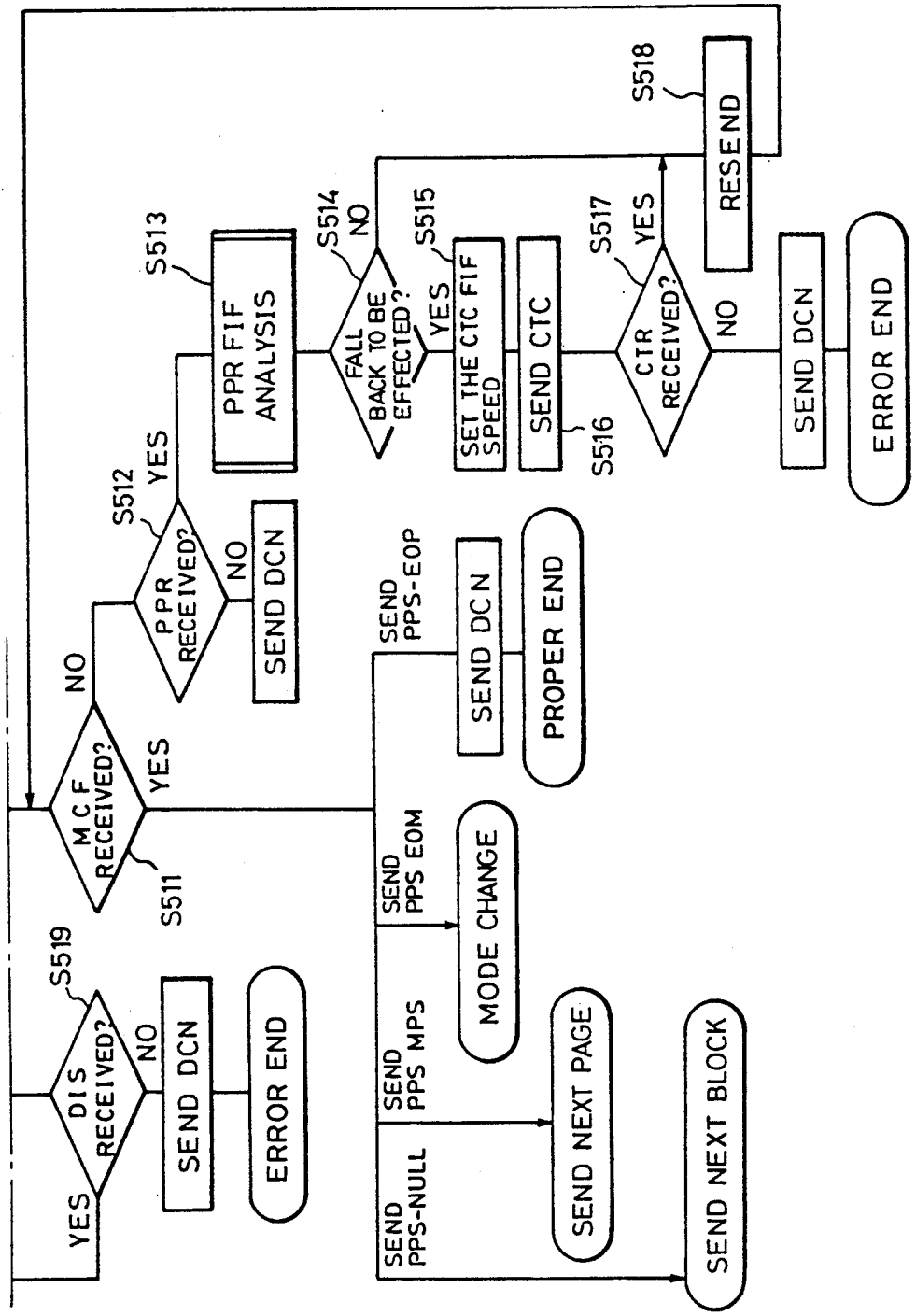
FIG. 16 (A2)

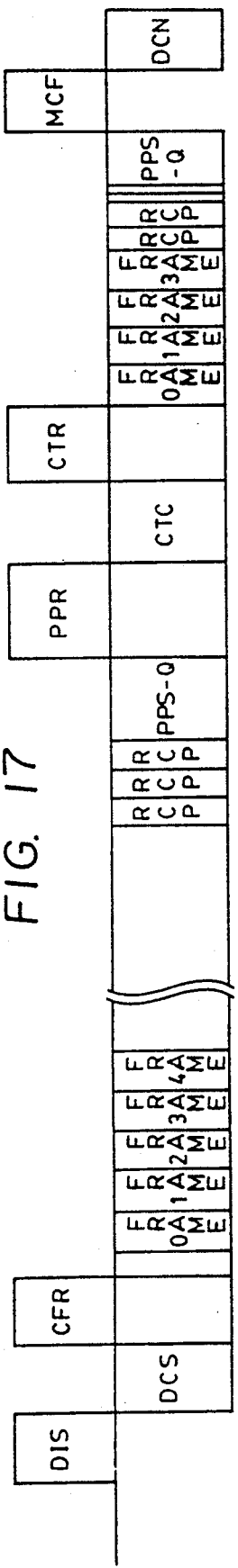
FIG. 17
EXAMPLE OF PROTOCOL OF RETRANSMISSION IN ECM MODE
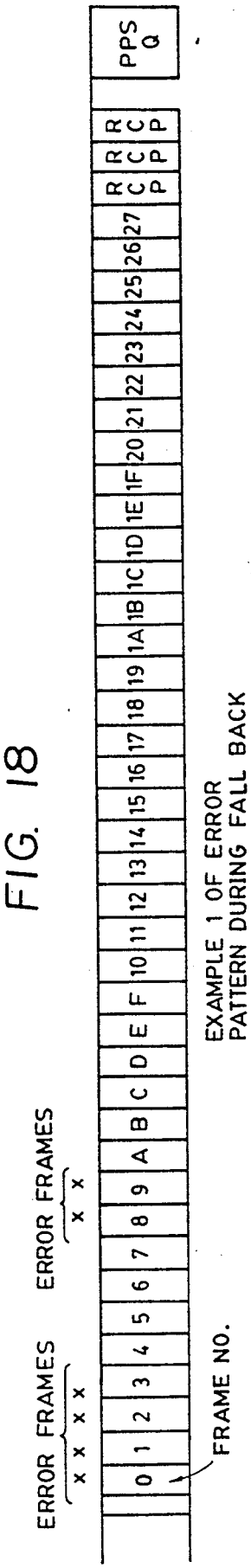
FIG. 18
EXAMPLE 1 OF ERROR PATTERN DURING FALL BACK
FIG. 19
FIF BIT PATTERN OF PPR FIG. 18

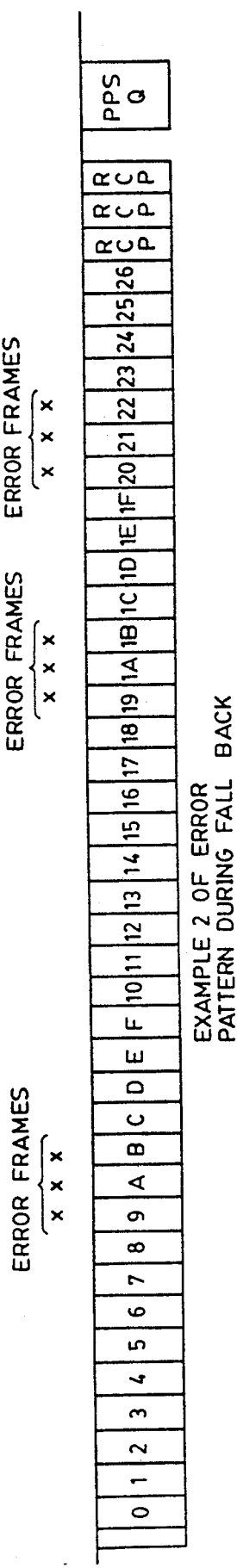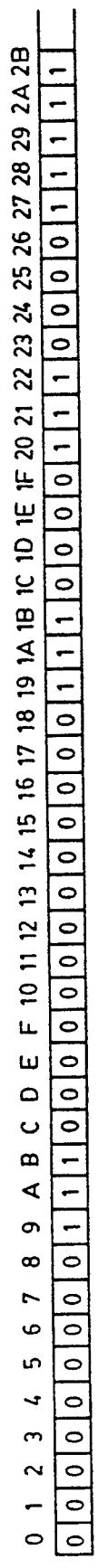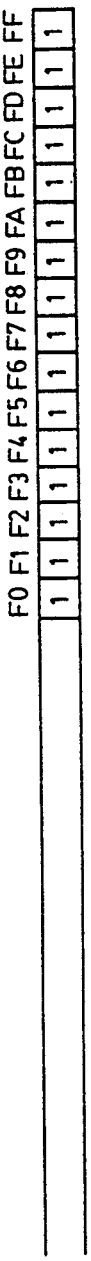
FIG. 20
EXAMPLE 2 OF ERROR PATTERN DURING FALL BACK
FIG. 21
FIF BIT PATTERN OF PPR FOR FIG. 20

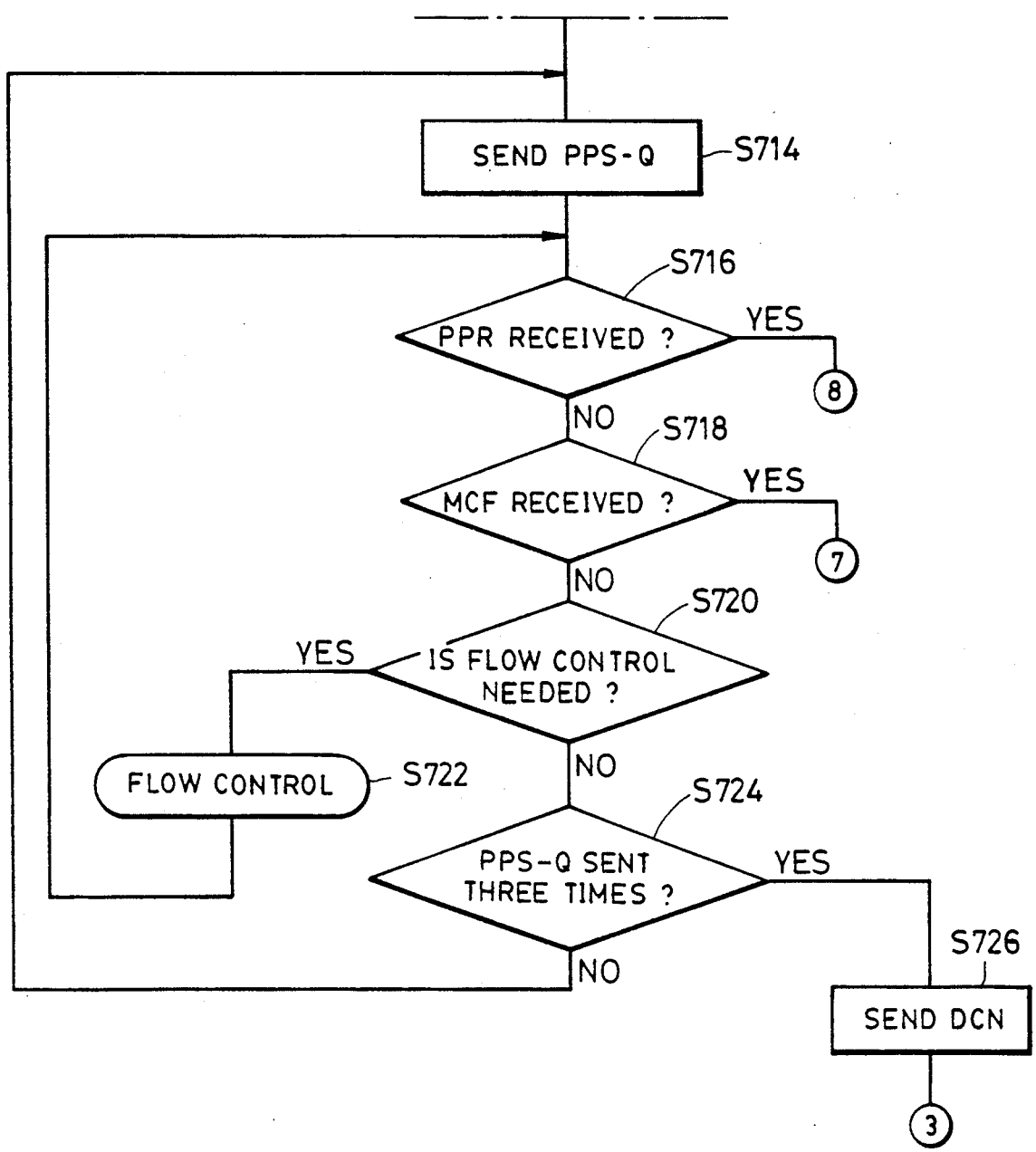

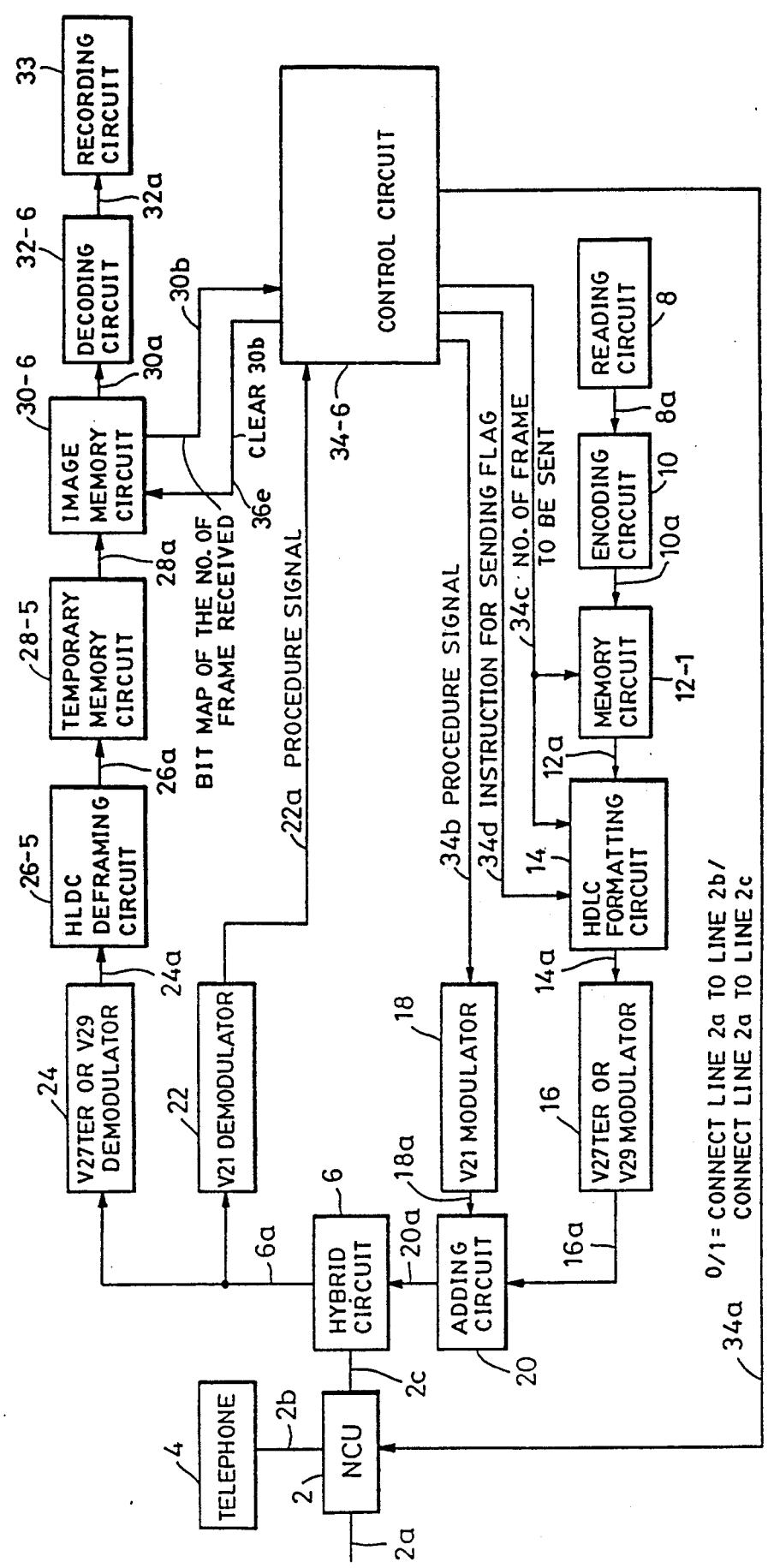

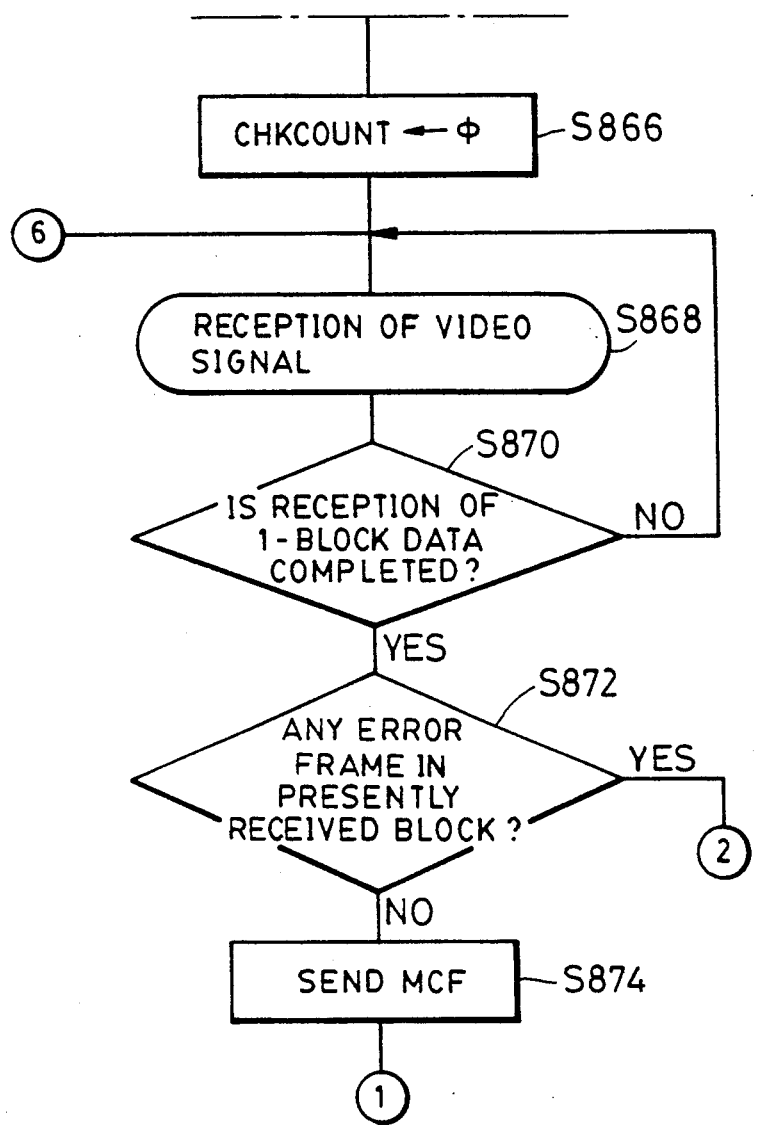

FIG. 25 (IA)
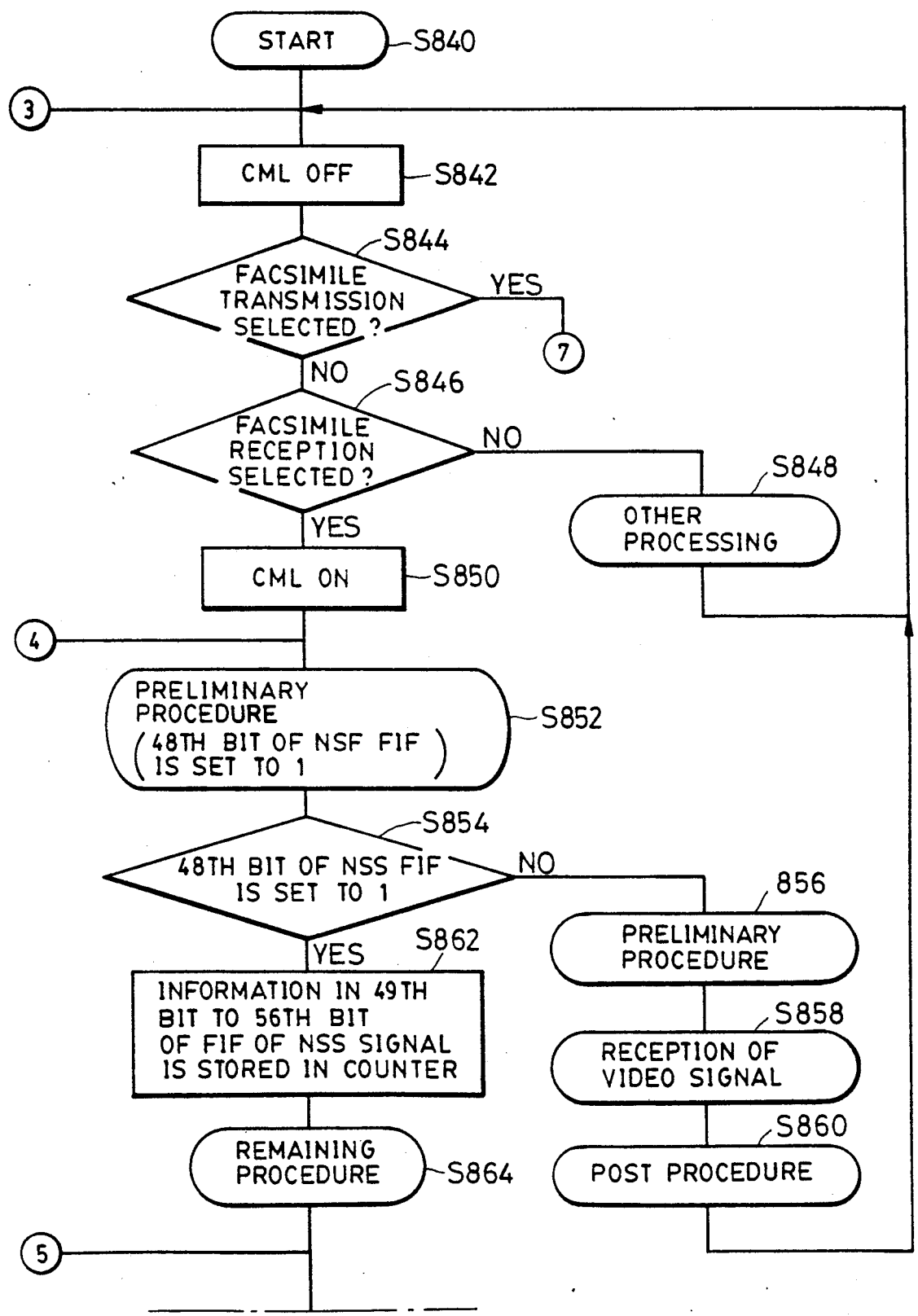

FIG. 25 (2A)
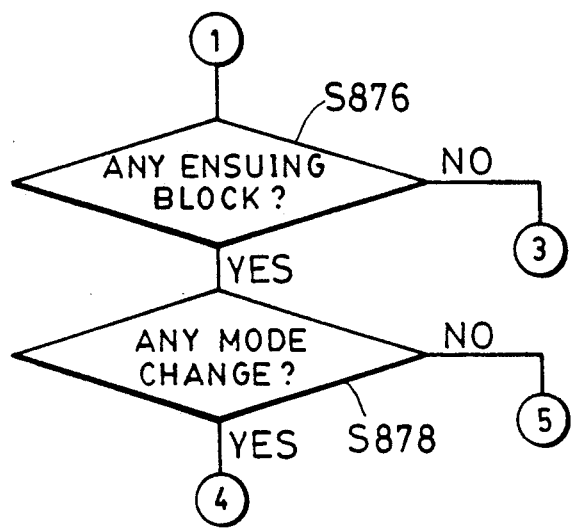
FIG. 25 (2B)
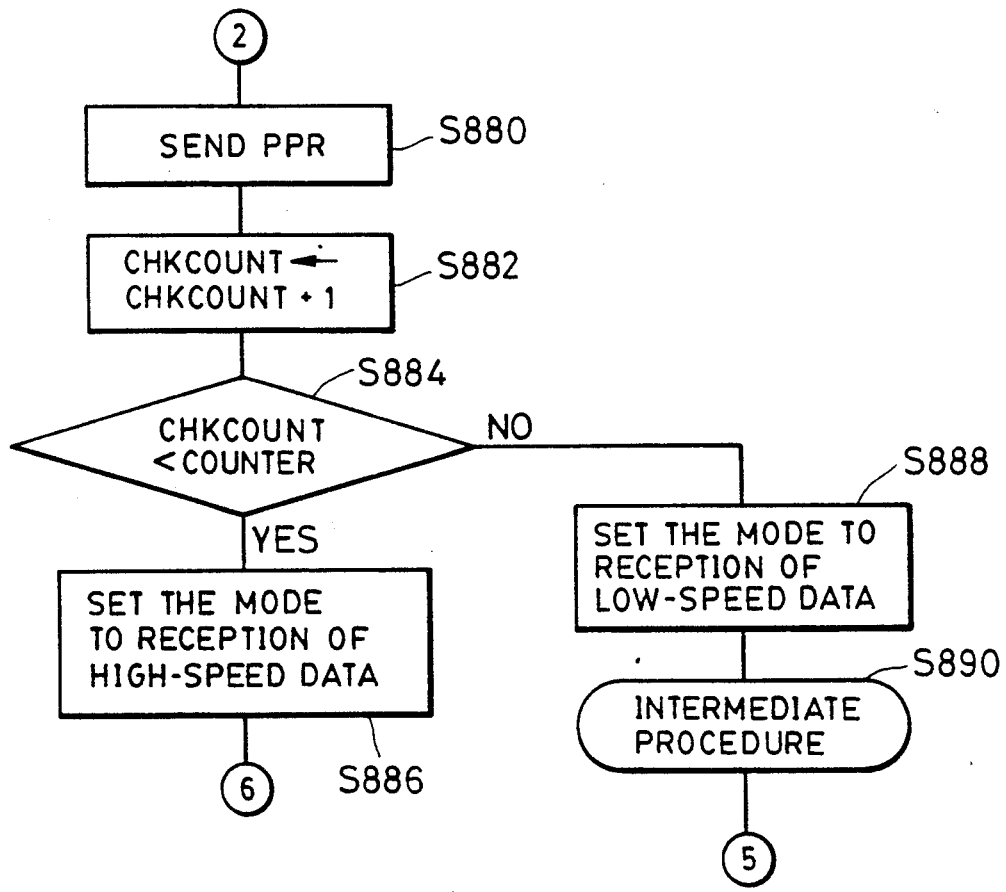

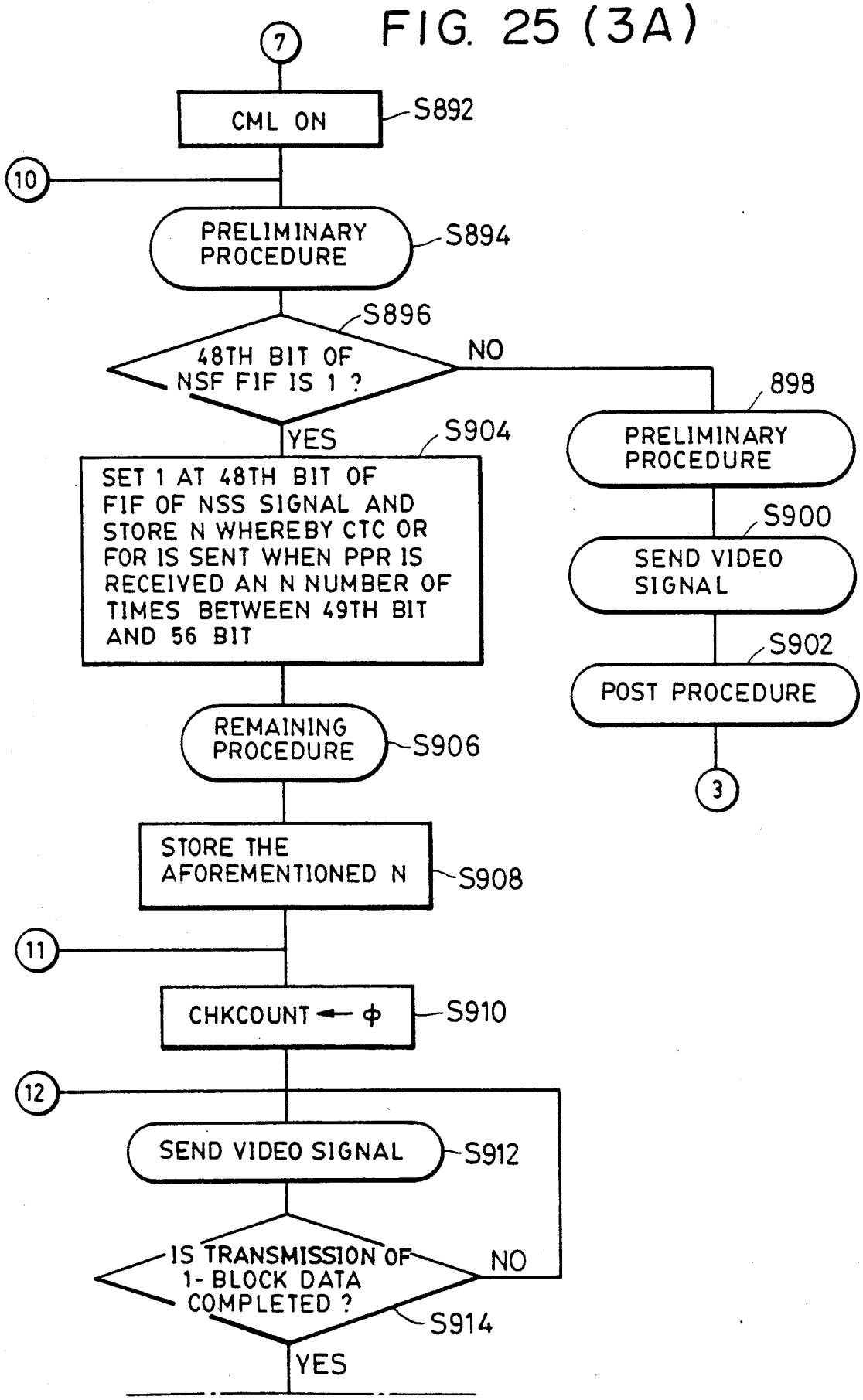
FIG. 25 (3A)

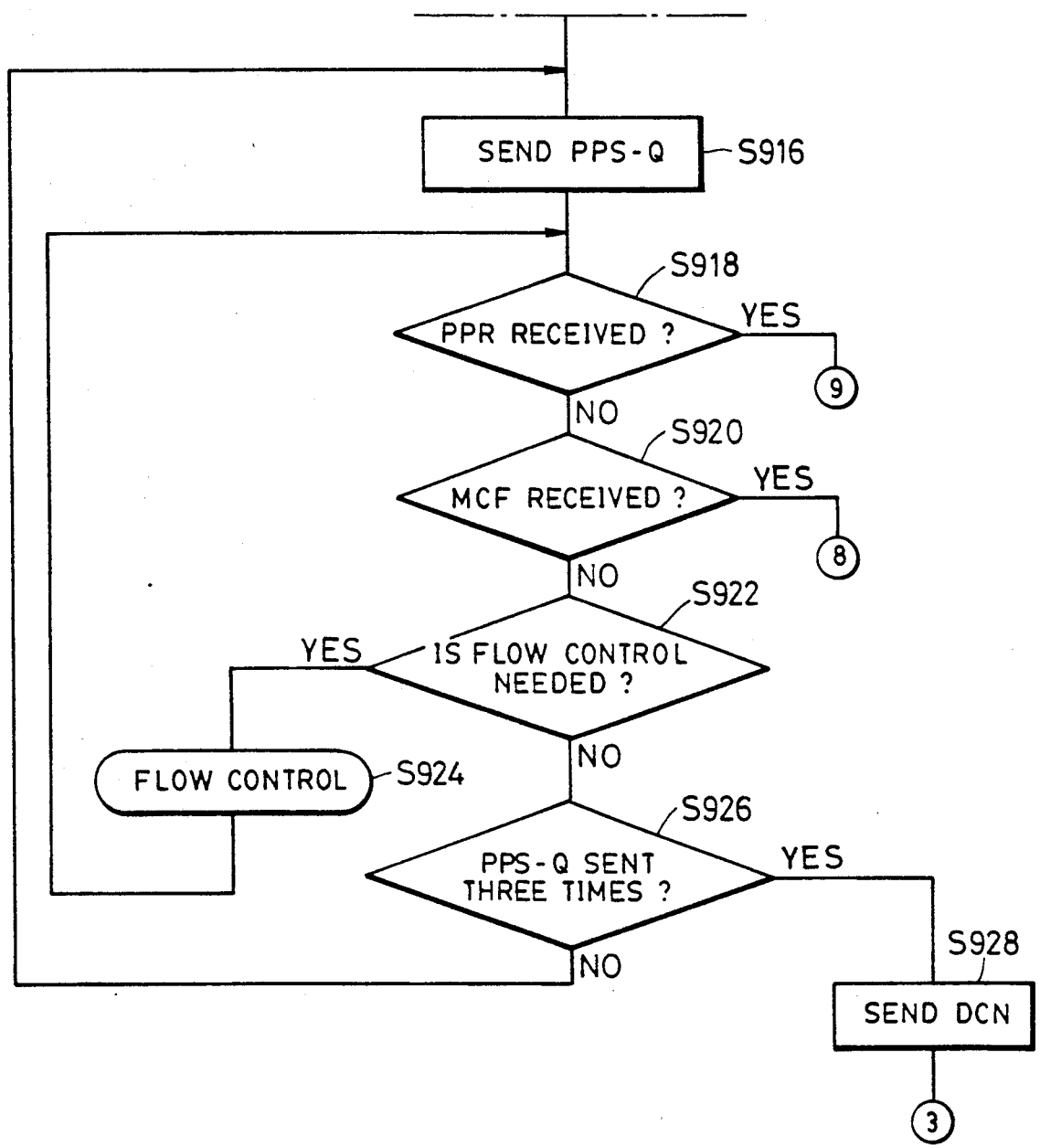

FIG. 25 (4A)
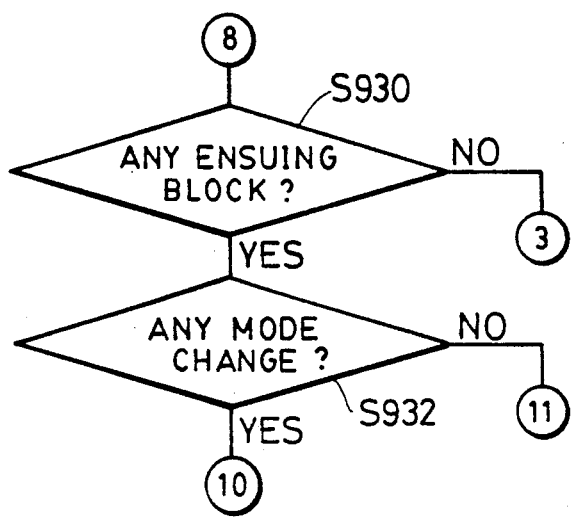
FIG. 25 (4B)
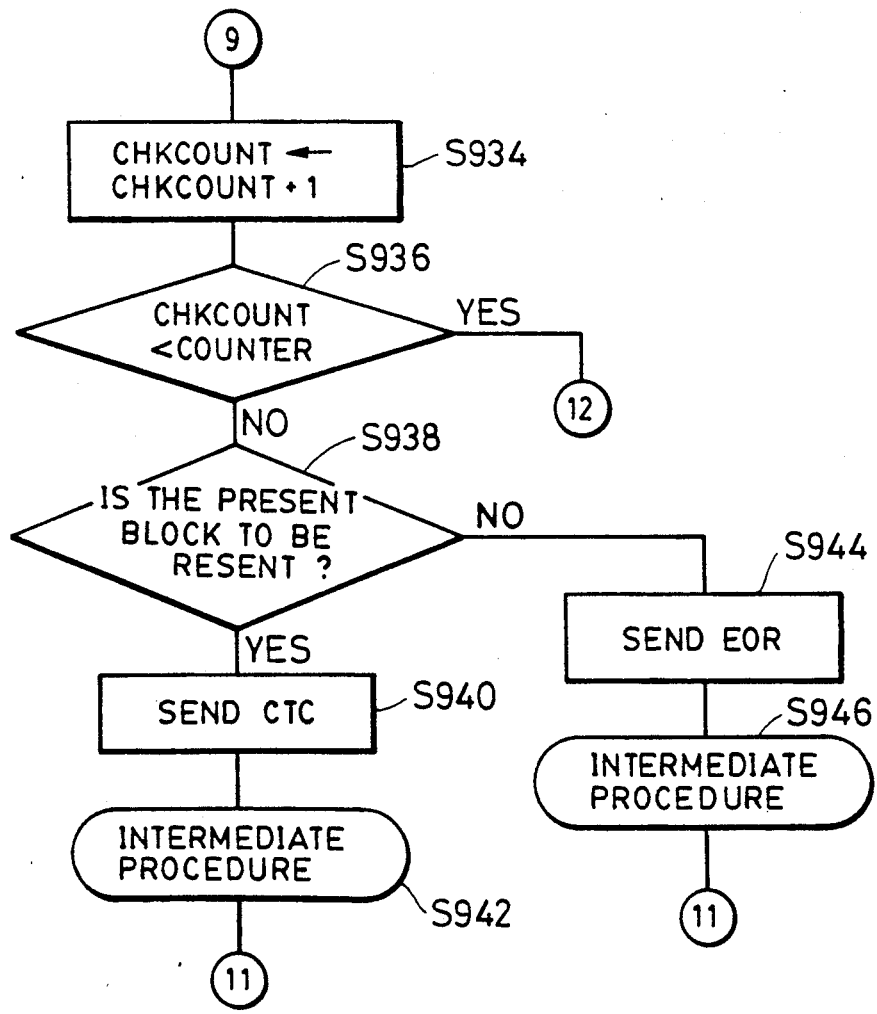

DATA COMMUNICATION APPARATUS

BACKGROUND OF THE INVENTION

1. Field of the Invention

The present invention relates to a data communication apparatus, and more particularly to a data communication apparatus having an error retransmission function.

2. Description of the Related Art

Conventionally, when data transmission is carried out through a communication line, errors occur in data at a fixed probability due to the effect of hits, noises, disturbances, or the like occurring in the communication line. In order to assure a fixed level of quality with respect to data which does not virtually include redundancy, unlike the case of analog speech signals, it is necessary to effect coding to detect and correct transmission errors; namely, it is necessary to effect error detection/correction coding.

Coding is effected in the form of adding a redundant data series determined in accordance with a fixed rule on the basis of the relation of that series to a data series which carries information.

Detection of a transmission error is carried out by detecting whether or not that rule is being maintained in a reception data series. After detection of the error, an information data train which includes the error data is retransmitted (ARQ: automatic repeat request), or, instead of retransmission, the detection and correction of the error data are executed by using an error correction code alone on the basis of the disruption of the aforementioned rule (FEC: forward error correction). Incidentally, there are also cases where a hybrid system combining ARQ and FEC is adopted.

In the FEC system, the error code alone is used for the correction of error data, while, in the ARQ system, the code is entrusted with only the task of detecting an error, and then has a proper data train retransmitted, so that a control procedure (protocol) therefor is required. In addition, there are frequently cases where FEC and ARQ are used for two different purposes, the former as a means of improving an error rate of a transmission line and the latter as a means of realizing substantially error-free and highly reliable data communication, including cases where the error rate characteristics of a transmission line are not very certain.

In the ARQ system, the following three systems are used depending on a method of retransmission:

(1) Basic ARQ (Stop-and-Wait, Idle-RQ)

This is a system wherein a confirmed response is returned each time one data block is received, and an ensuing data block is sent after confirmation.

(2) Continuous block transmission ARQ (Go-back-N)

This is a system wherein data blocks are transmitted continuously, and when a response for request for retransmission is given, the process returns to the block in which the error occurred, and an ensuing block N is retransmitted without disturbing the order of the blocks.

(3) Selective retransmission ARQ (Selective Repeat)

This system is a modification of the continuous block transmission ARQ, and is designed to retransmit only an error block.

The foregoing description appears in Data Communication Handbook, compiled by the Electronic Communication Society and published by Ohm, Co., Ltd., published Oct. 30, 1984, first edition and 1st print.

In the above-described systems, an ECM (error correction mode) is currently being studied as an option to the CCITT recommendation on G3.

In the ECM, on the transmitter side, encoded video information is divided at predetermined lengths, and is subjected to HDLC (high level data link control procedure) formatting as frames, and a plurality of frames are transmitted at a time (a maximum of 256 frames are transmitted). Meanwhile, on the receiver side, after reception of the plurality of frames, the numbers of correctly received frames and error frames are transmitted in the form of a bit map (specifically, a signal called PPR) to the transmitter. On the transmitter side, an error frame is retransmitted. If there is no error frame, the receiver sends information to that effect to the transmitter, and the transmitter proceeds with the transmission of an ensuing block. In addition, after the transmitter effects retransmission an n (=1, 2, 3, ...) number of times, if there is still an error frame, the transmitter can decide whether to continue retransmitting that frame (specifically, retransmission of a CTC signal) or to interrupt the retransmission of that frame and to proceed with the transmission of an ensuing block (specifically, transmission of an EOR signal).

For this reason, there are cases where an error frame remains on the reception side and that error frame is not recorded and reproduced on the reception side.

However, when an error frame remains on the reception side, if an image of the portion of the error frame concerned is not reproduced at all, there are cases where the operator is incapable of knowing that there is an error line. For instance, if one sentence is omitted due to an error, there are cases where it is impossible to know that an error has occurred. Accordingly, if important information is omitted, this can result in a serious problem.

Conventionally, a type of facsimile apparatus is known which is provided with an error retransmission function in which image information is transmitted after being subjected to HDLC formatting. In such a facsimile apparatus, the time duration of sending a flag which is sent immediately before transmission of image information is fixed if encoding of data of one frame or more has been completed. In addition, when if the flag is sent for a fixed period of time, when coding of data of less than a frame has not yet been completed, the flag is sent until encoding of the data of one frame is completed.

Furthermore, after the transmitter transmits a plurality of frames, the transmitter is informed of an error frame from the receiver and effects retransmission. In this case, since the retransmission data has already been encoded, the time duration of sending a flag sent immediately before transmission of the image information is fixed.

When the condition of the line is favorable, it is possible to shorten the communication time if the time duration of sending a flag which is sent immediately before transmission of the image information is short. However, when the condition of the line is aggravated, if the flag transmitting time is fixed, actual data is transmitted before arrangements for a modem are completed (before the adjustment of the modem is completed), so data cannot be received correctly.

For instance, when the line condition is aggravated and arrangements for the modem of the receiver are not completed unless the receiver receives a flag for 300 ms or more, there is a major disadvantage in that the first frame will not be received for an indefinate period.

In addition, a conventional arrangement is known such that the frame in which an error has occurred is merely retransmitted, and no consideration is paid to error conditions such as the error rate or what sort of frames are experiencing errors. Hence, it has been impossible to say that optimum retransmission has been performed. For that reason, there have been cases where an error repeats during retransmission and, hence, a large amount of time is required in transmission.

In conventional error correction, if an error is not corrected, the transmitter starts to transmit the ensuing information, while the receiver outputs information which is free from error.

Specifically, in the above-described ECM mode, for instance, if an error is not corrected even if the same block is transmitted a plurality of times, it is possible to send a control signal EOR whereby the retransmission of this block is interrupted, and if there is an ensuing block, the ensuing block is transmitted. For example, if the transmitter transmits this EOR, it has not been possible for the receiver to correctly receive the information which was sent before the EOR is transmitted.

Meanwhile, even when the receiver receives the EOR signal, the receiver outputs a frame which has been received correctly.

Accordingly, frequently there have been cases where even if transmission of very important information has been selected and error retransmission has been selected, a received image is output as an image in which an error is present.

Furthermore, there have also been cases where even the frames which have been received correctly in a row are output by the receiver.

Consequently, there is a large drawback in that, although it is desirable for the transmitter side to send an error-free image, an error occurs in the received image and, for example, information which is actually "8" is recorded and reproduced as "0" on the receiver side due to an error, thereby resulting in a large fault.

As described above, there are cases where, when an error frame still appears even if the retransmission of the error frame is effected an n number of times, retransmission of the error frame is suspended and the operation proceeds with the transmission of an ensuing block. At this time, it is necessary for the transmitter, when advancing to the ensuing block, to inform the receiver to that effect by a procedure signal at a transmission speed of 300 bits/sec. Meanwhile, when retransmission of the error frame is to be continued, the error frame is transmitted at a high speed of transmission (e.g. 9,600 b/s, 7,200 b/s, 4,800 b/s, 2,400 b/s). In other words, during the retransmission of the error frame, there are cases where high-speed data (error frame) and low-speed data (300 b/s procedure signal) are transmitted, so that the receiver must be capable of receiving both the high-speed data and the low-speed data during the retransmission of the error frame.

However, when the line condition is aggravated, the low-speed data and the high-speed data may be mistaken for each other, so that there is the major drawback that there is a high probability of communication being incomplete.

SUMMARY OF THE INVENTION

Accordingly, a primary object of the present invention is to provide an improved data communication apparatus having an error retransmission function, thereby overcoming the above-described drawbacks of the conventional art.

Another object of the present invention is to provide a data communication apparatus which allows the operator to properly judge the correct or incorrect reception of the communication data in a case where there is an error in communication data although communication is effected in the error retransmission mode.

Still another object of the present invention is to provide a data communication apparatus which is capable of discerning an amount of error occurring in communication data.

A further object of the present invention is to provide a data communication apparatus which is capable of displaying an amount of error occurring in communication data.

A still further object of the present invention is to provide a data communication apparatus which is capable of displaying an amount of error occurring in communication data although communication is carried out in the error retransmission mode.

A further object of the present invention is to provide a data communication apparatus which makes effective use of error data occurring in communication data although communication is carried out in the error retransmission mode.

A further object of the present invention is to provide a data communication apparatus which reproduces normal data contained in error data that occurs in communication data although communication is carried out in the error retransmission mode.

A further object of the present invention is to provide a data communication apparatus which is capable of minimizing an amount of error data occurring in data communication based on the error retransmission mode.

A further object of the present invention is to provide a data communication apparatus which, at the time of occurrence of a frame error in the error retransmission mode, is capable of reducing an amount of error data and enables efficient data transmission by extending the time duration of sending a specific pattern which is sent immediately before transmission of data.

A further object of the present invention is to provide a data communication apparatus which is capable of minimizing an amount of error data and increasing the transmission efficiency in data communication based on the error retransmission mode.

A further object of the present invention is to provide a data communication apparatus which performs error analysis when an error is retransmitted in the error retransmission mode, and a transmission speed or a modulation system is selected in accordance with the result of that analysis to minimize an amount of error during retransmission, thereby enhancing the transmission efficiency.

A further object of the present invention is to provide a data communication apparatus which is capable of ultimately preventing the occurrence of error data in the error retransmission mode.

A further object of the present invention is to provide a data communication apparatus which is capable of preventing ensuing data communication from being carried out without error retransmission being completed in data communication based on the error retransmission mode.

A further object of the present invention is to provide a data communication apparatus which is capable of simplifying processing on the reception side by informing the reception side in advance of the timing of a shift from transmission of high-speed data to transmission of low-speed data during retransmission of an error in data communication based on the error retransmission mode, thereby minimizing an amount of errors.

To these ends, in accordance with one aspect of the present invention, there is provided a data communication apparatus comprising: data communication means for effecting data communication; detecting means for determining the presence of any error in data and detecting an amount of error data; and display means for displaying information which indicates an amount of error data detected by the detecting means.

The above and other objects, features and advantages of the present invention will become more apparent from the following detailed description of the invention when read in conjunction with the accompanying drawings.

BRIEF DESCRIPTION OF THE DRAWINGS

FIG. 3 is a block diagram illustrating the configuration of a facsimile apparatus in accordance with the first embodiment;

FIG. 7 is a block diagram illustrating the configuration of a facsimile apparatus in accordance with the second embodiment;

FIGS. 8(A) and 8(B) are flowcharts illustrating the operation of control in accordance with the second embodiment;

FIGS. 11(A), 11(B), 11(C) and 12 are flowcharts illustrating the operation of control in accordance with the third embodiment;

FIGS. 14(1) and 14(2) are flowcharts illustrating the operation of control in accordance with the fourth embodiment;

FIG. 17 is a diagram illustrating an example of the procedure in an ECM mode;

FIG. 18 is a diagram illustrating an example of an error pattern during a fall back;

FIG. 19 is a diagram illustrating an FIF bit pattern of a PPR signal with respect to an error pattern shown in FIG. 18;

FIG. 20 is a diagram illustrating another example of an error pattern during a fall back;

FIG. 21 is a diagram illustrating an FIF bit pattern of the PPR signal with respect to the error pattern shown in FIG. 20;

FIG. 24 is a block diagram illustrating the configuration of a facsimile apparatus in accordance with a seventh embodiment of the present invention; and FIGS. 25(1) to 25(4) are flowcharts illustrating the operation of control in accordance with the seventh embodiment.

DETAILED DESCRIPTION OF THE PREFERRED EMBODIMENTS

Referring now to the accompanying drawings, a description will be given of embodiments of the present invention. It should be noted that, in the embodiments given below, a facsimile apparatus is described as an example of a data communication apparatus having an error retransmission function. However, the present invention is not restricted to a facsimile apparatus, but can be applied to data communication apparatuses in general such as as a telex machine and word processor communication apparatus.

First, a description will be given of an outline of image communication in an error retransmission mode of a facsimile apparatus in accordance with one embodiment.

The facsimile apparatus in this embodiment is adapted to transmit image data after subjecting the same to HDLC (high level data link control procedure) formatting and transmit errors. On the transmitter side, encoded image information is divided into predetermined lengths so as to be converted into frames, which are subjected to HDLC formatting, and a plurality of frames (e.g. a maximum of 256 frames) are transmitted at a time. On the receiver side, after completion of the reception of the plurality of frames (e.g. a maximum of 256 frames), the numbers of frames which are in error are sent to the transmitter. On the transmitter side, each error frame is retransmitted. If no error frame is found any longer on the receiver side, information to that effect is sent to the transmitter, and the transmitter starts to transmit an ensuing block. In addition, if a frame is still in error after it has been retransmitted an n (=1, 2, 3, ...) number of times, the transmitter can determine whether to continue retransmitting that frame or discontinue the retransmission of that frame and proceed with transmission of the ensuing block.

Figure 1:
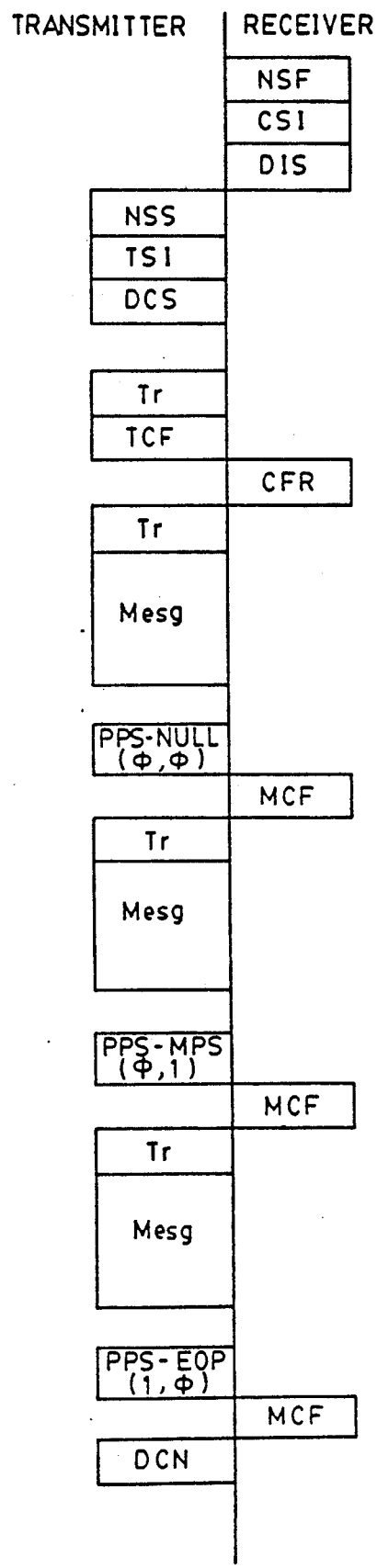
FIGS. 1(1) to 1(4) are diagrams illustrating the procedure of ECM in accordance with an embodiment of the present invention.

FIGS. 1(1) to 1(4) are diagrams illustrating the procedure of an ECM (Error Correction Mode) in accordance with this embodiment.

FIG. 1(1) shows an example of the procedure for a case which is free of an error frame; FIG. 1(2) shows an example of the procedure for a case in which error frames are present; FIG. 1(3) shows an example of the procedure for a case in which, although one block has been retransmitted a plurality of times, there are still error frames, and the retransmission of those frames is being continued; FIG. 1(4) shows an example of the procedure for a case in which, although one block has been retransmitted a plurality of times, there are still error frames, the retransmission of those error frames is discontinued, and the operation proceeds with transmission of an ensuing block.

In FIG. 1, PPS-Q, PPR, EOR-Q, ERR, CTC, and CTR are signals at 300 b/s.

First, PPS (partial page signal)-Q represents an end of a partial page or one page, and indicates that upon reception of MCF the operation returns to Phase B (a preliminary procedure for a message) or Phase C (transmission of a message). Any one of NULL, MPS, EOM, EOP, and PRI-Q is used as Q. MPS, EOM, EOP, PRI-Q have the same concepts as that of the conventional CCITT (International Telegraph and Telephone Consulting Committee of the International Telecommunications Union) recommendation T30, and represent a final partial page of one page. NULL is a signal which is used in a case where a document of one page is divided into a plurality of partial pages. Namely, NULL represents a partial page which is not final in a page.

PPR (partial page request) is a signal which represents that a message received previously is incomplete. PPR has a 256-bit FIF, and this FIF is used to request the retransmission of a frame of a designated number.

EOR (end of retransmission)-Q is a signal which represents that retransmission of an error frame in a previously transmitted partial page is to be ended, and that an ensuing block is transmitted when an ERR signal is received. Q is the same as that of PPS.

ERR (response for end of retransmission) is a response signal with respect to an EOR signal.

CTC (continue to correct) is a signal which represents that the transmission side desires to continue the correction of a previously sent message. CTC has an FIF and is capable of changing the transmission speed.

CTR is a response signal with respect to a CTC signal, and represents that the receiver side accepts the contents of the CTC signal.

In FIG. 1(2), on detecting an error frame, the receiver sends PPR to the transmitter. On receiving the PPR signal, the transmitter performs the retransmission of the designated frame (high-speed data).

Meanwhile, in FIGS. 1(3) and 1(4), on detecting an error frame, the receiver sends a PPR signal to the transmitter. On receiving the PPR signal, the transmitter may continue to retransmit this block (CTC signal) or transmit a procedure signal (low-speed data at 300 b/s) for discontinuing the retransmission of this block and transmitting an ensuing block (EOR signal).

As a first embodiment, a description will be given of a case where, when there is an error in image data although an error retransmission mode is being used, information indicating an amount of that error image data is displayed. In the first embodiment, if a received error is not corrected and an error frame still remains even after retransmission is effected by the transmitter a predetermined number of times, for instance, three times, selection is made on the transmitter side as to whether to resume the retransmission of that frame or to discontinue the retransmission of that frame and effect the transmission of an ensuing block. If the transmitter is to discontinue the retransmission of the error frame, the transmitter transmits information to that effect, and, at the same time, transmits information indicating a number of lines included in that error frame. Then, the receiver recognizes the number of lines included in that error frame and displays unique information (e.g. a black-and-white, alternating pattern) indicating that a reception error has occured.

Figure 2:
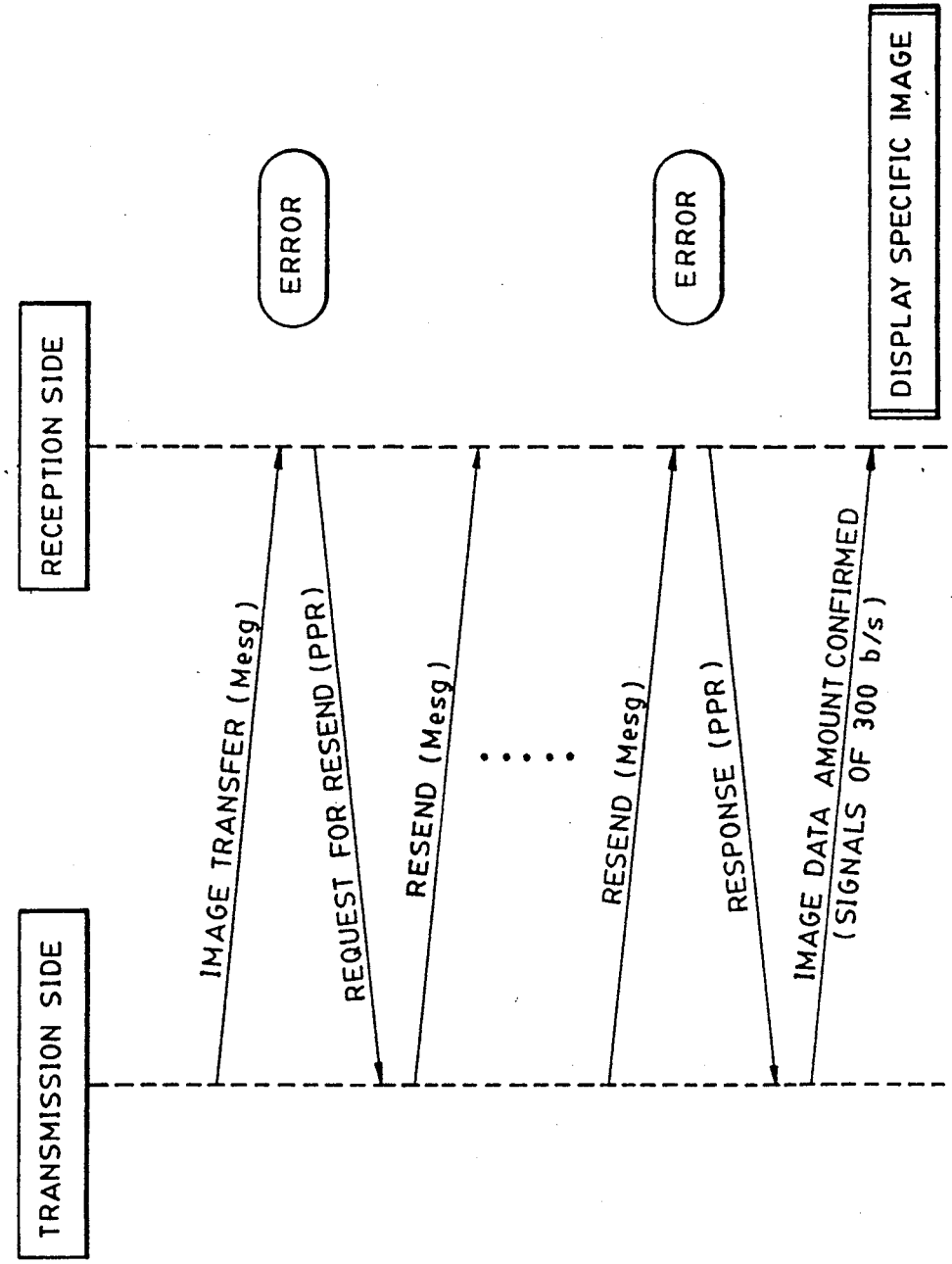
FIG. 2 is a diagram illustrating the procedure of a first embodiment of the present invention.

FIG. 2 is a diagram illustrating the procedure of the first embodiment. The transmitter informs the receiver of an amount of error image data by means of a procedure signal at 300 b/s.

FIG. 3 is a block diagram illustrating the configuration of facsimile equipment in accordance with the first embodiment. In FIG. 3, a network control unit (NCU) 2 controls connection of a telephone exchange network by connecting a telephone network to a terminal of its line to use the telephone network, or effects a changeover to a data communication line for the purpose of effecting data communication or the like. A signal line 2a represents a telephone line. A signal on a signal line 34a is input to NCU 2, and if a signal level thereof is "0", NCU 2 connects the line 2a to the telephone (i.e., the signal line 2a to a signal line 2b). Meanwhile, upon receiving a signal on the signal line 34a and if a signal level thereof is "1", NCU 2 connects the telephone line 2a to the facsimile apparatus (i.e., the signal line 2a to a signal line 2c). In a normal state, the telephone line 2a is connected to the telephone side.

Reference numeral 4 denotes a telephone.

A hybrid circuit 6 separates a signal of a transmission system from a signal of a reception system. In other words, a transmission signal on a signal line 20a is sent to the telephone line 2a via the signal line 2c and NCU 2. In addition, a signal sent from the other end of communication is output to a signal line 6a via NCU 2 and the signal line 2c.

A reading circuit 8 sequentially reads video signals of one line in the horizontal scanning direction from a transmission document and compiles a binary signal train representing white or black. This reading circuit 8 receives as its input a signal sent from an imaging device (not shown) of a CCD (charge coupled device) or the like. The binary signal train representing white or black is output to a signal line 8a.

An encoding circuit 10 receives data output to the signal line 8a and outputs MH (modified Huffman) or MR (modified read) encoded data to a signal line 10a.

A memory circuit 12 stores data output to the signal line 10a. This facsimile apparatus requires a memory for at least one block so as to retransmit a frame in which an error has occurred after the transmission of a plurality of frames as one block at a time. When a frame number to be transmitted is being output to a signal line 34c, this memory circuit 12 outputs information of that frame to a signal line 12a. In addition, when a frame number is output to a signal line 34h, the memory circuit 12 outputs the number of lines included in that frame to a signal line 12b.

An HDLC formatting circuit 14 adds an address field, a control field, a facsimile control field (FCF), and a facsimile information field (FIF) (where the frame number presently being transmitted is stored), and HDLC formatted information to a signal line 14a. When a signal with a signal level "0" is being output to a signal line 34d, this HDLC formatting circuit 14 outputs a flag for effecting flow control on the transmitter side to the signal line 14a.

A modulator 16 effects modulation on the basis of the known CCITT recommendation V27ter (differential phase modulation) or V29 (orthogonal modulation). This modulator 16 effects modulation by receiving as its input a signal on the signal line 14a, and outputs modulated data to a signal line 16a.

A modulator 18 effects modulation on the basis of the known CCITT recommendation V21. This modulator 18 effects modulation by receiving as its input a procedure signal on a signal line 34b, and outputs modulated data to a signal line 18a.

An adding circuit 20 receives, as its input, signals on the signal line 16a and the signal line 18a, and outputs the added result to a signal line 20a.

A demodulator 22 effects demodulation on the basis of the known CCITT recommendation V21. This demodulator 22 effects demodulation by receiving as its input a signal on the signal line 6a, and outputs demodulated data to a signal line 22a.

A demodulator 24 effects demodulation on the basis of the known CCITT recommendation V27ter (differential phase modulation) or V29 (orthogonal modulation). This demodulator 24 effects demodulation by receiving as its input a signal on the signal line 6a, and outputs demodulated data to a signal line 24a.

A circuit 26 receives, as its input, demodulated data output to the signal line 24a, effects zero delete of HDLC formatted data, and outputs data before HDLC formatting to a signal line 26a. When reception of one frame is completed, this circuit 26 generates a pulse on a signal line 26b. When it is possible to properly receive one frame when the pulse is generated on the signal line 26b, the circuit 26 outputs a signal of a signal level "1" to a signal line 26c, and outputs a frame number to a signal line 26d. On the contrary, if one frame is not received properly when the pulse is generated on the signal line 26b, the circuit 26 outputs a signal of the signal level "0" to the signal line 26c.

A memory circuit 28 receives, as its input, encoded image information output to the signal line 26a, and stores encoded data. When a pulse representing that the end of a frame has been detected occurs on the signal line 26b, this memory circuit 28 receives information on the signal line 26c (information on whether or not reception has been effected properly) as its input. Then, when reception has been effected properly, the memory circuit 28 checks a frame number included in the video signal, and stores image information in a corresponding memory area. When a frame number is being output to a signal line 34e, this memory circuit 28 outputs that frame data to a signal line 28a.

A decoding circuit 30 receives, as its input, demodulated data output to the signal line 28a, and outputs MH (modified Huffman) decoded or MR (modified read) decoded data to a signal line 30a.

When a signal "1" is being output to a signal line 34f, an image reproducing circuit 32 receives as its input a signal output to the signal line 30a, and sequentially reproduces an image for each line. In addition, when a signal "2" is being output to the signal line 34f, this image reproducing circuit 32 makes visible unique information (e.g. a black-and-white alternating pattern) which represents that errors have occurred by the number of lines output to a signal line 34g. Furthermore, when a signal "0" is being output to the signal line 34f, the image reproducing circuit 32 does not effect reproduction of an image.

A control circuit 34 effects control of the facsimile apparatus. This control circuit 34 is constituted by a microcomputer and peripheral equipment of a microcomputer, such as a ROM (read-only memory) having a control program and a RAM (random-access memory).

Figure 4:
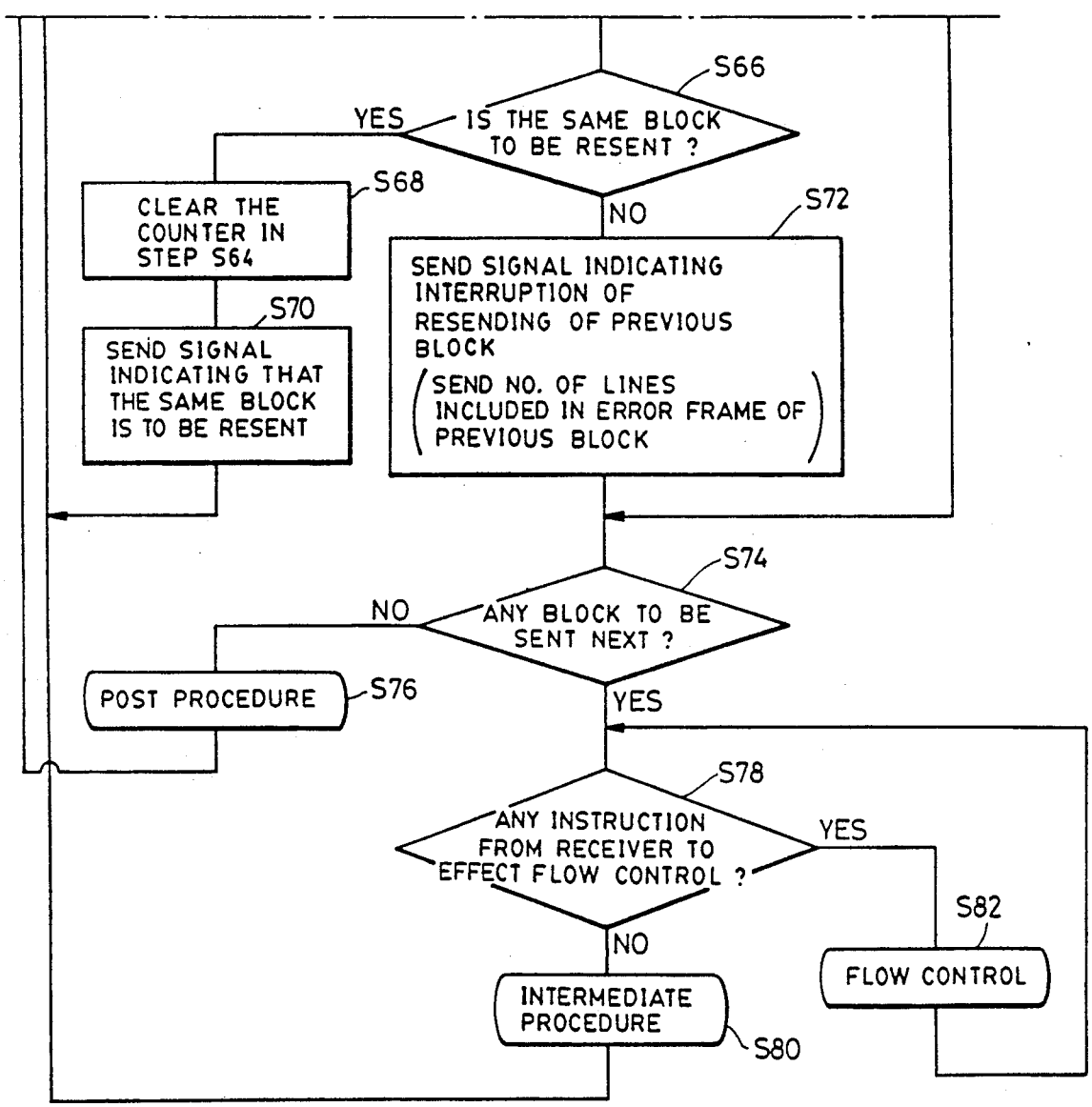
FIG. 4 is a flowchart illustrating the operation of transmission control in accordance with the first embodiment.

FIG. 4 is a flowchart illustrating the procedure of transmission control which is executed by the above-described control circuit 34.

In FIG. 4, Step S40 represents a "processing start".

In Step S42, the signal of a signal level "0" is output to the signal line 34a, and the telephone line is connected to the telephone (CML off).

In Step S44, a determination is made as to whether or not facsimile transmission has been selected. If facsimile transmission has been selected, the operation proceeds to Step S48. When facsimile transmission has not been selected, the operation proceeds to Step S46.

In Step S46, the subsequent processing is executed, such as facsimile reception, copy processing, or the like.

In Step S48, a signal of a signal level "1" is output to the signal line 34a, and the telephone line is connected to this facsimile apparatus (CML on).

In Step S50, a preliminary procedure is executed. The preliminary procedure is a procedure up until the reception of a CFR signal in FIG. 1(1).

In Step S52, a determination is made as to whether or not transmission in the error retransmission mode has been selected. If transmission in the error retransmission mode has been selected, the operation proceeds to Step S58. Meanwhile, if transmission in the error retransmission mode has not been selected, the operation proceeds to Step S54.

In Step S54, the transmission of video signals which is not in the error retransmission mode is effected.

In Step S56, a post procedure is executed.

In Step S58, transmission of video signals in the error retransmission mode is effected.

In Step 60, a procedure signal representing a division of one block is transmitted.

In Step 62, the procedure signal sent from the receiver is input, and a determination is made as to whether or not there is any error frame. If there is an error frame, the operation proceeds to Step S64. In addition, if there is no error frame, the operation proceeds to Step S74.

In Step S64, a determination is made as to whether or not a signal representing "error frame present" has been received four times with respect to one transmitted block. If a signal representing "error frame present" has been received four times with respect to one transmitted block, the operation proceeds to Step S66. In addition, if the signal representing "error frame present" has not been received four times with respect to one transmitted block, the operation proceeds to Step S58 and effects retransmission of the error frame.

In Step S66, a determination is made as to whether or not the same block is to be retransmitted. If the same block is to be retransmitted, the operation proceeds to Step S68. On the other hand, if the same block is not to be retransmitted, the operation proceeds to Step S72.

In Step S68, the counter in Step S64 is cleared.

In Step S70, a signal representing that an image having an error frame in the same block is to be retransmitted is sent.

In Step S72, a procedure signal representing the discontinuation of retransmission of the previous block is transmitted. At this time, with regard to an error frame of the previous block, the transmitter informs the receiver of the number of lines included in that error frame by means of a procedure signal.

In Step S74, a determination is made as to whether or not there is any block to be transmitted next. If there is a block to be transmitted next, the operation proceeds to Step S78. On the other hand, if there is no block to be transmitted next, the operation proceeds to Step S76.

In Step S76, a post procedure is executed.

In Step S78, a determination is made as to whether or not an instruction for flow control (control for adjusting the speed between the transmitter and the receiver) has been given by the receiver. If the instruction for flow control has been given, the operation proceeds to Step S82, and, if the instruction for flow control has not been given, the operation proceeds to Step S80.

In Step S80, an intermediate procedure is executed.

In Step S82, flow control is effected.

Figure 5B:
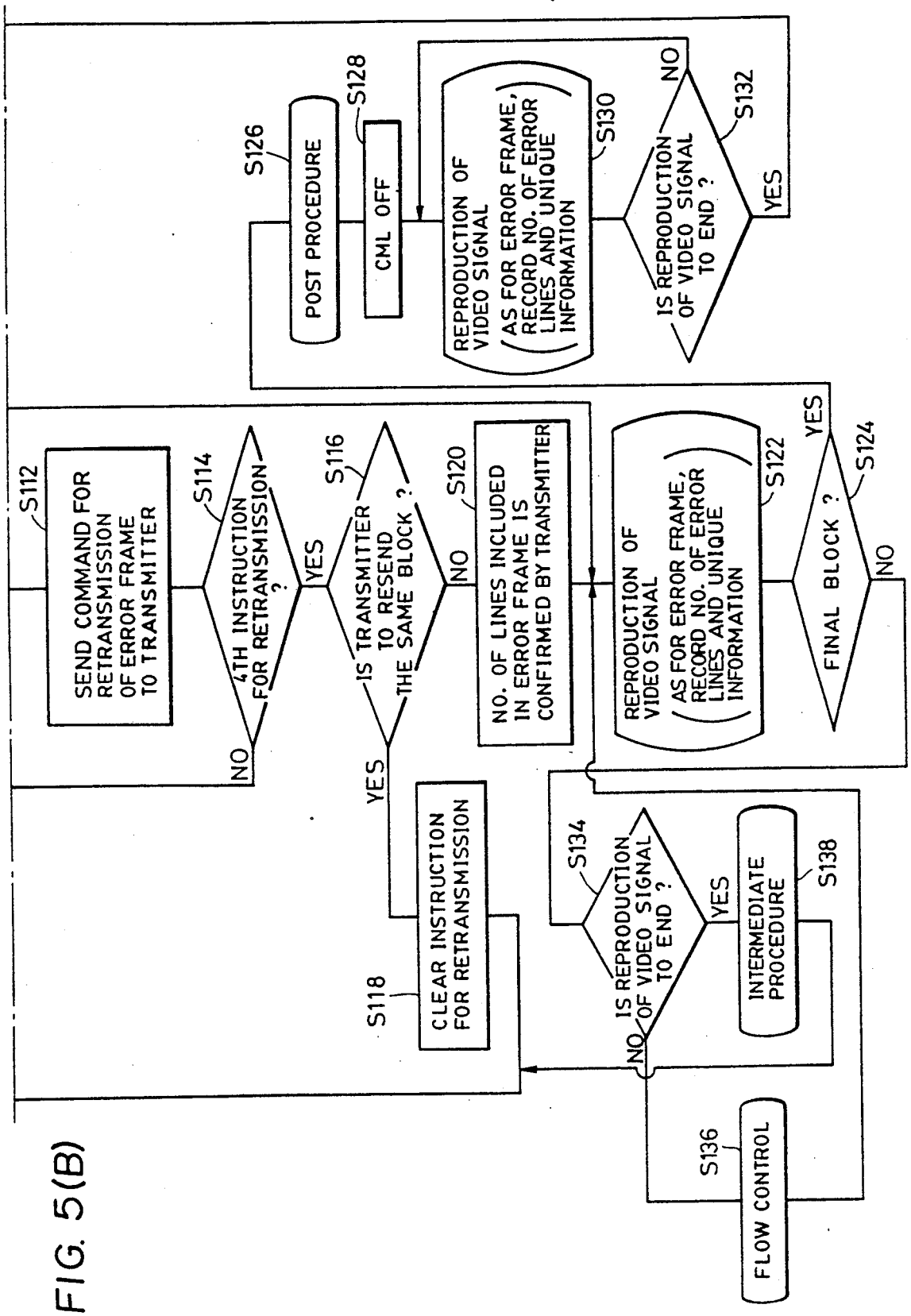
FIG. 5 is a flowchart illustrating the operation of reception control in accordance with the first embodiment.

FIG. 5 is a flowchart illustrating a procedure of reception control executed by the control circuit 34 shown in FIG. 3.

In FIG. 4, Step S90 represents a processing start.

In Step S92, a signal of a signal level "0" is output to the signal line 34a, and the telephone line is connected to the telephone (CML off).

In Step S94, a determination is made as to whether or not facsimile reception has been selected. If facsimile reception has been selected, the operation proceeds to Step S98. On the other hand, if facsimile reception has not been selected, the operation proceeds to Step S96.

In Step S96, the other processing is carried out.

In Step S98, a signal of a signal level "1" is output to the signal line 34a, and the telephone line is connected to the facsimile apparatus (CML on).

In Step S100, a preliminary procedure is effected.

In Step S102, a determination is made as to whether or not the error retransmission mode has been selected. If the error retransmission mode has been selected, the operation proceeds to Step S108. On the other hand, if the error retransmission mode has not been selected, the operation proceeds to Step S104.

In Step 104, the reception of video signals is effected without using the error retransmission mode.

In Step S106, a post procedure is executed.

In Step S108, the reception of video signals is carried out in the error retransmission mode.

In Step S110, a determination is made as to whether or not there has been any error frame. If YES is the answer, the operation proceeds to Step S112, and, if NO is the answer, the operation proceeds to Step S122.

In Step S112, a signal instructing the retransmission of the error frame is sent to the transmitter.

In Step S114, a determination is made as to whether or not the signal represents a fourth instruction for retransmission. If the signal does not represent the fourth instruction for retransmission, retransmission of an error frame is carried out by the transmitter, so that the operation proceeds to Step S108. On the other hand, if the signal represents the fourth instruction for retransmission, the transmitter sends a procedure signal which represents either retransmission of the block just sent or discontinuation of the retransmission of the block just sent and transmission of an ensuing block, if any. Hence, the operation proceeds to Step S116.

In Step S116, a determination is made as to whether or not an instruction for effecting retransmission of the block just sent has been given by the transmitter. If there has been the instruction to perform retransmission of the block from the transmitter, after a response signal is sent, the operation proceeds to Step S118. On the other hand, if there has been an instruction from the transmitter to discontinue the retransmission of the block and to transmit an ensuing block, if any, a response signal is sent and the operation then proceeds to Step S120.

In Step S118, the retransmission instructing counter which serves as the basis of the determination in Step S114 is cleared.

In Step S120, the receiver is informed by the transmitter of the number of lines included in the error frame just sent.

In Step S122, the image is reproduced. At this time, with respect to a frame which is free of an error, a signal "1" is output to the signal line 34f, and, at the same time, a frame number is output to the signal line 34e to sequentially reproduce the image. On the other hand, with respect to an error frame, a signal "2" is output to the signal line 34f, and, at the same time, the "number of lines included in the error frame" sent from the transmitter is sent to the signal line 34g. Thus, with respect to an error frame, the "portion of the number of lines included in the error frame" is made visible as unique information (e.g. a black-and-white alternating pattern).

In Step S124, a determination is made as to whether or not the block is a final block. If it is a final block, the operation proceeds to Step S126. On the other hand, if it is not a final block, the operation proceeds to Step S134.

In Step S126, a post procedure is executed.

In Step S128, a signal of a signal level "0" is output, and the telephone line is connected to the telephone (CML off).

In Step S130, the image is reproduced. This step is similar to Step S122, and with respect to an error frame, unique information is made visible by a portion of the number of lines informed by the transmitter.

In Step S132, a determination is made as to whether or not the image reproduction has been completed. If the image reproduction has been completed, the operation proceeds to Step S94. If the image reproduction has not been completed, the operation proceeds to Step S130.

In Step S134, a determination is made as to whether or not the image reproduction has been completed. If the image reproduction has been completed, the operation proceeds to Step S138. If the reproduction has not been completed, the operation proceeds to Step S136.

In Step S136, flow control is effected to adjust the speed between the transmitter and the receiver.

In Step S138, an intermediate procedure is executed. Although, in the above-described embodiment, a black-and-white alternating pattern is used as unique information representing error information, the present invention is not restricted to the same, and another pattern (e.g. a character "error") may be made visible.

In addition, on the receiver side, the result of receiving the image signal is recorded in the form of a communication management report or the like; but since the number of lines which are in error can be ascertained accurately, the determination of a received image can be effected accurately.

As has been described above, in the first embodiment, when error image data cannot be corrected despite the error retransmission, a specific pattern corresponding to an amount of the error data can be made visible on a display, so that it becomes possible to accurately ascertain an amount of error data corresponding to the density of the transmitted image concerned. In addition, this makes it possible to accurately determine the relative quality of the received image.

Although, in the above-described embodiment, information on the amount of error image data is imparted from the transmission side to the reception side, it is also possible to provide an arrangement in which the amount of error data is estimated on the reception side.

As a second embodiment of the present invention, a description will be given hereafter of a case where an amount of error data is estimated on the reception side, and and information indicating an amount of that data is displayed.

Figure 6:
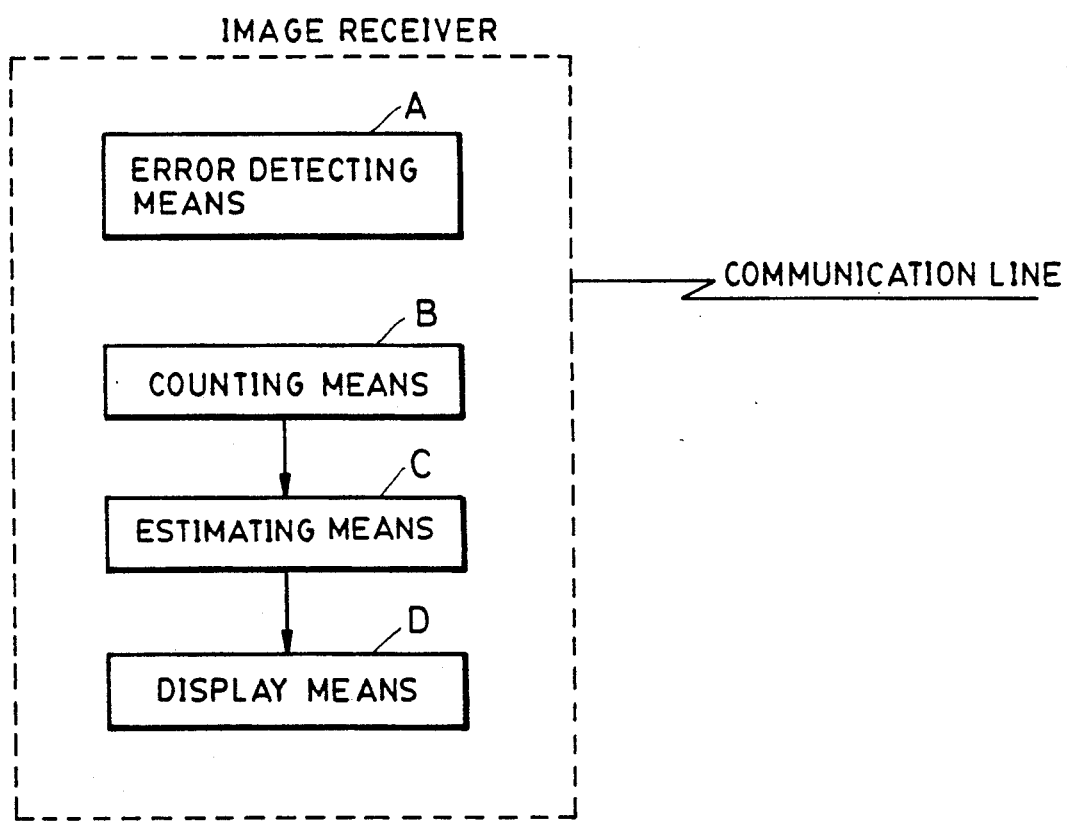
FIG. 6 is a block diagram illustrating the functions of a second embodiment of the present invention.

FIG. 6 is a block diagram of the functions of an image receiver in accordance with the second embodiment. As shown in FIG. 6, an image receiver having error detecting means A is provided with the following: counting means B for counting an amount of image data of an image adjacent to the error image concerned when image data from the transmitter is present; estimating means C for estimating an amount of image data of the error image; and display means or displaying a specific pattern corresponding to an output of the estimating means.

In the second embodiment, if a received error cannot be rectified and an error frame still remains even after retransmission is effected by the transmitter a predetermined number of times, e.g. three times, selection is carried out on the receiver side as to whether retransmission of that frame is to be continued, or retransmission of that frame is discontinued and an ensuing block is to be transmitted. At this time, if the transmitter discontinues the retransmission of the error frame, the receiver estimates the number of lines contained in the error frame concerned (e.g. adds the number of lines of each frame immediately preceding and following the error frame concerned and divides the result by "2"), and makes visible unique information (e.g. a black-and-white alternating pattern) representing that reception errors have occurred by the estimated number of lines.

FIG. 7 is a block diagram illustrating the configuration of the facsimile apparatus in accordance with the second embodiment. In FIG. 7, components denoted by the same reference numerals as those shown in FIG. 3 are the same as those shown in FIG. 3, and a description thereof will be omitted. Incidentally, a control circuit 34-1 is constituted by a microcomputer and peripheral equipment of a microcomputer such as a ROM, a RAM, and the like, in the same way as the control circuit 34 shown in FIG. 3. However, a control program stored in the ROM differs from that of the control circuit 34 of FIG. 3.

A memory circuit 12-1 stores data output to the signal line 10a. This facsimile apparatus requires a memory for at least one block so as to retransmit a frame in which an error has occurred after the transmission of a plurality of frames as one block at a time. When a frame number to be transmitted is being output to a signal line 34c, this memory circuit 12-1 outputs information of that frame to a signal line 12a.

A circuit 26-1 receives, as its input, demodulated data output to the signal line 24a, effects zero delete of HDLC formatted data, and outputs data before HDLC formatting to a signal line 26a. When reception of one frame is completed, this circuit 26-1 generates a pulse in a signal line 26c. When it is possible to properly receive one frame when the pulse is generated in the signal line 26c, the circuit 26-1 outputs a signal of a signal level "1" to a signal line 26b. On the contrary, if one frame is not being received properly, the circuit 26 outputs a signal of the signal level "0" to the signal line 26b.

A memory circuit 28-1 receives, as its input, encoded image information output to the signal line 26a, and stores encoded data. When a pulse representing that the end of a frame has been detected occurs in the signal line 26c, this memory circuit 28-1 receives information of the signal line 26b (information on whether or not reception has been effected properly) as its input. Then, when reception has been effected properly, the memory circuit 28-1 checks a frame number included in the video signal, and stores image information in a corresponding memory area. When a frame number is being output to a signal line 34e, this memory circuit 28-1 outputs that frame data to a signal line 28a.

A decoding circuit 30-1 receives, as its input, demodulated data output to the signal line 28a when "2" is being output to a signl line 34h, and outputs MH (modified Huffman) decoded or MR (modified read) decoded data to a signal line 30a. In addition, when a signal "1" is being output to the signal line 34h, the decoding circuit 30-1 counts the number of lines of the frame being output to the signal line 28a, and outputs that result to a signal line 31b. This decoding circuit 301 does not effect decoding when "0" is being output to the signal line 34h.

Figure 8A:
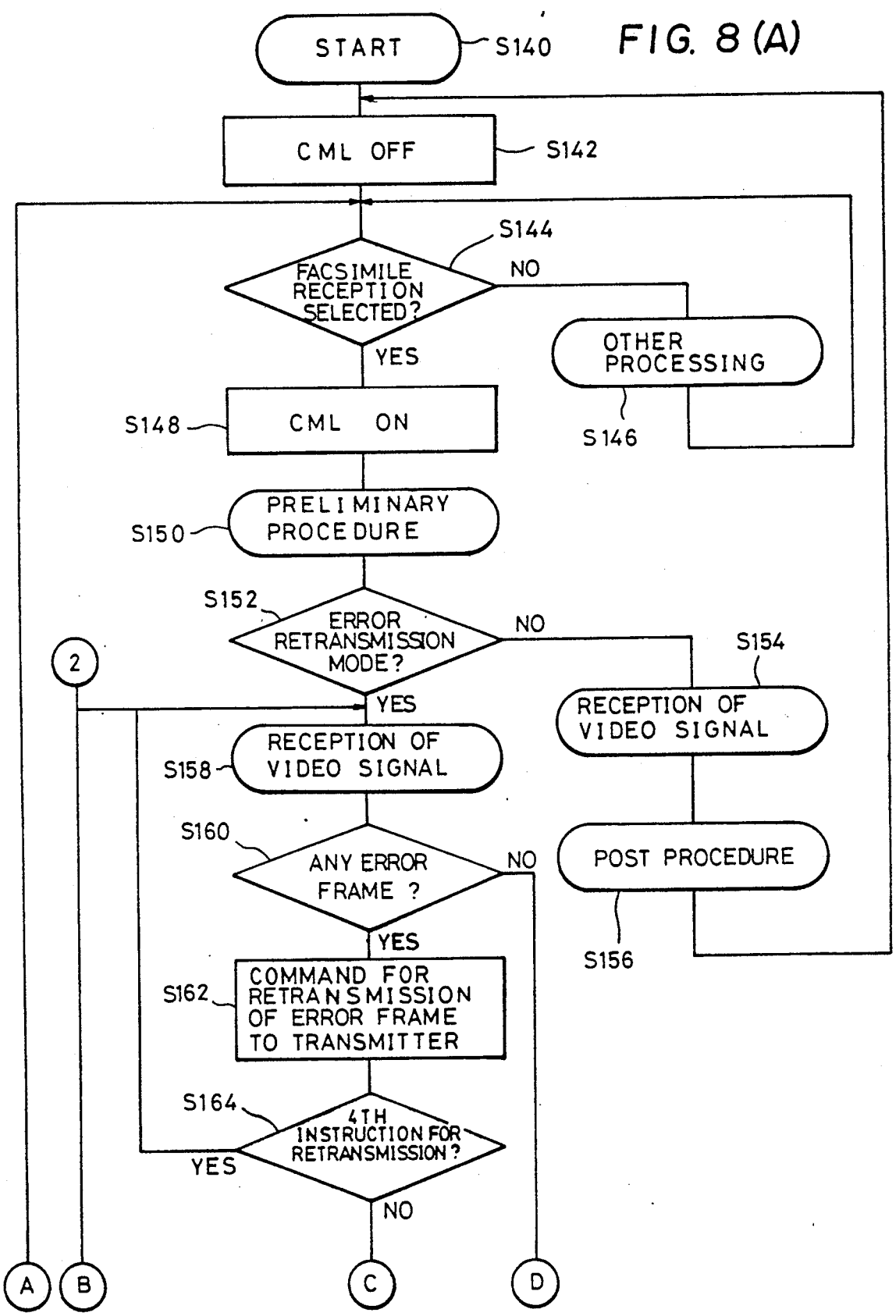

FIGS. 8(A) and 8(B) are flowcharts illustrating the procedure of control executed by the control circuit 34-1.

Step S140 represents a "processing start".

In Step S142, the signal of a signal level "0" is output to the signal line 34a, and the telephone line is connected to the telephone (CML off).

In Step S144, a determination is made as to whether or not facsimile transmission has been selected. If facsimile transmission has been selected, the operation proceeds to Step S148. When facsimile transmission has not been selected, the operation proceeds to Step S146.

In Step S146, the subsequent processing is executed, such as facsimile reception, copy processing or the like.

In Step S148, a signal of a signal level "1" is output to the signal line 34a, and the telephone line is connected to this facsimile apparatus (CML on).

In Step S150, a preliminary procedure is executed.

In Step S152, a determination is made as to whether or not transmission in the error retransmission mode has been selected. If transmission in the error retransmission mode has been selected, the operation proceeds to Step S158. Meanwhile, if transmission in the error retransmission mode has not been selected, the operation proceeds to Step S154.

In Step S154, reception of video signals which is not in the error retransmission mode is effected.

In Step S156, a post procedure is executed.

In Step S158, reception of video signals in the error retransmission mode is effected.

In Step S160, a determination is made as whether or not there has been any error frame. If there has been an error frame, the operation proceeds to Step S162, and if there has been no error frame, the operation proceeds to Step S172.

In Step S162, an instruction for retransmission of an error frame (transmission of the PPR signal shown in FIG. 1 (4)) is given to the transmitter.

In Step S164, a determination is made as to whether or not it is a fourth request for retransmission. When it is not a fourth request for retransmission, the error frame is retransmitted by the transmitter, so that the operation proceeds to Step S158. On the other hand, if it is the fourth request for retransmission, the transmitter sends a procedure signal (the CTC signal shown in FIG. 1(3) or the EOR-NULL signal shown in FIG. 1(4)) representing either (1) "retransmitting the block just sent" or (2) "discontinuing retransmission of the block just sent and transmitting an ensuing block, if any", so that the operation proceeds to Step S166.

In Step S166, a determination is made as to whether or not there has been the instruction for "retransmitting the block just sent". If the instruction for "retransmitting the block just sent" has been given by the transmitter (if the CTC signal has been received), a response signal (the CTR signal shown in FIG. 1(3)) is transmitted, and the operation then proceeds to Step S168. On the other hand, if there has been the instruction from the transmitter for "discontinuing the retransmission of the block just sent and transmitting an ensuing block, if any" (if the EOR-NULL signal has been received), a response signal (the ERR signal shown in FIG. 1(4)) is transmitted, and the operation then proceeds to Step S170.

In Step S168, the counter for requesting retransmission in Step S164 is cleared.

In Step 170, the number of lines of the error frame concerned is estimated by adding the number of lines of each frame immediately preceding and following the error frame and by dividing the value by "2". Specifically, the signal "1" is output to the signal line 34h, and information of the number of the frame immediately preceding the error frame concerned is then output to the signal line 34e, and information on the number of lines output to the signal line 31b is input to the control circuit 34-1. Subsequently, information on the number of the frame immediately following the error frame concerned is output to the signal line 34e, and information on the number of lines output to the signal line 31b is input to the control circuit 34-1. The number of lines thus obtained (the number of lines in each frame immediately preceding and following the error frame) are added, and a value in which the added result is divided by "2" is estimated as being the number of lines of the error frame concerned.

In Step S172, the reproduction of video signals (visualization) is carried out. At this time, with respect to a frame in which an error has not occurred, the signal "2" is output to the signal line 34h, the signal "1" to the signal line 34f, and frame number information to the signal line 34, and these are sequentially visualized. When an error frame has occurred, the signal "2" is output to the signal line 34f, and information on the estimated number of lines is output to the signal line 34g. Thus, when an error frame has occurred, unique information (e.g. a black-and-white alernating pattern) corresponding to the estimated number of lines is made visible.

In Step S174, a determination is as to whether or not it is a final block. If it is the final block, the operation proceeds to Step S176. On the other hand, if it is not a final block, the operation proceeds to Step S184.

In Step S176, a post procedure is executed.

In Step S178, a signal of a signal level "0" is output to the signal line 34a, and the telephone line is returned to the telephone (CML off).

In Step S180, video signals are reproduced (visualized). At this time, if an error frame has occurred, unique information corresponding to the estimated number of lines is visualized.

In Step S182, a determination is made as to whether or not the reproduction of video signals (visualization) has been completed. If reproduction of video signals has been completed, the operation returns to Step S144. On the other hand, if reproduction of video signals has not been completed, the operation proceeds to Step S180.

In Step S184, a determination is made as to whether or not reproduction of video signals has been completed. If reproduction of video signals has been completed, the operation proceeds to Step S188. On the other hand, if reproduction of video signals has not been completed, the operation proceeds to Step S186.

In Step S186, flow control is effected for adjusting the speed between the transmitter and the receiver.

In Step S188, an intermediate procedure is executed.

It should be noted that although, in the above-described embodiment, the number of error lines is estimated by the average number of lines in each frame immediately preceding and following the error frame, it is possible to employ another method of estimation (e.g. a weighted average method).

In addition, although a black-and-white alternating pattern is used as unique information representing error information, the present invention is not restricted to the same as in the case of the first embodiment, and another pattern (e.g. a character "error") may be visualized.

Furthermore, even in a case where the error retransmission request function is not provided, this second embodiment can be applied if an error detecting function is provided.

As described above, in the second embodiment, when the error image data has been detected, a specific pattern corresponding to the amount of that error data can be visualized on a display, so that it becomes possible to accurately ascertain the amount of error data corresponding to the density of the transmitted image concerned.

In the foregoing first and second embodiments, information representing the amount of error image data is displayed. However, there are cases where properly received image data is included in the image data of an error frame.

Therefore, as a third embodiment of the present invention, a description will be given of a case where proper image data in the error frame is reproduced and recorded so that all the data in the error frame received will not be wasted.

Figure 9:
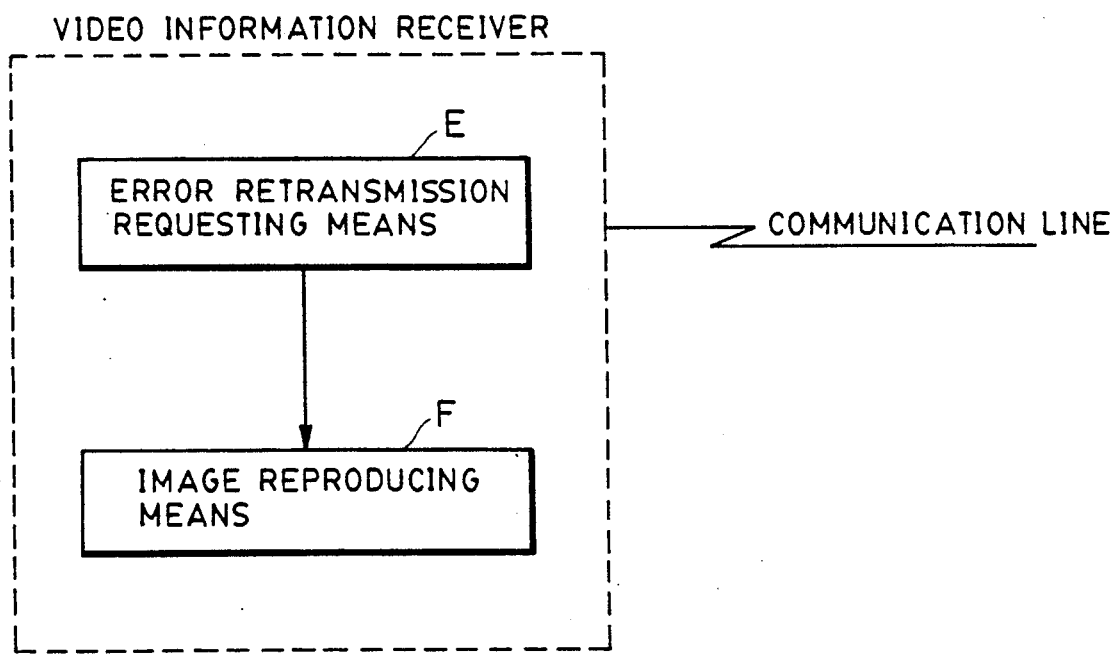
FIG. 9 is a block diagram illustrating the functions of a third embodiment of the present invention.

FIG. 9 is a block diagram of functions in accordance with the third embodiment. As shown in the drawing, when there has been an error in image information received, an apparatus for receiving image information in accordance with the HDLC procedure is provided with means for making a request for retransmission of the error to the transmitter and means for reproducing the correctly received image information component of the image information concerned if the reception error is not rectified after an error retransmission request has been made a predetermined number of times.

In the third embodiment, data is first stored in a temporary buffer, and, when data of one frame has been received properly, the number of that frame concerned is identified, and the data is retransmitted to a corresponding image memory space. In addition, the image reproduction operation is carried out sequentially as long as the image data is being received continuously and properly. On the other hand, if an error is detected in a CRC check (frame check), that frame data is stored in a temporary buffer, and that data is retransmitted to a corresponding image memory space. This is the characteristic feature of this embodiment, and even if an error frame remains till the end, that frame can be reproduced through decoding. As a result, when the amount of error contained in the frame data is small, it becomes possible to reproduce (visualize) a major portion of the line information.

Figures 10, 10A:
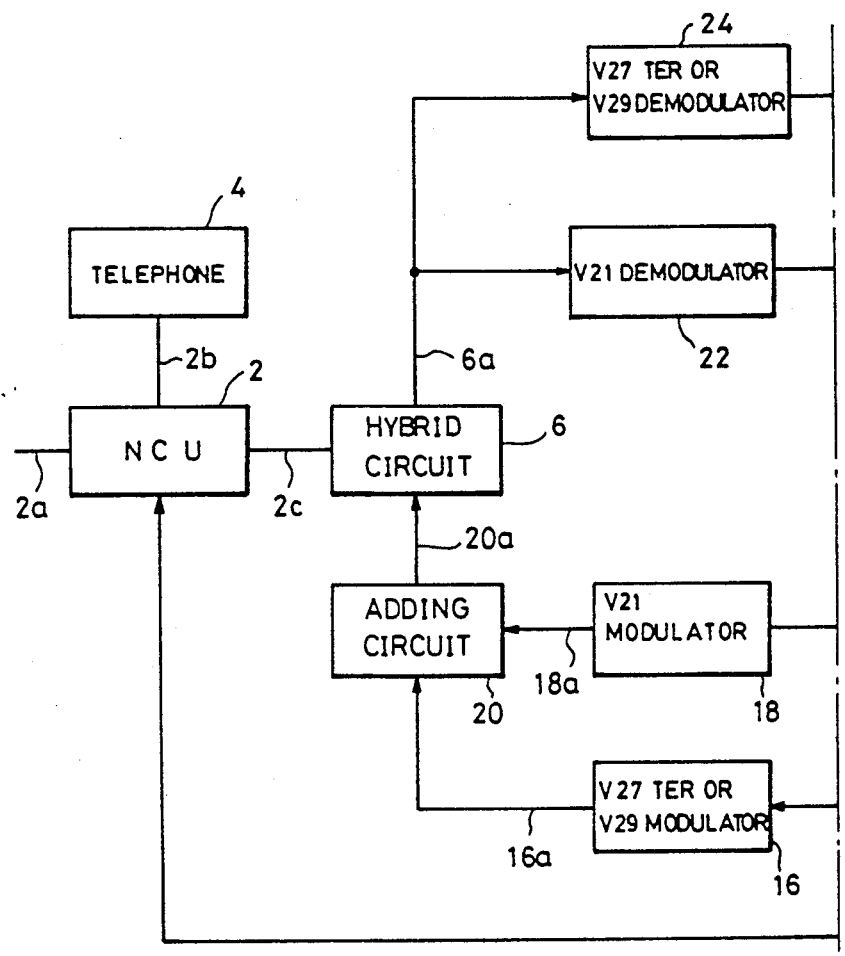
FIG. 10 is a block diagram illustrating the configuration of a facsimile apparatus in accordance with the third embodiment.
Figure 10B:
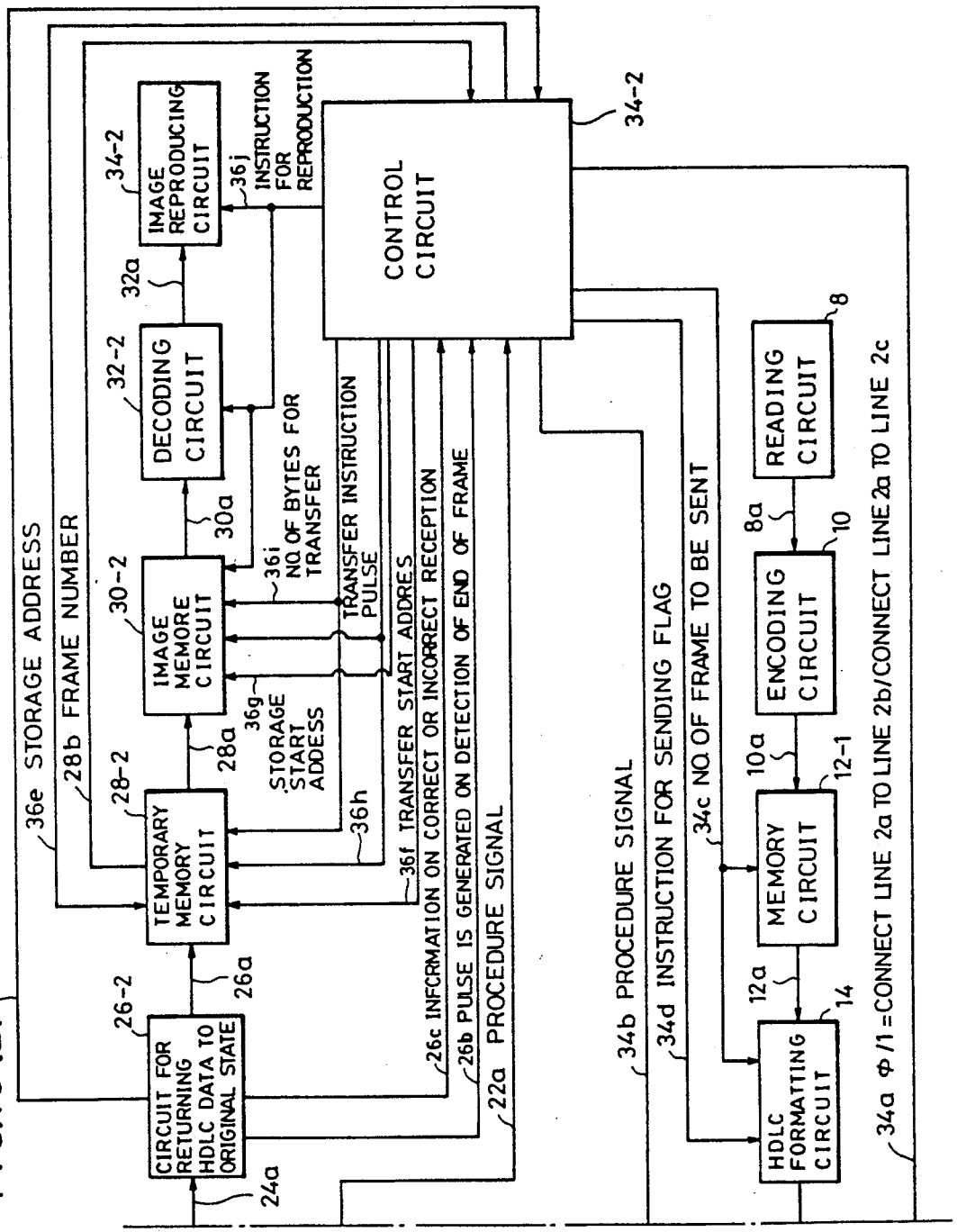

FIG. 10 is a block diagram illustrating the configuration of the facsimile apparatus in accordance with the third embodiment. In FIG. 10, components denoted by the same reference numerals as those shown in FIG. 3 are the same as those described in FIG. 3, and a description thereof will be omitted here. In addition, a control circuit 34-2 shown in FIG. 10 is also constituted by a microcomputer and the like, but its control program differs from that of the control circuit 34.

In FIG. 10, a circuit 26-2 receives, as its input, demodulated data output to the signal line 24a, effects zero delete of HDLC formatted data, and outputs data before HDLC formatting to the signal line 26a. When reception of one frame is completed, this circuit 26-2 generates a pulse in the signal line 26b. When it is possible to properly receive one frame, the circuit 26 outputs a signal of a signal level "1" to a signal line 26c. On the contrary, if one frame is not received properly when the pulse is generated in the signal 26b, the circuit 26-2 outputs a signal of the signal level "0" to the signal line 26c. This circuit 26-2 outputs a pulse to the signal line 26d each time when one-byte data is output to the signal line 26a.

A temporary memory circuit 28-2 temporarily stores encoded image information output to the signal line 26a. This memory circuit 28-2 is constituted by a temporary buffer 0 and a temporary buffer 1 (neither is shown), which are respectively provided with a memory space of, for instance, 512 bytes. These temporary buffers 0 and 1 store data of one frame sent from the other end of communication. The data length of one frame is 256+4 (four bytes for A, C, FCF, and frame number are added) bytes at maximum. When data is being stored in one temporary buffer (data is being input from the signal line 26a), data is output from the other temporary buffer (data is output from the signal line 28a). Here, the start address of the temporary buffer 0 is named TEMPBF0SFSTA, and the start address of the temporary buffer 1 is named TEMPBF1SFSTA. Received data is stored alternately in the temporary buffer 0 and the temporary buffer 1.

An image memory circuit 30-2 has a memory space for storing the data of at least one block. A description will be given later of a means for storing the data temporarily stored in the temporary memory circuit 28-2 in the image memory circuit 30-2. When a signal of a signal level "1" is being output to a signal line 36j, this image memory circuit 30-2 sequentially outputs information on the one block stored in the memory to the signal line 30a.

A decoding circuit 32-2 is arranged such that, when the signal with the signal level "1" is being output to the signal line 36j, the decoding circuit 32-2 receives as its input the demodulated data output to the signal line 30a and outputs MH (modified Huffman) decoded or MR (modified read) decoded data to the signal line 32a.

An image reproducing (visualizing) circuit 34-2 is arranged such that, when the signal of the signal level "1" is being output to the signal line 36j, the image reproducing circuit 34-2 receives as its input a signal being output to the signal line 32a, and sequentially effects recording for each line.

A control circuit 34-2 effects control, as shown FIGS. 11(A) to 11(C) and FIG. 12. To store data in the aforementioned temporary buffers 0 and 1, this control circuit 34-2 outputs the aforementioned TEMPBF0SFSTA or TEMPBF1SFSTA as a storage address to the signal line 36e. When one-byte data has been received (i.e., when a pulse is generated in the signal line 26d), the data output to the signal line 26a is input to the temporary memory circuit 28-2, and is stored in the storage address concerned. Then, the control circuit 34-2 sequentially increments the storage address by 1. At this time, the control circuit 34-2 constantly conducts a check to ensure that the amount of data does not exceed the amount of data of one frame (the data of image information is 64 bytes or 256 bytes, plus four bytes for A, C, FCF, and frame number as additional information).

When reception of one-frame data has been completed, a check is conducted as to whether or not the data has been received properly, and when it has been received properly, the value of the frame number is checked. The frame number is stored in the fourth byte in the received data of one frame, and this information is output to the signal line 28b. In addition, the control circuit 34-2 outputs a transfer start address to the signal line 36f. In addition, after supplying a storage start address (output to a signal line 36g) to the image memory circuit 30-2, the control circuit 34-2 outputs the number of transferred bytes to the signal line 36e. Subsequently, a transfer instruction pulse is output to the signal line 36h, and the data stored in the temporary memory circuit 28-2 is transferred to a corresponding image memory space.

If the data has not been received properly (if an error is detected in a CRC check) when reception of one-frame data has been completed, the number of received data contained in that frame is checked, and if it is below a predetermined number of bytes (e.g. 10 bytes), that data is discarded. The reason for doing so is that an error is estimated to occur numerously when a flag is transmitted at the same time. In addition, if the data contained in that frame exceeds a predetermined number of bytes (e.g. 36 bytes or more when the one-frame data is 64 bytes+4 bytes; 132 bytes or more when the one-frame data is 256 bytes+4 bytes), that data is sequentially stored in the image memory circuit 30-2. Incidentally, when that data fails to reach the predetermined number of bytes, the data may or may not be stored in the image memory circuit 30-2 (in this embodiment, the data concerned is discarded).

In addition, when one frame is being received, if the number of frames exceeds the number of data of one frame whose number of data has determined in advance, an operation of changing over the temporary buffer for storage is conducted, and the data for which storage has been completed is transferred to the image memory circuit 30-2.

Thus, the data is temporarily stored in a temporary buffer, and an error-free frame is transferred to a corresponding image memory space. In addition, with respect to an error frame having a predetermined number of bytes or more, the data thereof is stored in a corresponding image memory space. Accordingly, even if an error frame remains till the end, it becomes possible to decode the data of that frame and reproduce (visualize) the same.

FIGS. 11(A) to 11(C) and FIG. 12 are flowcharts illustrating the control procedure to be executed by the control circuit 34-2. Specifically, FIGS. 11(A) to 11(C) show a main routine, while FIG. 12 shows an interrupting routine for storing video signals.

Step S240 represents a "processing start".

In Step S242, a signal of a signal level "0" is output to the signal line 34a, and the telephone line is connected to the telephone, and is set to a state of the so-called "CML (connect modem to line) off".

In Step S244, a determination is made as to whether or not facsimile reception has been selected. If facsimile reception has been selected, the operation proceeds to Step S248. If facsimile reception has not been selected, the operation proceeds to Step S246.

In Step 246, other processing is executed.

In Step 248, a signal of a signal level "1" is output to the signal line 34a, and the telephone line is connected to the facsimile equipment (CML on).

In Step S250, a preliminary procedure is executed.

In Step S252, a determination is made as to whether or not reception in the error retransmission mode has been selected. If reception in the error retransmission mode has been selected, the operation proceeds to Step S258. If reception in the error retransmission mode has not been selected, the operation proceeds to Step S254.

In Step 254, video signals are received without using the error retransmission mode.

In Step S256, a post procedure is executed.

In Step S258, a flag representing whether or not the transmission of the current block is retransmission is set to "0". If the retransmission flag is "0", it means that the transmission of the block is not retransmission, while, if the retransmission flag is "1", it means that the transmission of the block is retransmission.

In Step S260, if a CRC error is found after the reception of one frame has been completed, TRANSFERBYTE used to store the number of bytes received is set to "0".

In Step S262, a counter BYTECOUNT for counting the number of the received bytes included in one frame is set to "0".

In Step S264, "0" is set in a flag TEMPBFI (temporary buffer in) indicating into which temporary buffer the received data is to be stored. When TEMPBFI is "0", the received data is stored in the temporary buffer 0, while, when TEMPBFI is "1", the received data is stored in the temporary buffer 1.

When the temporary buffer becomes full, the data stored in the temporary buffer is transferred to an image memory which is capable of storing one block. However, in Step S266, "0" is set in a flag TEMPBFO (temporary buffer out) indicating the data stored in which of the temporary buffers is to be transferred to the image memory. When TEMPBFO is "0", data is transferred to the image memory when the temporary buffer 0 becomes full, while, when TEMPBFO is 1, data is transferred to the image memory when the temporary buffer 1 becomes full.

In Step S268, a flag TEMPBFOFULL (temporary buffer 0 full) which indicates whether or not the temporary buffer 0 is full (i.e., whether or not data has been stored in the temporary buffer) is set to "0". When TEMPBFOFULL is "0", it means that data has not been stored in the temporary buffer 0, while, when TEMPBFOFULL is "1", it means that data has been stored in the temporary buffer 0.

In Step S270, a TEMPBF1FULL (temporary buffer 1 full) which indicates whether or not the temporary buffer 1 is full (i.e., whether or not data has been stored in the temporary buffer) is set to "0". When TEMPBF1FULL is "0", it means that data has not been stored in the temporary buffer 1, while, when TEMPBF1FULL is "1", it means that data has been stored in the temporary buffer 1.

In Step S271, the start address of the temporary buffer 0 is stored in the contents of MODEMPTR.

In Step S272, a jump address shown in FIG. 12 is set as a jump address of an image signal storage interrupt. This interrupt is executed when the end of a frame is detected (when a pulse is generated in the signal line 26b) and when one-byte data has been input (when a pulse is generated in the signal line 26d).

In Step S274, a LASTFRMDT (last frame detect), which is set to "1" when a signal representing the end of one block is detected, is set to "0".

In Step S276, a determination is made as to whether or not the flag LASTFRMDT is "0" (i.e., whether or not a signal representing the end of one block has been detected). When the flag LASTFRMDT is "0" (i.e., when the signal representing the end of one block has not been detected), the operation proceeds to Step S278. On the other hand, when the flag LASTFRMDT is "1" (i.e., when the signal representing the end of one block has been detected), the operation proceeds to Step S300.

In Step S278, a determination is made as to whether or not TEMPBFO is "0", i.e., whether or not data is then to be transferred from the temporary buffer 0 to the image memory. When TEMPBFO is "0", i.e., when data is then to be transferred from the temporary buffer 0 to the image memory, the operation proceeds to Step S280. When TEMPBFO is "1", i.e., when data is then to be transferred from the temporary buffer 1 to the image memory, the operation proceeds to Step S294.

In Step S280, a determination is made as to whether or not TEMPBF0FULL is "0", i.e., whether or not the temporary buffer 0 is full. If the temporary buffer 0 is not full, the operation proceeds to Step S276. If TEMPBF0FULL is "1", i.e., if the temporary buffer 0 is full, the operation proceeds to Step S282.

In Step S282, TEMPBF0FULL is set to "0".

In Step S282, TEMPBFO is set to "1".

In Step S286, when the storage of one frame is completed, a determination is made as to whether or not there has been a CRC error. If there has been a CRC error, the operation proceeds to Step S288. If there has been no CRC error, the operation proceeds to Step S292.

In Step S288, a determination is made as to whether or not TRANSFERBYTE has a predetermined number of bytes (36 bytes or more when the one-frame data is 64 bytes, or 132 bytes or more when the one-frame data is 256 bytes). When the above-described condition is met, i.e., when the CRC error has occurred, but data of a predetermined number of bytes or more is being received, the operation proceeds to Step S290. When the above-described condition is not met, i.e., when a CRC error has occurred, and data of a predetermined number of bytes or more is not being received, the operation proceeds to Step S276.

In Step S290, data starting with the fifth-byte data stored in the temporary buffer, i.e., a portion in which four bytes are substracted from the number of bytes of TRANSFERBYTE (four is subtracted since four bytes for address, control, FCF, and frame number are included in each frame), is transferred to the image memory (to an address in which "1" is added to the image memory pointer, and thereafter). In addition, the image memory pointer is set to the address in which data is stored last.

In addition, at the time of retransmission, i.e., at the time when the image memory pointer reaches a division of one frame when the retransmission flag is "1", the image memory pointer is then set to a leading address for storing the data to be retransmitted next so as to ensure that the properly received frame data will not be destroyed.

In Step S292, since one-frame data has been received properly, the frame number is checked, and the number of one-frame data (64 types or 256 bytes determined by the preliminary procedure) is transferred from the ensuing data of A, C, FCF, and frame number to a corresponding image memory space. Here, the image memory pointer is set to the address at which data has been stored last.

At the time of retransmission (when the retransmission flag is "1"), the image memory pointer is set to the leading address for storing the frame data to be retransmitted next.

In Step S294, determination is made as to whether or not TEMPBF1FULL is "0", i.e., whether or not the temporary buffer 1 is full. When TEMPBF1FULL is "0", i.e., when the temporary buffer 1 is not full, the operation proceeds to Step S276. When TEMPBF1FULL is "1", i.e., when the temporary buffer 1 is full, the operation proceeds to Step S296.

In Step S296, TEMPBF1FULL is set to "0".

In Step S298, TEMPBF1FULL is set to "1".

In Step S300, a determination is made as to whether or not there has been any error frame. If there has been an error frame, the operation proceeds to Step S302. If there has been no error frame, the operation proceeds to Step S308.

In Step S302, a signal indicating the retransmission of the error frame is sent to the transmitter.

In Step S304, a determination is made as to whether or not it is a fourth instruction for retransmission. If it is not the fourth instruction for retransmission, the error frame is retransmitted from the transmitter, so that the operation proceeds to Step S310. If it is the fourth instruction for retransmission, a procedure signal representing either of "retransmitting from the transmitter the block just sent or discontinuing the retransmission of the block just sent and transmitting an ensuing block, if any" is sent, so the operation proceeds to Step S306.

In Step S306, a determination is made as to whether or not an instruction has been given from the transmitter for effecting the retransmission of the block just sent. If the instruction has been given, a response signal is transmitted, and the operation proceeds to Step S308. If an instruction has been given from the transmitter for "discontinuing the retransmission of the block just sent and transmitting an ensuing block, if any", a response signal is sent, and the operation proceeds to Step S312.

In Step S308, the counter for indicating retransmission, which is determined in Step S304, is cleared.

In Step S310, the retransmission flag is set to "1" so as to store the retransmission block data.

In Step S312, video signals are reproduced (visualized).

In Step S314, a determination is made as to whether or not the block being processed is a final block. If it is a final block, the operation proceeds to Step S316. If it is not a final block, the operation proceeds to Step S326.

In Step S316, a post procedure is executed.

In Step S318, a signal of a signal level "0" is output to the signal line 34a, and the telephone line is connected to the telephone (CML off).

In Step S320, video signals are reproduced (visualized).

In Step S322, a determination is made as to whether or not the reproduction of video signals has been completed. If the reproduction of video signals has been completed, the operation proceeds to Step S242. If the reproduction of video signals has not been completed, the operation proceeds to Step S320.

In Step S324, a determination is made as to whether or not the reproduction of video signals has been completed. If the reproduction of video signals has been completed, the operation proceeds to Step S326. If the reproduction of video signals has not been completed, the operation proceeds to Step S328.

In Step S326, an intermediate procedure is executed.

In Step S328, control is effected for adjusting the speed between the transmitter and the receiver.

In FIG. 12, Step S330 represents the "start" of an interrupt routine for receiving video signals in the error retransmission mode.

In Step 332, a determination is made as to whether or not a final frame has been detected, i.e., whether or not a pulse has been generated in the signal line 26b. If the final frame has been detected, i.e., if a pulse has been generated in the signal line 26b, the operation proceeds to Step S344. If the final frame has not been detected, i.e., if the pulse has not been generated in the signal line 26b, the operation proceeds to Step S334.

In Step S334, one-byte data is stored in an address indicated by MODEMPTR.

In Step S336, the contents of MODEMPTR are incremented by 1.

In Step S338, the value of BYTECOUNT is incremented by 1.

In Step S340, a determination is made as to whether or not, with respect to the value of BYTECOUNT, there are 68 bytes when the one-frame data is 64 bytes, or there are 260 bytes if the one-frame data is 256 bytes. If the above-described condition is met, after the occurrence of a CRC error has been determined, the operation proceeds to Step S350. If the above-described condition has not been met, the operation proceeds to Step S342.

Step S342 indicates a return to the main routine.

In Step S344, a determination is made as to whether or not a signal representing the end of one block has been detected. If the signal representing the end of one block has been detected, the operation proceeds to Step S346. If the signal representing the end of one block has not been detected, the operation proceeds to Step S350.

In Step S346, since the signal representing the end of one block has been detected, the LASTFRMDT flag is set to "1".

Step 348 indicates a return to the main routine.

In Step S350, determination is made as to whether TEMPBFI is "0", i.e., whether or not data has been stored in the temporary buffer 0. When TEMPBFI is "0", i.e., when data has been stored in the temporary buffer 0, the operation proceeds to Step S352. When TEMPBFI is "1", i.e., when data has been stored in the temporary buffer 1, the operation proceeds to Step S358.

In Step S352, TEMPBFI is set to "1" so as to store data in the temporary buffer 1.

In Step S354, since data has been stored in the temporary buffer 0, TEMPBF0FULL is set to "1".

In Step S356, the start address of the temporary buffer 1 is stored in MODEMPTR so as to store data in the temporary buffer 1.

In Step S358, TEMPBFI is set to "0" so as to store data in the temporary buffer 0.

In Step S360, TEMPBF1FULL is set to "1" since data has been stored in the temporary buffer 1.

In Step S362, the start address of the temporary buffer 0 is stored in MODEMPTR so as to store data in the temporary buffer 0.

In Step S364, a determination is made as to whether or not there has been any CRC error. If there has been a CRC error, the operation proceeds to Step S366. If there has been no CRC error, the operation proceeds to Step S368.

In Step S366, the value of BYTECOUNT is stored in TRANSFERBYTE.

In Step S368, BYTECOUNT is set to "0".

Step S370 indicates a return to the main routine.

In the embodment which has been described so far, as an image memory on the receiver side, one having a one-block capacity is used, but an image memory having a two-block capacity may be used instead. In this case, when one-block data is being stored, it is possible to read data from another block and to effect recording (visualization).

In addition, it is possible to provide an arrangement in which recording (visualization) is effected on a real-time basis with respect to an error-free frame.

In accordance with this embodiment, in facsimile apparatus provided with the error retransmission function for transmitting image information subjected to HDLC formatting, if an error frame remains, it becomes possible on the receiver side to store information on the error frame concerned and decode the same and to record (visualize) information on a properly received line as a received image.

Accordingly, although, conventionally, even in a case where an error of one bit is present in a frame, all the information contained in that frame has been handled as an error, according to this embodiment, it becomes possible to record (visualize) the correct line information contained in the error frame. Consequently, if the number of error bits contained in the error frame is small, it becomes possible to reproduce a major portion of the line information contained in that frame.

As described above, in accordance with the third embodiment, since the arrangement is such that correct image information of the image information remaining as an error frame is visualized, if the number of error bits contained in the error frame is small, most image information contained in that frame can be reproduced, thereby making it possible to make effective use of the received information.

As a fourth embodiment of the present invention, a description will now be given of a case where, when a frame transmitted in the error retransmission mode has undergone error, the time duration of sending a flag pattern which is sent immediately before transmission of ensuing image data is extended.

In the fourth embodiment, after transmitting a training signal (Tr) shown in FIG. 1(1), if the transmitter has transmitted a flag for 250 ms and has completed the encoding of data of at least one frame, the the transmitter starts sending video signals. In addition, after the flag has been sent for 250 ms, and the data of at least one frame has not been encoded, the flag is sent until the encoding of one frame is completed. After transmitting the data of one block, the transmitter recognizes the information on an error frame from the receiver. At this time, if the first frame is in error, the flag is sent for one second in the subsequent image transmission (including retransmission) after completion of the transmission of training.

Figure 13:
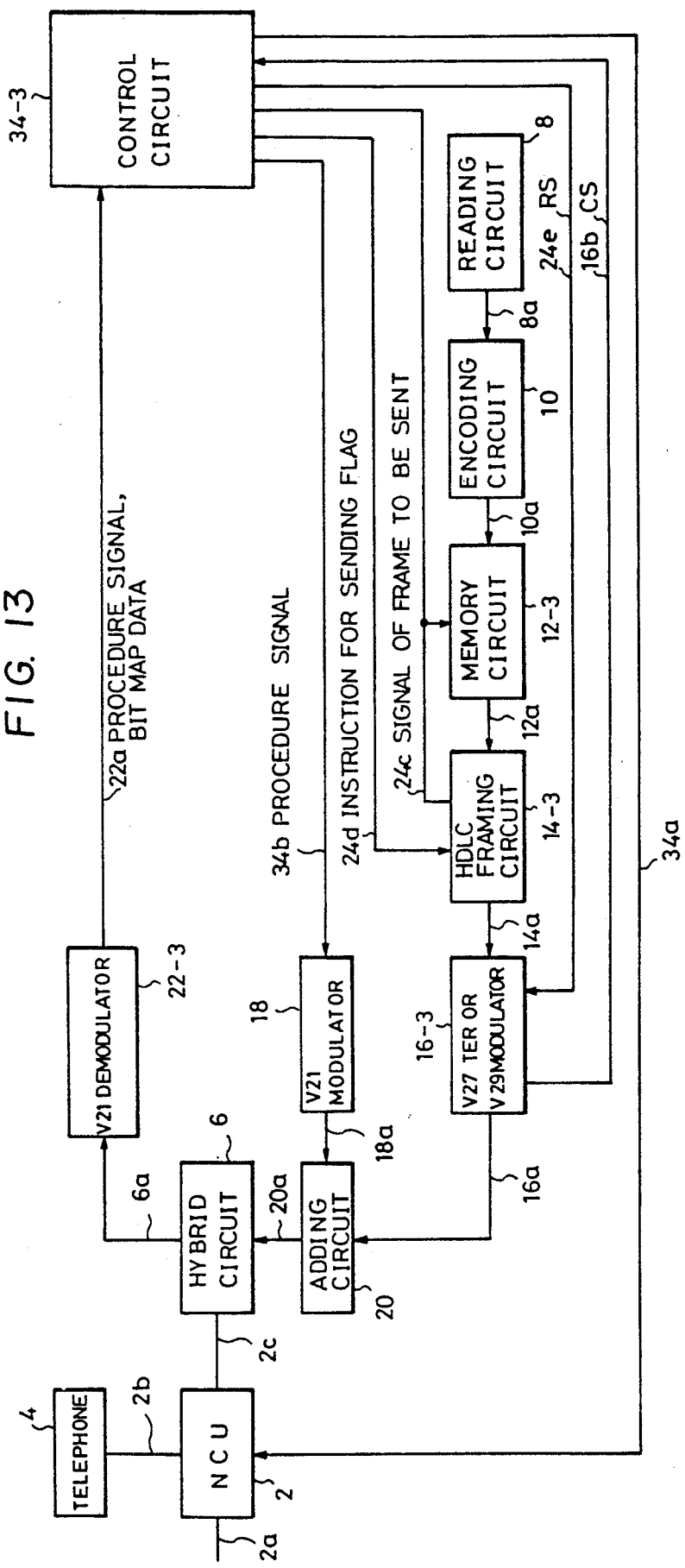
FIG. 13 is a block diagram illustrating the configuration of a facsimile apparatus in accordance with a fourth embodiment of the present invention.

FIG. 13 is a block diagram illustrating the arrangement of the facsimile apparatus in accordance with the fourth embodiment. In FIG. 13, components denoted by the same reference numerals as those shown in FIG. 3 are the same as those described in connection with FIG. 3, and a description thereof will be omitted here. In addition, a control circuit 34-3 is constituted by a microcomputer and the like in the same way as the control circuit 34 shown in FIG. 3, but a control program stored in a ROM differs from that of the control circuit 34.

In FIG. 13, a memory circuit 12-3 stores encoded image data output to the signal line 10a. This facsimile equipment requires a memory for at least one block since an error frame is retransmitted after a plurality of frames have been transmitted as one block at a time. When a frame number sent to the signal line 24c is being output, the memory circuit 12-3 outputs information on that frame to the signal line 12a.

An HDLC framing circuit 14-3 adds the address field, the control field, the FCF field, and the FIF field (where the frame number currently being transmitted is stored) in front of the encoded data being output to the signal line 12a, and outputs to the signal line 14a information in which that information has been subjected to HDLC formatting. When a signal of a signal level "1" is being output to the signal line 24d, the HDLC framing circuit 14-3 outputs a flag for flow control on the transmitter side to the signal line 14a.

A high-speed modulator 16-3 effects modulation of video signals on the basis of the known CCITT recommendation V27ter (differential phase modulation) or V29 (orthogonal modulation). When the level of RS (request for send) of the signal line 24e has become 1, the modulator 16-3 starts transmitting training, and when the transmission of data has become possible, the modulator 16-3 outputs 1 to CS (capable of send) on the signal line 16b. Then, the modulator 16-3 receives a signal of the signal line 14a as its input, effects modulation, and outputs the modulated data to the signal line 16a.

A demodulator 22-3 is a low-speed demodulator for a procedure signal for effecting demodulation based on the known CCITT recommendation V21. The demodulator 22-3 receives a signal of the signal line 6a as its input, effects V21 demodulation, and outputs the demodulated data to the signal line 22a. Bit-map data which indicates which frame has undergone error is also contained in this demodulated data. In the case of a 256-bit frame for one block, bit-map data of 256 bits is used.

A control circuit 34-3 effects control described in the beginning part of this embodiment. A changeover signal 34a is used to control connection of the line to the telephone 4 or the hybrid circuit 6. Reference numeral 34-b denotes a procedure signal transmission line; reference numeral 24-c, a frame number transmission line; and reference numeral 24d, a flag signal transmission line.

FIGS. 14(1) and 14(2) are flowcharts illustrating the operation of control by the control circuit 34-3 shown in the fourth embodiment.

In FIG. 14, Step S420 indicates a start.

In step S422, a signal of a signal level "0" is output to the signal line 34a, and CML is set to off.

In Step S424, after completion of the transmission of a training signal, a memory flag timer for storing the time duration of a flag sent before transmission of video signals is set to 250 ms.

In Step S426, a determination is made as to whether or not facsimile transmission has been selected. If facsimile transmission has been selected, the operation proceeds to Step S430. if facsimile transmission has not been selected, the operation proceeds to Step S428.

Step S428 indicates other processing.

In Step S430, a signal of a signal level "1" is delivered to the signal line 34a, and CML is set to on.

In Step S432, a preliminary procedure is executed.

In Step S434, a determination is made as to whether or not the error retransmission mode has been selected. If the error retransmission mode has been selected, the operation proceeds to Step S440, and, if the error retransmission mode has not been selected, the operation proceeds to Step S436.

In Step S436, normal transmission of video signals, not being the error retransmission, is effected.

In Step S438, a post procedure is executed.

In Step S440, a signal of a signal level "1" is output to the signal line 24e, and sets RS (request for send) of a high-speed modem to 1. When the transmission of high-speed data has been completed, RS is set to 0.

In Step S442, a determination is made as to whether or not CS (capable of send) of the high-speed modem is 1, i.e., whether or not the signal level at the signal line 16b is "1". When the level of CS of the high-speed modem becomes 1, the data transmission becomes possible, so that the operation proceeds to Step S444.

In Step S444, a signal of a signal level "1" is sent to the signal line 24d, and the transmission of the flag is started.

In Step S446, since the control circuit is proved with a built-in timer, the value of the flag timer is set in the timer (set to timer). The value of the flag timer is normally set to 250 ms.

In step S448, the flag continues to be sent until the time over of the Timer.

In Step S450, the flag continues to be sent until the encoding of one frame is completed.

In Step S452, a signal of a signal level "0" is output to the signal line 24d, the transmission of the flag is discontinued, and the transmission of HDLC formatted image data is effected sequentially. At this time, a flag is inserted, as required, and flow control is carried out.

In Step S454, a signal from the receiver is analyzed, and a determination is made as to whether or not there has been any error in the transmitted frame. If there has been no error, the operation proceeds to Step S456, and, if there has been an error, the operation proceeds to Step S462.

In Step S456, a determination is made as to whether or not there is any next block or page. If there is no next block or page, the operation proceeds to Step S458, and if YES is the answer, the operation proceeds to Step S432 if there has been a mode change, and to Step S434 if there has been no mode change.

In Step S458, a signal of a signal level "0" is output to the signal line 34a, and CML is set to off.

Step S460 indicates an end.

In Step S462, a retransmission counter which counts the frequency of retransmission is set to 0.

Next, a description will be given of processing in a case where there has been an error. In Step S464, a determination is made through the first bit of the bit map data from the V21 modulator as to whether or not there has been an error in the transmitted first frame (during retransmission, the frame number may not necessarily be 0). When there has been an error in the transmitted first frame, in Step S466, the flag timer is shifted from 250 ms to one second. When there has been no error in the transmitted first frame, the flag timer is kept intact at 250 ms, and the operation proceeds to Step S468.

In Step S468, a signal with a signal level "1" is output to the signal line 24c, and RS (transmission request) of the high-speed modem is set to 1. Upon completion of the transmission of the high-speed data, RS is set to 0.

In Step S470, a determination is made as to whether or not the signal level of CS (capable of send) of the high-speed modem is 1, i.e., whether or not the signal level of the signal line 16b is 1. When the signal level of CS of the high-speed modem becomes 1, the transmission of data becomes possible, so that the operation proceeds to Step S472.

In Step S472, a signal of a signal level "1" is output to the signal line 24d to start the transmission of the flag.

In Step S474, the flag timer is set in a timer incorporated in the control circuit.

In Step S476, the flag continues to be sent until the timiming is over. The transmission time of the flag is one second set in Step S466 in the case of error retransmission of the first frame.

In Step S478, a signal of a signal level "0" is sent to the signal line 24d to discontinue the transmission of the flag, and the HDLC formatted error frame is retransmitted.

In Step S480, signals from the receiver are analyzed, and determination is made as to whether or not there has been any error in the retransmitted frame. The operation proceeds to Step S456 if there is no error and to Step S482 if there is an error.

In Step S482, the retransmission counter is incremented by 1.

In Step S484, a determination is made as to whether or not the retransmission counter is 3 or more, i.e., whether retransmission has been carried out three times or more. If the retransmission counter is three or more, the operation proceeds to Step S486, and, if the retransmission counter is less than 3, the operation proceeds to Step S464. In Step S486, a determination is made as to whether or not the retransmission of this block is to be continued although this block has been retransmitted three times or more.

When the retransmission of this block is to be carried out, a procedure therefor is executed (Step S488), 0 is stored in the retransmission counter (Step S490), and the operation then proceeds to Step S464. When the retransmission of this block is not to be carried out, a procedure therefor is executed (Step S492), and after 0 is stored in the retransmission counter (Step S494), the operation proceeds to step S456 to start transmission of an ensuing block or page.

In the above-described embodiment, an arrangement is provided such that, if the transmitted first frame experiences even a single error, the time duration of sending a flag after training is shifted from 250 ms to one second.

However, it is advantageous to change the time duration of transmission of the flag in accordance with the condition of an error. For this reason, after the transmitted first frame has experienced an error twice in a row, the time duration of transmission of a flag after training may be shifted from 250 ms to one second. Alternatively, the time duration of the flag may be extended gradually, for instance, from 500 ms after an error has been made once, and to 1,000 ms after an error has been made twice. In addition, when it has been decided to extend the time duration of transmission of the flag after training, this time duration may be set to a length other than one second.

Furthermore, when a frame is retransmitted after an error has occurred not only in the first frame, the time duration of transmission of the flag may be extended.

As has been described above, according to the fourth embodiment, when the line condition is favorable, a flag pattern transmitted immediately before image information can be made short, and the transmission time can hence be shortened. When the receiver cannot receive the transmitted first frame, it is determined that the time required for the modem to complete its adjustment and to demodulate data properly is lacking, so that the time duration of transmission of a flag pattern sent immediately before image information in the next cycle and thereafter is extended. As a result, even when the line condition is deteriorated, it becomes possible to transmit all the frames.

Next, as a fifth embodiment of the present invention, a description will be given of a case where the transmission speed or the modulation system during retransmission is selected through analysis of the bit map pattern of a PPR signal requesting retransmission of an error frame.

Figure 15:
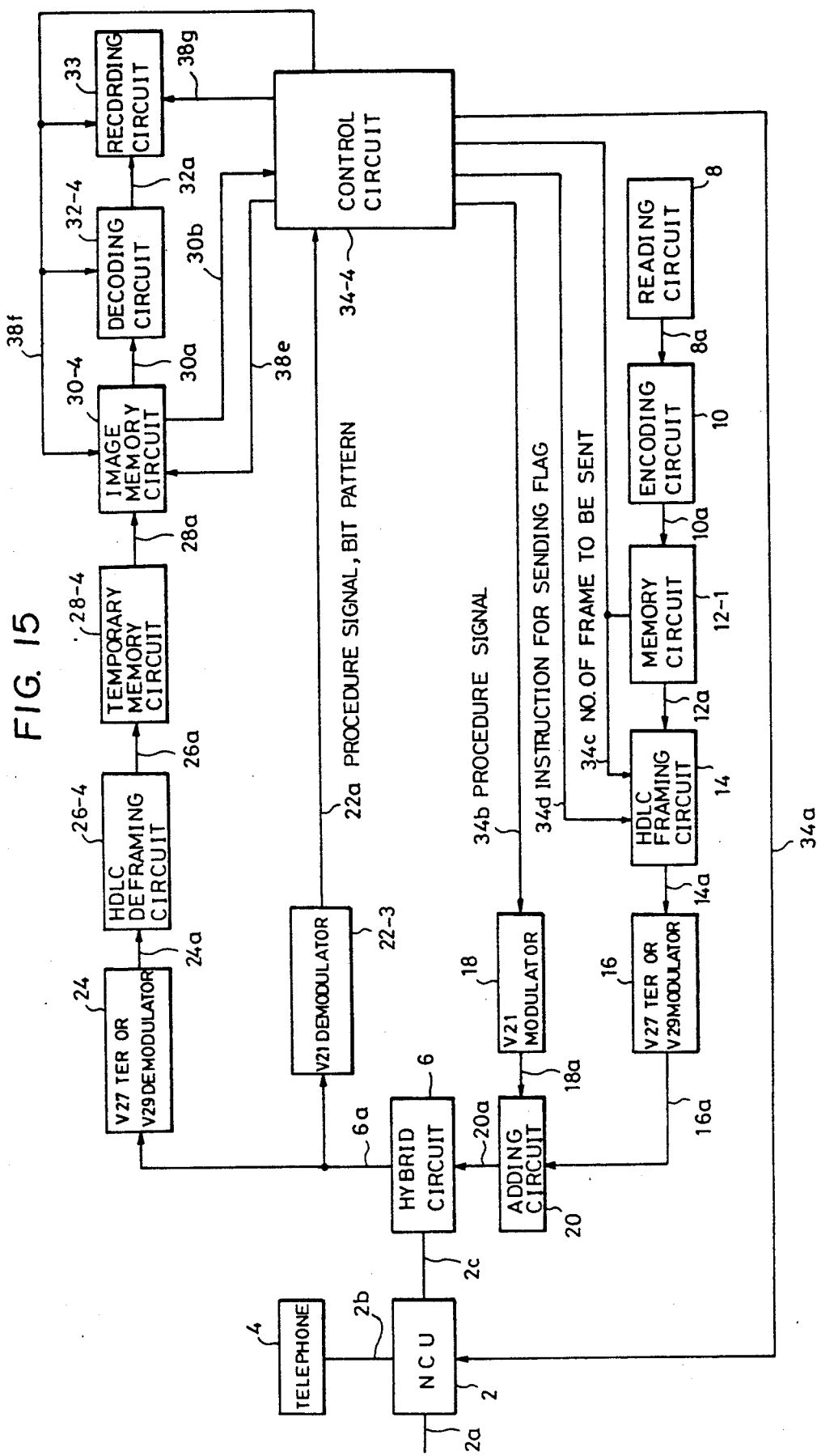
FIG. 15 is a block diagram illustrating the configuration of a facsimile apparatus in accordance with a fifth embodiment.

FIG. 15 is a block diagram illustrating the arrangement of the facsimile apparatus in accordance with the fifth embodiment. In FIG. 15, components denoted by the same reference numerals as those shown in FIGS. 3, 7, and 13 are the same as those described in connection with FIGS. 3, 7, and 13, and a description thereof will be omitted here. In addition, a control circuit 34-4 is constituted by a microcomputer and the like in the same way as the control circuit 34 of FIG. 3, and a control program stored in its ROM differs.

In FIG. 15, an HDLC deframing circuit 26-4 receives, as its input, demodulated data output to the signal line 24a, performs 0 delete of HDLC formatted data, and outputs data before HDLC formatting to the signal line 26a.

A temporary memory circuit 28-4 temporarily stores, in units of frames, encoded image information output to the signal line 26a. Data properly received in frame units is output to the signal line 28a.

An image memory circuit 30-4 stores frame data output to the signal line 28a in a corresponding image memory space. When communication is effected in ECM, a memory for storing data of at least one block is generally required. In this embodiment, however, recording is effected only when one page has been received properly, so that a memory for at least one page is necessary. In addition, when a pulse for instruction of one-page recording occurs in the signal line 38f, the modulated data is output to the signal line 30a so as to record one page.

When the pulse for instruction of one-page recording has occurred in the signal line 38f, a circuit 32-4 receives, as its input, modulated data output to the signal line 30a, and outputs decoded (MH (modified Huffman) decoded or MR (modified read) decoded) data to the signal line 32a.

A recording circuit 33 receives, as its input, a signal output to the signal line 32a when the pulse for instruction of one-page recording has occurred in the signal line 38f, and effects recording sequentially for each line. When a pulse is generated in the signal line 38g, the transmitter selects transmission of error-free information, but in this communication the recording circuit 33 effects recording to the effect that an error is present in a received image. At this time, the telephone number, the abbreviation of the user, etc. are also recorded.

A control circuit 34-4 mainly effects the control which will be described below, and is constituted by a ROM in which a control program is stored, a RAM in which data necessary for control is stored, and a CPU (microcomputer) for performing operations.

Figure 16:
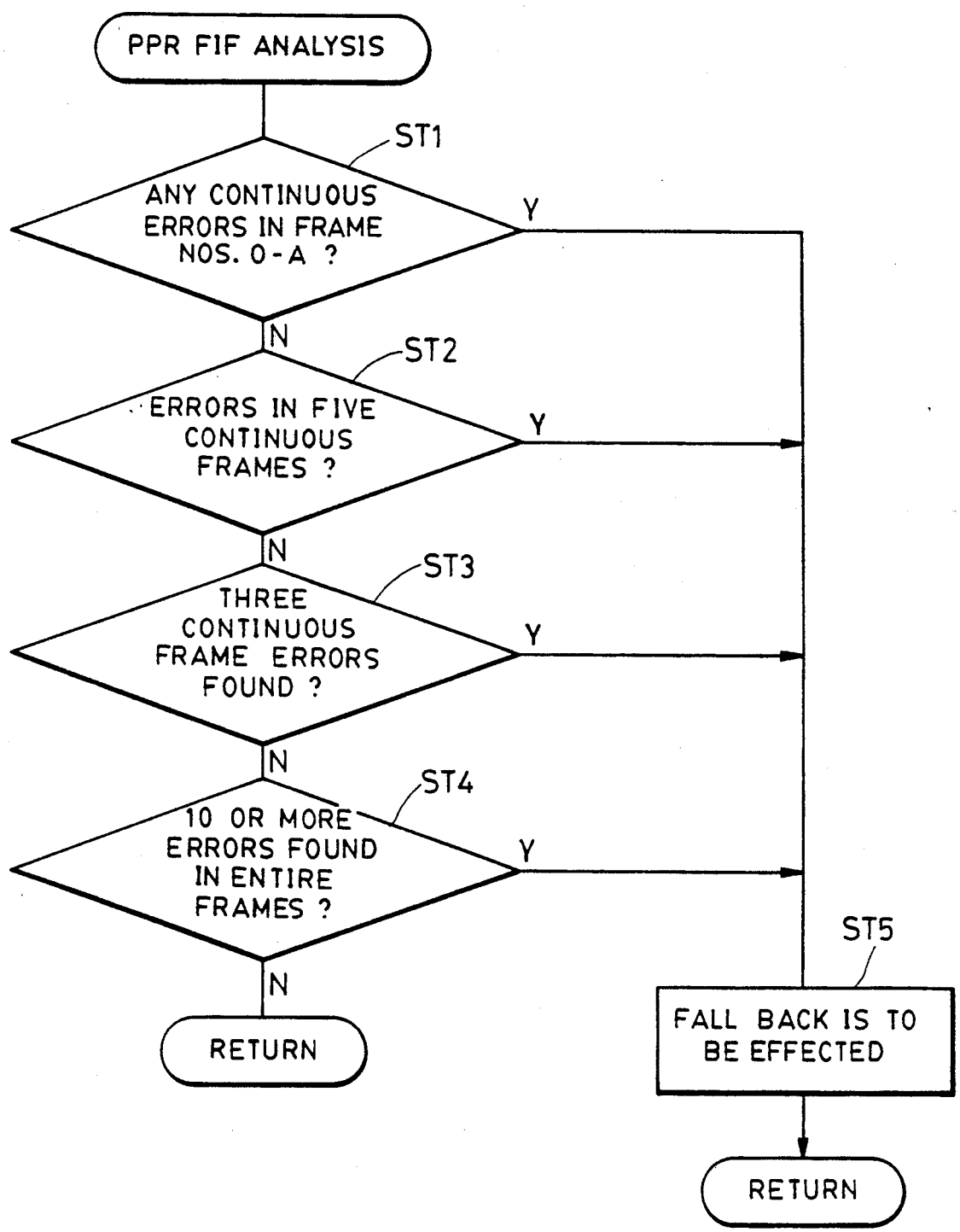
FIGS. 16(A) and 16(B) are flowcharts illustrating the operation of control in accordance with the fifth embodiment.

FIGS. 16(A) and 16(B) are flowcharts which indicate the controlling operation of the control circuit 34-4 in the fifth embodiment. FIG. 16(B) shows a subroutine for analyzing the data of FIF field of the PPR signal.

In FIG. 16(A), if, in Steps S501 and S502, DIS in a procedure signal is detected in an initial identification loop, a determination is made in Step S503 as to whether or not ECM (error correction mode) is present by using a bit which represents the presence or absence of ECM. If the ECM mode is absent, the operation starts the normal GIII mode processing. If the ECM mode is present, in Step S504 the ECM mode is set in the facsimile information field FIF of a digital command signal DCS, and DCS+TCF (training check flag) are sent. Subsequently, in Steps S506 and S507, analysis of a response signal on the reception side with respect to DCS is carried out, and if it is an FTT signal representing a failure in training transmission, a fall back is set in DCS in Step S508, and DCS+TCF are retransmitted.

In addition, if the response is DIS (a digital identification signal, indicating a function on the reception side), DCS is retransmitted again. In Step S519, if the response signal from the reception side is a signal representing capable of reception (CFR), the encoded image data is subjected to HDLC formatting, and transmission is started (Step S509).

In Step S510, the total number of frames of the image signal, the number of pages of video signals, the block number, and (MPS, EOM, EOP)-NULL are set and transmitted. In contrast, on the reception side, a check is made by using data in FCS (frame check sequence) as to whether each HDLC format has been properly received. If the data is correct, the bit corresponding to the number of the format provided in the internal memory is cleared. Upon detection of RCP (return to control for partial page) which indicates the completion of transmission of 256 frames, low-speed reception is started. At this state, if the number of received frames is equal to the total number of frames indicated by PPS (partial page signal)-Q, and if there is no error frame, a signal MCF which represents that all the frames have been received properly is returned.

FIG. 17 is a diagram illustrating an example of the procedure of retransmission in the ECM mode, and shows an example of the procedure similar to that of FIG. 1(3).

At this juncture, if there are frame errors as shown in FIG. 18, PPR (partial page request) having an FIF pattern shown in FIG. 19 is transmitted to the transmission side to informs the transmitter of the presence of errors. If the transmitter receives PPR in Step S512, a determination is made in the subroutine of Step S513 as to whether or not a fall back is to be effected. Hereafter, a description will be given with reference to the flowchart shown in FIG. 16(B).

First, in Step ST1, reference is had to 0 to A of the bit numbers of FIF of PPR, and when 1 is set in a row, a fall back is effected in Step ST5. This is a case where errors have occurred in frames, as shown in FIG. 18. A line in which such an error pattern is generated means that it takes time for the modem to prepare itself for reception, and it is effective to reduce the transmission speed so as to cope with this situation.

In the cases of Steps ST2 and ST3 asking "ERROR IN FIVE CONTINUOUS FRAMES?" and "THREE CONTINUOUS FRAME ERRORS FOUND?", substantial fluctuations in level have occurred in the line, or considerable amount of noise is present in the line. Accordingly, the transmission speed is reduced, or phase modulation such as V27ter which is stable against level fluctuations is selected from types of amplitude phase modulation. As for this example, refer to FIGS. 20 and 21.

In Step ST4, a determination is made as to whether the 10 or more errors are found in entire frames. If YES is the answer, it is determined that the overall line condition is deteriorated, so that the transmission speed is lowered.

In cases other than those described above, it is determined that the cases are those of impulsive noise which normally occurs quantitatively in a line. With respect to the impulsive noise, it is impossible to prevent it even if the transmission speed is lowered. Therefore, it is advisable to complete the transmission as quickly as possible. This is the PPR FIF analysis subroutine.

At this juncture, by returning to Step S514 in FIG. 16(B), if a fall back has been effected as a result of determination in the sub-routine, a bit indicating the speed of FIF of the CTC (continue to correct) signal which represent the continuation of error retransmission is set to send CTC. Incidentally, where there is not fall back, retransmission is effected without changing the bit indicating the speed. On the other hand, if the reception side returns a CRT signal which is a response signal for CTC, this mode is set to the modem, and retransmission is effected in Step S518.

As described above, retransmission is carried out in a loop consisting of S511, S512, S513, S514, S515, S516, and S518 until there is no error. If MCF without any error is received, the protocol is continued for each Q signal in the manner of PPS-Q. A Q signal is normally a signal which indicates an end of a page, such as MPS, EOM, EOP, etc. In this example, however, it is a signal which indicates the completion of 256 frames transmitted at a time.

As the recognition of bit patterns of PPR in addition to the one described above, a method is conceivable for controlling the degree of fall back on the basis of calculation of the error frame rate with respect to the total transmitted frames.

As described above, by changing the transmission speed or the modulation system by means of the pattern of retransmission request, it becomes possible to select a type of transmission suitable for a transmission line and to effect a reduction of the retransmision frequency and an increase in the transmission efficiency.

Next, as a sixth embodiment of the present invention, a description will be given of a case where one page is recorded and reproduced only when there is no error in the image therein.

First, a description will be given of an outline of the sixth embodiment.

On the receiver side, information on whether an NSF signal which is a non-standard identification signal is provided with the function of error-free information (a mode in which an uncorrected frame for which error correction has been completed is allowed to remain, and the next data is not transmitted) is first transmitted to the receiver side. For instance, that information is allotted to the 47th bit of FIF of an NSF signal. When the 47th bit of FIF of the NSF signal is 0, the above-described function is not provided, whereas when the 47th bit of FIF of the NSF signal is 1, the above-described function is provided.

The transmitter is provided with selecting means which is capable of selecting whether or not to effect the transmission of the error-free information. In addition, when the operator wishes to select communication of an important document, specifically, communication in which an error of a single line is not allowed, the operator selects the transmission of error-free information by means of a predetermined manual switch.

On the transmitter side, FIF of the NSF signal received is analyzed so as to determine whether or not the receiver is provided with the function of effecting transmission of error-free information. If the receiver is not provided with the above-described function, or if the transmission of error-free information has not been selected on the transmitter side, communication in the conventional ECM mode is effected. Specifically, if an error cannot be rectified after retransmission of the same block a plurality of times, the transmission of that block is discontinued, and the operation starts transmission of an ensuing block. If the CCITT's recommendation on G3 option is taken as an example, EOR is sent when a PPR signal has been received a plurality of times. Recording is effected even when one page cannot be received correctly on the receiver side, all the frames which have been received correctly being recorded.

In this case, the transmitter sends a non-standard equipment setting signal NSS in which the 47th bit of FIF of the NSS signal is set to 0, thereby informing the receiver of the fact that transmission of error-free information will not be effected.

Meanwhile, if the receiver is provided with the function of effecting transmission of error-free information, and when the transmission of error-free information has been selected on the transmitter side, transmission of error-free information is carried out. Specifically, the transmitter sends an NSS signal in which the 47th bit of FIF of the NSS signal set to 1, thereby informing the receiver of the fact that transmission of error-free information will be effected. When the error-free information transmission mode has been selected, the transmitter does not continue to effect communication with an untransmitted block remaining. If the CCITT's recommendation on G3 option is taken as an example, the transmitter does not send EOR. In addition, the receiver outputs information only when there is no longer any error in units of at least one page or more. On the other hand, when an error remains in units of at least less than one page, the receiver outputs information to that effect.

Figure 22:
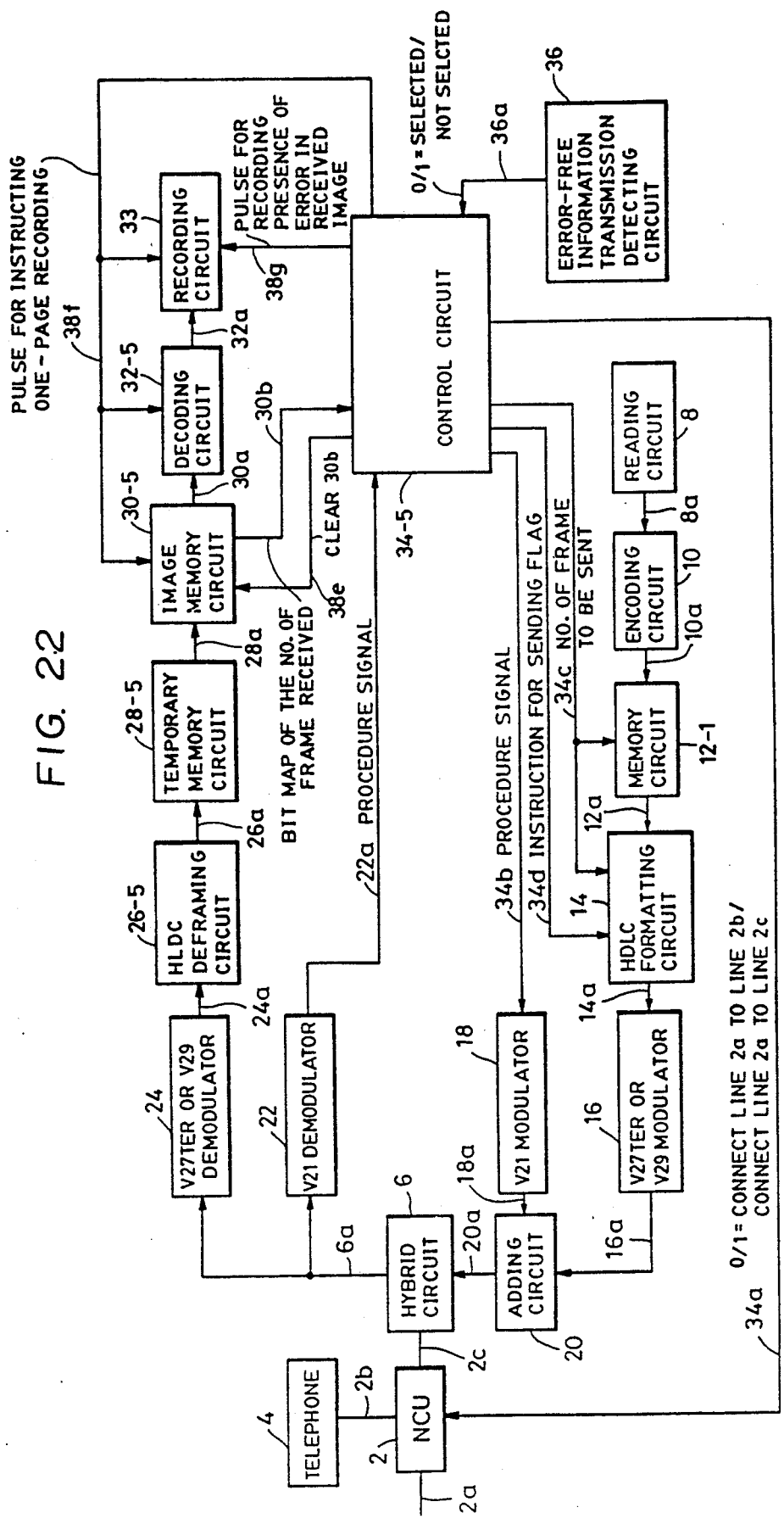
FIG. 22 is a block diagram illustrating the configuration of a facsimile apparatus in accordance with a sixth embodiment of the present invention.

FIG. 22 is a block diagram illustrating the configuration of the facsimile apparatus in accordance with the sixth embodiment. In FIG. 22, components that are denoted by the same reference numerals as those shown in FIGS. 3 and 7 are the same as those shown in FIGS. 3 and 7, and a description thereof will be omitted here. A control circuit 34-5 consists of a microcomputer and the like in the same say as the control circuit 34 shown in FIG. 3, and a control program stored in a ROM thereof differs.

In FIG. 22, an HDLC deframing circuit 26-5 receives, as its input, demodulated data output to the signal line 24a, performs 0 delete of HDLC formatted data, and outputs data before HDLC formatting to the signal line 26a.

A temporary memory circuit 28-5 temporarily stores, in units of frames, encoded image information output to the signal line 26a. Data properly received in frame units is output to the signal line 28a.

An image memory circuit 30-5 stores frame data output to the signal line 28a in a corresponding image memory space. When communication is effected in ECM, a memory for storing data of at least one block is generally required. In this embodiment, however, recording is effected only when one page has been received properly, so that a memory for at least one page is necessary. In addition, when a pulse for instruction of one-page recording occurs in the signal line 38f, the modulated data is output to the signal line 30a so as to record one page.

When the pulse for instruction of one-page recording has occurred in the signal line 38f, a circuit 32-5 receives, as its input, modulated data output to the signal line 30a, and outputs decoded (MH (modified Huffman) decoded or MR (modified read) decoded) data to the signal line 32a.

The recording circuit 33 receives, as its input, a signal output to the signal line 32a when the pulse for instruction of one-page recording has occurred in the signal line 38f, and effects recording sequentially for each line. When a pulse is generated in the signal line 38g, the transmitter selects transmission of error-free information, but in this communication the recording circuit 33 effects recording to the effect that an error is present in a received image. At this time, the telephone number, the abbreviation of the user, etc. are also recorded.

FIGS. 23(A) to 23(F) are flowcharts illustrating the operation of control by the control circuit 34-5 in accordance with the sixth embodiment.

Figure 23A:
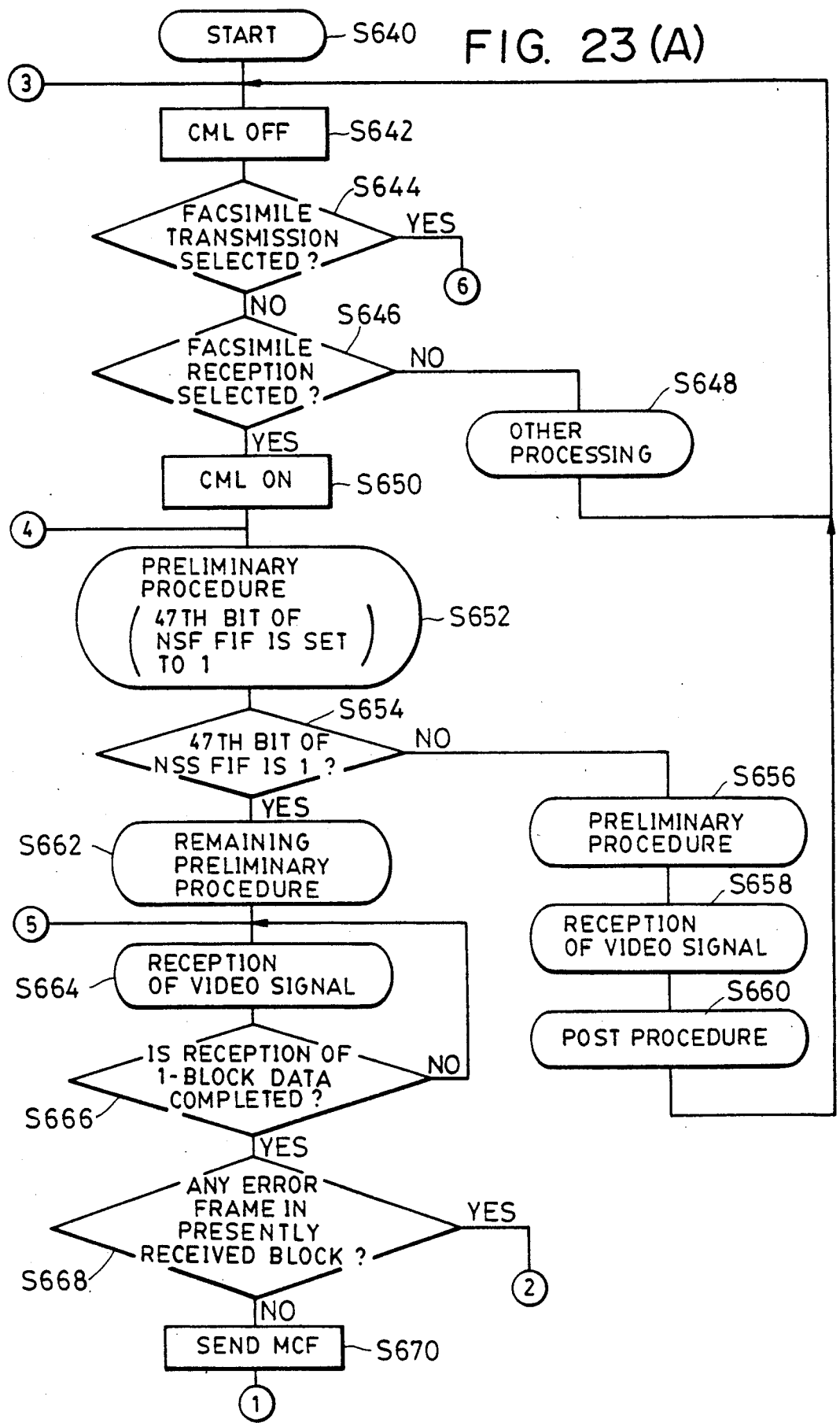
FIGS. 23(A) to 23(F) are flowcharts illustrating the operation of control in accordance with the sixth embodiment.
Figure 23B:
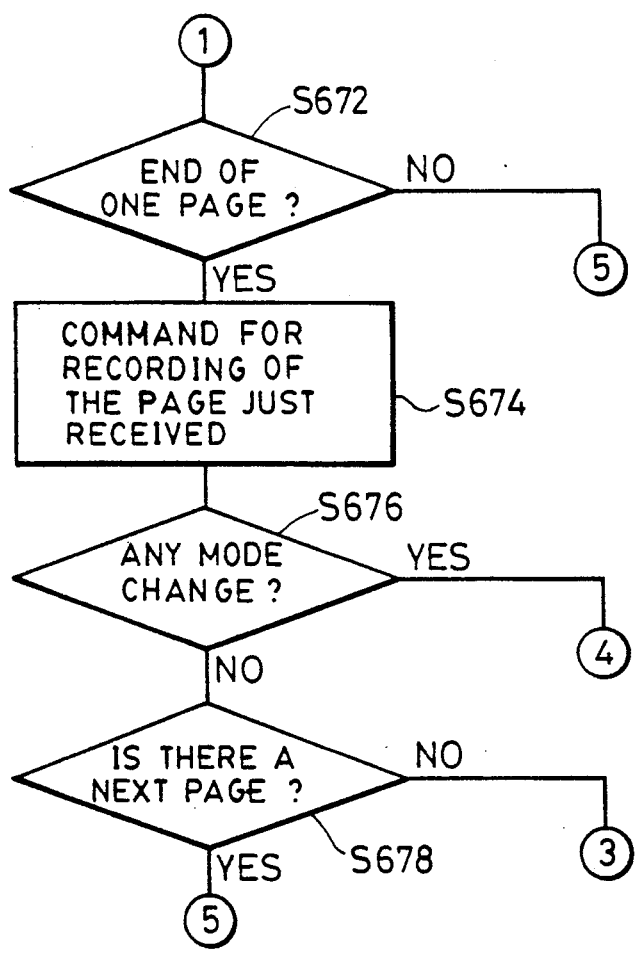
Figure 23C:
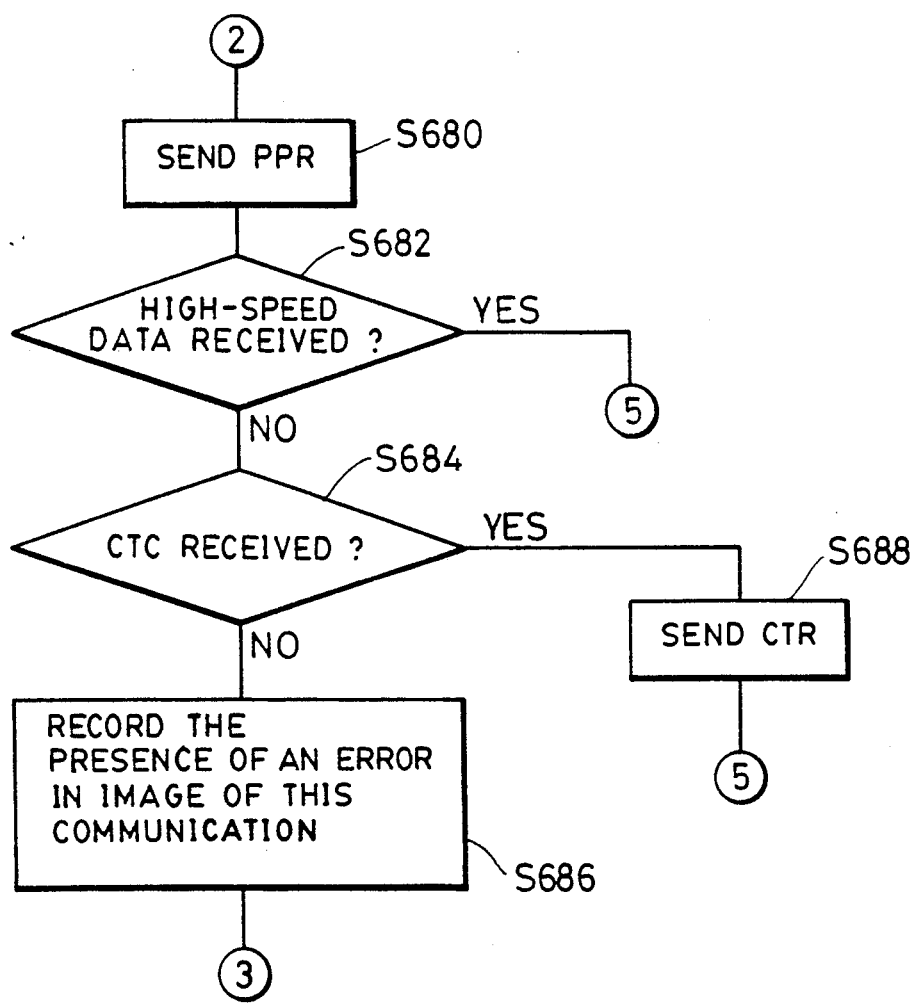
Figure 23:
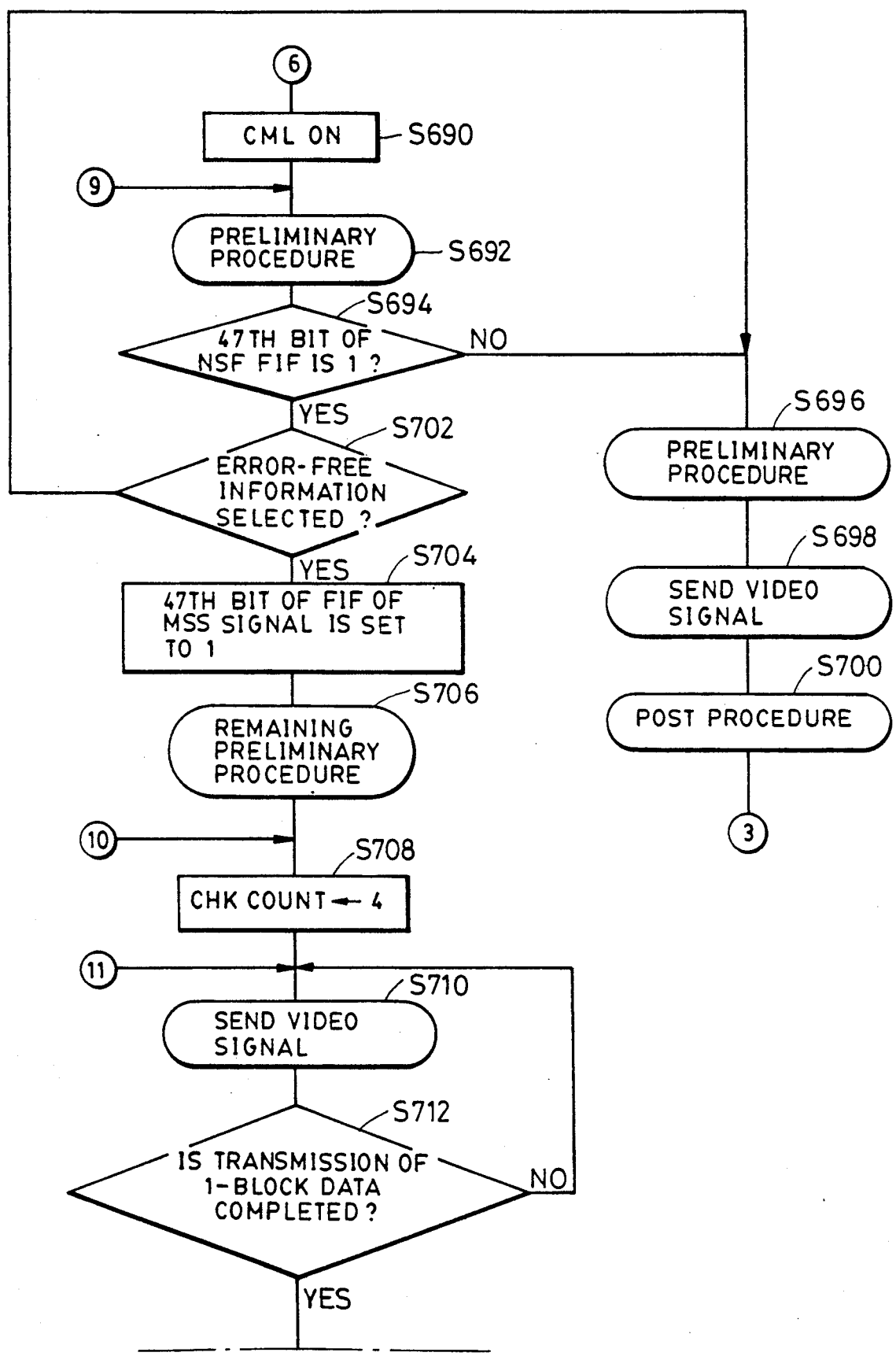
Figure 23:
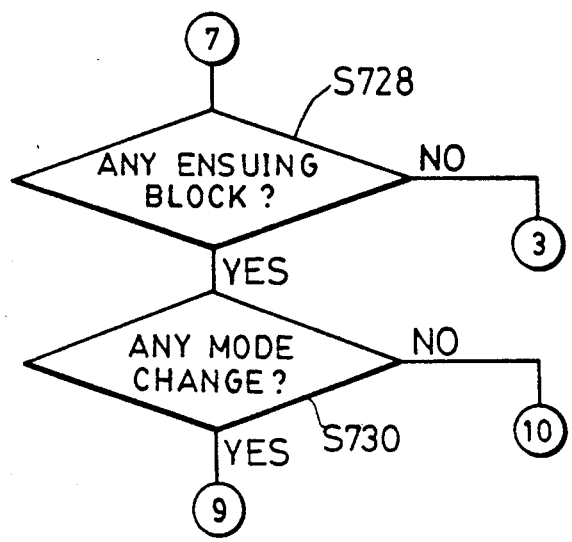
Figure 23:
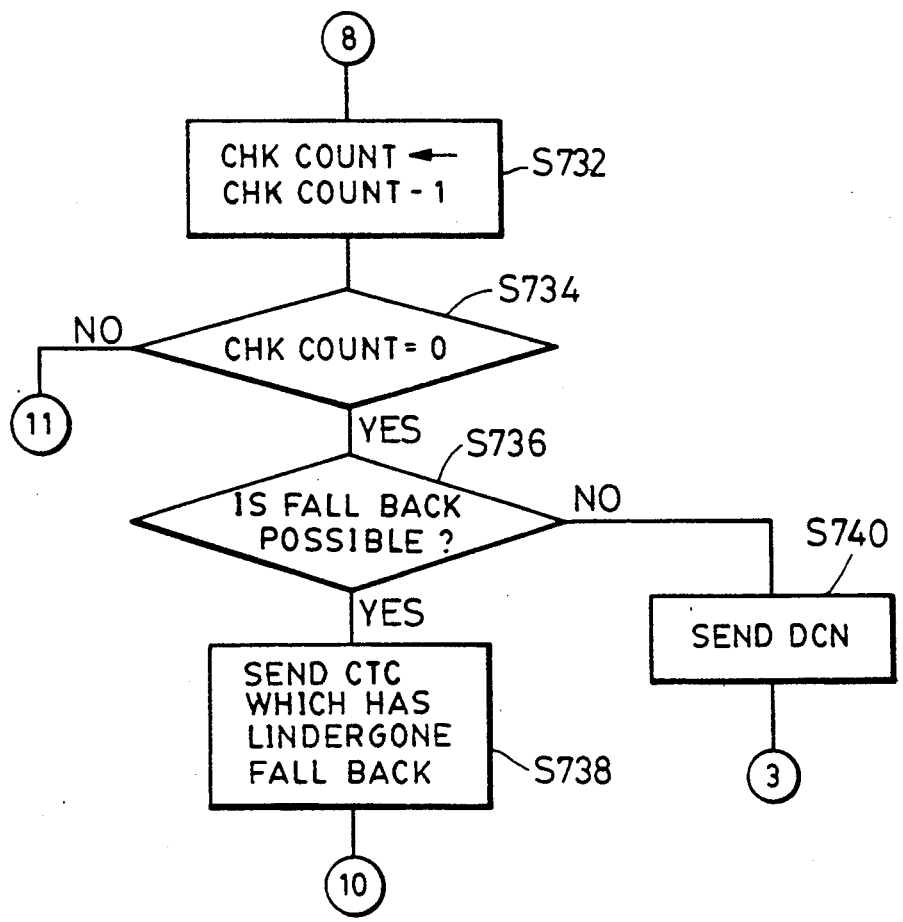

In FIG. 23(A), Step S640 indicates a start of the flow chart.

In Step S642, a signal of a signal level "0" is output, and CML is set to off, and the telephone line is connected to the telephone 4.

In Step S644, a determination is made as to whether or not facsimile transmission has been selected. If facsimile transmission has been selected, the operation proceeds to Step S690, and, if it has not been selected, the operation proceeds to Step S646.

In Step S6446, a determination is made as to whether or not facsimile transmission has been selected. If facsimile transmission has been selected, the operation proceeds to Step S650, and if it has not been selected, the operation proceeds to Step S648.

In Step S648, other processing (such as copy processing) is executed.

In Step S650, a signal of a signal level "1" is output to the signal line 34a, CML is set to on, and the telephone line is connected to the hybrid circuit 6.

In Step S652, a preliminary procedure is executed. In this step, 1 is set to the 47th bit of FIF of the NSF signal. In other words, the transmitter is informed of the fact that the function of effecting transmission of error-free information is provided.

In Step S654, a determination is made as to whether the 47th bit of FIF of the NSS signal is 1, i.e., whether or not the transmitter has selected transmission of error-free information. If the 47th bit of FIF of the NSS signal is 1, the operation proceeds to step S662, and, if it is 0, the operation proceeds to Step S656.

In Steps S656 to S660, a preliminary procedure in the case where transmission of error-free information has not been selected, reception of video signals, and execution of a post procedure are effected.

In Step S662, the execution of a remaining preliminary procedure such as setting of the transmission speed is carried out.

In Step S664, reception of video signals is effected.

In Step S666, a determination is made as to whether or not reception of one-block data has been completed. If it has been completed, the operation proceeds to Step S668, and, if not, the operation proceeds to Step S664.

In Step S668, a determination is made as to whether or not there is still an error frame in the currently received block. If there is still an error frame, the operation proceeds to Step S680, and, if there is no error frame, the operation proceeds to Step S670.

In Step S670, MCF is transmitted. In Step S672, determination is made as to whether or not an end of one page has arrived. If YES is the answer, the operation proceeds to Step S674, and, if NO is the answer, the operation proceeds to Step S664.

In Step S674, a pulse for instruction of one-page recording is generated in the signal line 28f, and the recording of the page just received is effected. This is a characteristic feature of this embodiment. In other words, recording is carried out only after one-page data has been received correctly, and misreading of a character or the like due to an error is prevented in advance.

In Step S676, a determination is made as to whether or not there has been any mode change, and if there has been a mode change, the operation proceeds to Step S652, and, if there has been no mode change, the operation proceeds to Step S678.

In Step S678, a determination is made as to whether or not there is an ensuing page. If there is an ensuing page, the operation proceeds to Step S664, and, if there is no ensuing page, the operation proceeds to Step S662.

In Step S680, transmission of PPR is effected.

In Step S682, a determination is made as to whether or not high-speed data is being received. If high-speed data is being received, the operation proceeds to Step S664, and, if high-speed data is not being received, the operation proceeds to Step S684.

In Step S684, a determination is made as to whether or not a CTC signal has been received. If a CTC signal has been received, the operation proceeds to Step S688 to send CTR. If a CTC signal has not been received, the operation proceeds to Step S686.

In Step S686, a pulse for recording that there is an error in the received image is generated in the signal line 38g, and recording is effected to the effect that there is an error in the received image in this communication. The recording of the telephone number of the other end, the abbreviation of the user, etc., is effected, as required.

The foregoing is a description of operation on the reception side. A description will now be given of operation on the transmitter side.

If it is determined in Step S644 that facsimile transmission has been selected, the operation proceeds to Step 690.

In Step S690, a signal of a signal level "1" is output to the signal line 43a, CML is set to on, and the telephone line is connected to the hybrid circuit 6.

In Step S692, a preliminary procedure is executed, and DIS and NSF of the receiver on the other end is received.

In Step S694, a determination is made as to whether or not the 47th bit of FIF of the NSF signal from the other end is 1, i.e., whether or not the receiver is provided with the function of effecting transmission of error-free information. If the 47th bit of FIF of the NSF signl is 1, the operation proceeds to Step S702, and if it is 0, the operation proceeds to Step S696.

In Steps S696 to S700, a preliminary procedure in a case where the error-free mode has not been selected, transmission of video signals, and a post procedure are executed.

In Step S702, a determination is made as to whether or not error-free information has been selected, specifically, whether or not selection by the operator of the error-free mode has been detected by the error-free mode selection detecting circuit 36 and the signal level has been set to "1". If error-free information has been selected, the operation proceeds to Step S704, and, if error-free information has not been selected, the operation proceeds to Step S696.

In Step S704, 1 is set to the 47th bit of FIF of the JNSS signal, namely, the receiver is informed of the fact that transmission of error-free information is to be effected.

In Step S706, a remaining preliminary procedure is executed.

In Step S708, transmission of fall-back CTC is effected each time PPR is received four times, and 4 is set to a counter CHKCOUNT which counts the four times.

In Step S710, transmission of video signals is executed.

In Step S712, a determination is made as to whether or not transmission of data of one block has been completed. If it has been completed, the operation proceeds to Step S714, and, if it has not been completed, the operation proceeds to step S710.

In Step S714, transmission of PPS-Q is executed.

In Step S716, a determination is made as to whether or not PPR has been received, and, in Step S118, determination is similarly made as to whether or not MCF has been received. If PPR has been received, the operation proceeds to Step S732, and, if MCF has been received, the operation proceeds to Step S728.

In Step S720, a determination is made as to whether or not flow control is necessary, and flow control is effected, as required, in Step S722.

In Step S724, a determination is made as to whether or not PPS-Q has been transmitted three times (Step S714), and it has been transmitted three times, DCN is sent (Step S726). If it has not transmitted three times, the operation proceeds to Step S714.

In Step S728, a determination is made as to whether or not there is an ensuing block to be transmitted. If there is an ensuing block, the operation proceeds to Step S730, and, if not, the operation proceeds to Step S642.

In Step S730, a determination is made as to whether or not there is any mode change. If there is a mode change, the operation proceeds to Step S692, and, if not, the operation proceeds to Step S708.

In Step S732, since reception of the PPR signal has been carried out, the counter CHKCOUNT is decremented by 1.

In Step S734, a determination is made as to whether or not the PPR signal has been received four times, i.e., whether or not CHKCOUNT is 0. If the PPR signal has been received four times, the operation proceeds to Step S736, and, if it has not been received four times, the operation proceeds to Step S710.

In Step S736, a determination is made as to whether or not a fall back is possible. If a fall back is possible, the operation proceeds to Step S738, and fallen-back CTC is transmitted. If a fall back is not possible, DCN is transmitted and communication is interrupted. Thus, in a case where an error frame does not completely disappear even after a fall back, communication is interrupted without transmitting EOR (end of retransmission), so that there is no possibility of erroneous data being reproduced on the reception side.

It should be noted that although, in this embodiment, a description has been given by taking the CCITT ECM mode as an example, it goes without saying that the present invention is applicable to other types of error retransmission modes as well. In addition, the present invention is applicable to communication of not only image data but character code data.

In the above-described embodiment, the arrangement is such that, when transmission of error-free information has been selected, the receiver does not deliver an output unless one page is received properly. In this case, the receiver must be provided with a page memory. However, in a communication apparatus having a large capacity memory, an arrangement may be provided such that, when transmission of error-free information has been selected, an output may be delivered only when one communication has been received properly.

In addition, when transmission of error-free information has been selected, the operator of the receiver may be informed of the fact that transmission of error-free information has been effected through "display or output to the effect that it is an important document" or "display or output to the effect that transmission of error-free information has been effected".

In accordance with the sixth embodiment of the present invention, if transmission of error-free information has been selected, the transmitter does not continue communication with an untransmitted block remaining, and it is possible to output information only when there is no error in units of at least one page. In addition, when an error remains in units of at least one page, it is possible for the receiver to output information to that effect.

As a result, if transmission of error-free information has been selected, since an output is not effected only when reception is carried out properly in units of at least one page, cases can be eliminated where a character or the like is misread on the receiver side due to a transmission error or frame data in which an error has not been corrected. Consequently, it is possible to provide a communication apparatus having an extremely high degree of reliability.

As a seventh embodiment of the present invention, a description will now be given of a case where, during retransmission of an error frame, the transmission side informs in advance the reception side of a timing for shifting from transmission of high-speed data to that of low-speed data.

First, on the receiver side, information as to whether or not the receiver is provided with the function of identifying transmission of EOR or CTC concerning the reception frequency of PPR is set in the NSF signal and informs the transmitter side. For instance, that information is alloted to the 48th bit of FIF of the NSF signal (signal indicating a non-standard function). When the 48th bit of FIF of the NSF signal is 0, the aforementioned function is not provided, whereas when the 48th bit of FIF of the NSF signal is 1, the aforementioned function is provided.

On the transmitter side, FIF of the received NSF signal is analyzed to determine whether or not the receiver is provided with the aforementioned function. If the receiver is not provided with the aforementioned function, communication is effected in the above-described ECM mode. In this case, an NSS signal in which the 48th bit of FIF of the NSS signal (signal for setting the non-standard function) is set to 0 is transmitted, and the receiver is informed that communication based on the aforementioned function will not be effected. Meanwhile, if the receiver is provided with the aforementioned function, communication based on the aforementioned function is effected. Specifically, a NSS signal in which the 48th bit of FIF of the NSS signal is set to 1 is transmitted, and the receiver is thus informed that communication based on the aforementioned function is to be effected. In addition, the frequency of reception of PPR for starting the transmission of EOR or CTC is set to the 49th to 56th bit of FIF of the NSS signal.

In addition, when, in transmission of the same block, i.e., the same partial page, the transmitter has received PPR the number of times indicated at the 49th to 56th bits of FIF of the NSS signal, the transmitter transmits CTC or EOR.

Meanwhile, when, in reception of the same block, i.e., the same partial page, the receiver has transmitted PPR the number of times indicated at the 49th to 56 bits of FIF of the NSS signal, the receiver starts reception of the low-speed data (300 b/s only) alone. Incidentally, it has been described that relative weight is given on reception of high-speed data when the receiver has transmitted PPR a number of times which is less than the declared frequency. The reason for adopting this arrangement is that the transmitter cannot receive PPR, and has the possibility of retransmitting PPS-Q.

FIG. 24 is a block diagram illustrating the configuration of the facsimile apparatus in accordance with the seventh embodiment. In the drawing, components denoted by the same reference numerals as those shown in FIG. 22 are the same as those referred to in FIGS. 3 and 22, and a description thereof will be omitted here. In addition, a control circuit 34-6 is constituted by a microcomputer and the like in the same way as the control circuit 34 shown in FIG. 3, and a control program stored in a ROM thereof differs.

In FIG. 24, an image memory circuit 30-6 stores the one-frame data output to the signal line 28a in a corresponding image memory space, and requires a memory space for storing data of at least one block. Data up to a frame where an error has not occurred is sequentially output to the signal line 30a.

A circuit 32-6 receives, as its input, demodulated data output to the signal line 30a, and outputs decoded (MH (demodified Huffman) decoded or MR (modified read) decoded) data to the signal line 32a.

A recording circuit 33 receives, as its input, a signal output to the signal line 32a, and sequentially effects recording for each line.

A control circuit 34-6 mainly effects the control which has been described in the beginning part of the description of this embodiment. Incidentally, the control circuit 34-6 consists of a microcomputer and peripheral equipment thereof including a read-only memory (ROM) storing a control program and a random-access memory (RAM).

FIG. 25 is a flowchart illustrating the operation of control by the control circuit 34-6.

In FIG. 25, Step S840 indicates a start.

In Step S842, a signal of a signal level "0" is output to the signal line 34a, and CML is set to on.

In Step S844, a determination is made as to whether or not facsimile transmission has been selected. If facsimile transmission has been selected, the operation proceeds to Step S892, and, if not, the operation proceeds to Step S846.

In Step S846, a determination is made as to whether or not facsimile reception has been selected. If facsimile reception has been selected, the operation proceeds to Step S850, and, if not, another processing operation (e.g. copying) is executed in Step S848.

In Step S850, a signal of a signal level "1" is first output to the signal line 34a to set CML to on.

Subsequently, in Step S852, a preliminary procedure for facsimile communication is executed. At this juncture, 1 is set to the 48th bit of FIF of the NSF signal, i.e., it is declared to the transmitter that a function for identifying a maximum number frequency of retransmission is provided.

In Step S854, a determination is made as to whether or not the 48th bit of FIF of the NSS signal is 1, i.e., whether the transmitter has selected communication based on the above-described identifying function. If the 48th bit of FIF of the NSS signal is 1, the operation proceeds to Step S862, and, if it is 0, the operation proceeds to Step S856.

In Steps S856, S858, and S860, a preliminary procedure, reception of video signals, and a post procedure in a case where the above-described identifying function has not been selected are executed.

Meanwhile, after it has been determined in Step S854 that communication based on the above-described identifying function has been selected, in Step S862, information in the 49th to 56th bits of FIF of the NSS signal, i.e., the frequency of transmission of PPR at which CTC or EOR is to be sent, is stored in the COUNTER.

In Step S864, a remaining procedure in the facsimile communication procedure is executed.

In Step S866, 0 is set to the counter CHKCOUNT which counts the frequency of transmission of PPR. Subsequently, in Step S868, reception of video signals is carried out, and reception of video signals is continued until determination is made in Step S870 that reception of one-block data has been completed.

If it is determined in Step S870 that reception of one-block data has been completed, the operation proceeds to step S872 to determine whether or not there is any error frame in the currently received block. If there is an error frame, the operation proceeds to Step S880, and, if not, the operation proceeds to Step S874. In Step S874, MCF is sent, and, in S876, a determination is made as to whether or not there is data of an ensuing block to be received. If there is ensuing block data, the operation proceeds to Step S878, and, if not, the operation proceeds to Step S866.

In Step 878, a determination is made as to whether or not there has been any mode change, and if there has been a mode change, the operation proceeds to Step S852, while, if there is no mode change, the operation proceeds to Step S866.

If it is determined in Step S872 that there is an error frame, PPR is sent in Step S880.

In Step S882, since PPR has been sent in the preceding step, CHKCOUNT is incremented by 1.

In Step S884, a determination is made as to whether or not the frequency (CHKCOUNT0 of sending PPR is leas than the frequency (COUNTER0 declared by the transmitter. If the frequency of retransmission is less than the designated frequency, the operation proceeds to Step S886 to set the mode to reception of high-speed data, i.e., reception of retransmitted data. Meanwhile, it is determined in Step S884 that the frequency of retransmission is equal to or greater than the designated frequency (usually equal), the operation proceeds to Step S888 to start receiving EOR or CTC and to set the mode to reception of low-speed data. Subsequently, if EOR or CTC is received, an intermediate procedure of the facsimile communication procedure is executed.

Meanwhile, after it is determined in Step S844 that facsimile transmission has been selected, in Step S892, a signal of a signal level "1" is output to the signal line 34a, CML is set to on, and a preliminary procedure of the facsimile transmission procedure is executed.

In Step S896, a determination is made as to whether or not the 48th bit of FIF of the NSF signal received in the preliminary procedure is 1, i.e., whether or not the receiver is provided with the aforementioned identifying function. If the 48th bit of FIF of the NSF signal is 1, the operation proceeds to Step S904, while, if it is 0, the operation proceeds to Step S898.

In Steps S898, S900, and S902, a preliminary procedure, transmission of video signals, and a post procedure in a case where the aforementioned identifying function has not been selected.

In Step S904, 1 is set to the 48th bit of FIF of the NSS signal (it is declared to the receiver that transmission in the aforementioned identifying function is to be effected). In addition, a retransmission frequency, i.e. information whereby CTC or EOR is to be transmitted after receiving PPR in the 49th to 56th bits an n-number of times, is stored. In addition, this retransmission frequency is is stored in COUNTER in Step S908. In Step S906, a remaining procedure is executed.

In Step S910, 0 is set to the counter CHKCOUNT which counts the frequency of receiving PPR, and, in Step S912, transmission of video signals is effected. Furthermore, transmission of video signals is continued until it is determine in Step S914 that transmission of one-block data has been completed.

After it has been determined in Step S914 that transmission of one-block data has been completed, the operation proceeds to Step S916 where transmission of PPS-Q is effected.

In Step S918, a determination is made as to whether or not PPR has been received, and, in Step S920, a determination is made as to whether or not MCF has been received. If PPR has been received, the operation proceeds from Step S918 to Step S934. If MCF has been received, the operation proceeds from Step S920 to Step S930.

If neither PPR nor MCF has been received, the operation proceeds from Step S930 to Step S922 where a determination is made as to whether or not flow control is necessary. If flow control is necessary, the operation proceeds to Step S924 to execute flow control, as required.

If it is determined in Step S922 that flow control is not necessary, a determination is made in Step S926 as to whether or not PPS-Q has been transmitted three times. If it has been transmitted three times, the operation proceeds to Step S928 to send DCN, and, if not, the operation proceeds to Step S916.

Meanwhile, if it is determined in Step S920 that MCF has been received and the operation proceeds to Step S930, a determination is made in Step S930 as to whether or not there is an ensuing block to be transmitted. If there is an ensuing block to be transmitted, the operation proceeds to Step S932, and, if not, the operation returns to Step S842.

If the operation proceeds from Step S930 to Step S932, a determination is made in Step S932 as to whether or not there has been a mode change. If there has been a mode change, the operation proceeds to Step S894, and, if not, the operation proceeds to Step S910.

Meanwhile, if it is determined in Step S918 that PPR has been received and the operation proceeds to Step S930, since PPR signal has been received in Step S934, CHKCOUNT is incremented by 1, and the operation proceeds to Step S936.

In Step S936, a determination is made as to whether or not the retransmission frequency (count of CHKCOUNT) of receiving PPR with respect to one block is less than the designated retransmission frequency (value of COUNTER) whereby EOR or CTC is to be transmitted upon receiving PPR an n number of times, which is the aforementioned identifying function. If the retransmission frequency is less than the designated retransmission frequency, the operation proceeds from step S936 to Step S912 to effect retransmission of high-speed data. On the other hand, if the retransmission frequency is equal to or greater than the designated retransmission frequency (normally equal), the operation proceeds to Step S938 and thereafter where transmission of CTC or EOR is effected. If the operation proceeds to Step S938, a determination is made as to whether or not the current block needs to be resent, and if it needs to be resent, the operation proceeds to Step S940 to send CTC. If the current block need not be transmitted, the operation proceeds to Step S944 to transmit EOR.

After transmission of CTC or EOR, an intermediate procedure of the facsimile communication procedure is effected in Steps S942 and S946, respectively, the the operation returns to Step S910.

In the above-described embodiment, when an error is not corrected after one block has been retransmitted a number of times, the transmitter sends a control signal (identifying signal) specifying whether retransmission of this block is to be continued or the operation shifts to an ensuing block, if any.

However, this frequency may be varied depending on the result of analysis of the line condition in the past.

In other words, the result of communication in the past in correspondence with a one-touch telephone number is analyzed, and the aforementioned frequency is determined on the basis of its result.

As described above, in accordance with this embodiment, after detecting an error frame and sending a PPR signal, the receiver is capable of identifying whether retransmitted high-speed data is to arrive or a low-speed procedure signal is to arrive. For this reason, there is a large advantage in that it is unnecessary to receive high-speed data and low-speed data simultaneously as has been the case in the past, and the amount of error in the procedure is reduced remarkably.

In addition, although, in the foregoing embodiments, a description has been given by taking a facsimile apparatus as an example, the present invention can be implemented in not only a facsimile apparatus but all types of data communication such as a telex machine insofar as it is provided with an error retransmission function.

Furthermore, the present invention is not confined to the foregoing embodiments, and various modifications are possible without departing from the spirit of the invention which is defined solely in the appended claims.

What is claimed is:

1. A data communication apparatus comprising:
   receiving means for receiving data;
   recording means for recording data received by said receiving means; and
   control means for detecting error data in data received by said receiving means and, responsive to detection of the presence of error data, for controlling recording of information indicating that the received data contains error data.

2. A data communication apparatus comprising:
   data communication means for effecting data communication;
   detecting means for determining the presence of any error in data and detecting an amount of error data; and
   display means for displaying information which indicates an amount of error data detected by said detecting means, wherein said display means displays a specific pattern corresponding to said information.

3. A data communication apparatus according to claim 2, wherein said display means displays said specific pattern by reproducing said specific pattern.

4. A data communication apparatus according to claim 2, wherein said display means reproduces data received by said data communication means and reproduces both said data received and said specific pattern.

5. A data communication apparatus according to claim 1, further comprising transmitting means connected to said control means for transmitting a signal requesting retransmission of error data.

6. A data communication apparatus according to claim 5, wherein if error data remains in said received data after retransmission of data a predetermined number of times, said control means records information indicating that the received data contains error data.

7. A data communication apparatus according to claim 1, wherein said information represents an amount of error data.

8. A data communication apparatus according to claim 1, wherein said information is a specific pattern.

9. A data communication apparatus comprising:
   transmitting means for transmitting data;
   receiving means for receiving a signal representing a request for retransmission of data; and
   control means connected to said transmitting and receiving means for determining an amount of error data among data transmitted by said transmitting means on the basis of said retransmission request signal and for causing transmission of information indicating said amount of error data.

10. A data communication apparatus according to claim 9, wherein said transmitting means transmits data by dividing said data into a plurality of blocks and retransmits data of a block indicated by said retransmission request signal received by said receiving means.

11. A data communication apparatus according to claim 10, wherein, if said retransmission request signal is received by said receiving means when retransmission is effected by said transmitting means a predetermined number of times, said control means causes transmission of said information.

12. A data communication apparatus comprising:
    receiving means for receiving data;
    means for determining an error in received data and for transmitting a signal representing a request for retransmitting a signal representing a request for retransmission of data which is determined to be in error to a data transmission side; and
    reproducing means connected to said receiving means for reproducing normal data contained in error data received by said receiving means when there is error data in said received data.

13. A data communication apparatus according to claim 12, wherein said reproducing means reproduces normal line data contained in said error data.

14. A data communication apparatus according to claim 12, wherein said reproducing means reproduces normal data contained in said error data when there is an error in said received data when retransmission of error data has been effected a predetermined number of times.

15. A data communication apparatus connectable to a modem for transmitting data through the modem which transmits data after transmitting a signal for adjusting the modem, comprising:
    receiving means for receiving a retransmission request signal; and
    control means for changing a time duration of transmission of said signal for adjusting the modem according to said retransmission request signal during retransmission.

16. A data communication apparatus according to claim 15, wherein said control means changes the time duration of transmission of said signal for adjusting the modem during retransmission when said control means receives said retransmission request signal after retransmission of said signal for adjusting the modem.

17. A data communication apparatus according to claim 16, wherein said control means extends the time duration of transmission of said signal for adjusting the modem.

18. A data communication apparatus according to claim 15, wherein said signal for adjusting the modem is a flag pattern signal.

19. A data communication apparatus comprising:
    transmission means for transmitting block data consisting of a plurality of frames;
    receiving means for receiving a retransmission request signal containing information indicating a frame to be transmitted in the transmitted block data; and control means for retransmitting frame data by said transmitting means according to said retransmission request signal, for analyzing information of said retransmission request signal and for changing a mode for transmission of data in accordance with the results of analysis.

20. A data communication apparatus according to claim 19, wherein said retransmission request signal contains bit map information indicating frames to be transmitted in said block data, said control means analyzes a selected one of a bit pattern indicating frames to be retransmitted and the total of bit indicating frames to be transmitted and, in accordance with the results, changes the mode of transmission.

21. A data communication apparatus according to claim 19, wherein said transmission means includes a modem having a plurality of modulation modes for transmission of data;
said control means changing the mode when said selected bit pattern is a predetermined pattern or said selected total of bits exceeds a predetermined number.

22. A data communication apparatus comprising:
data transmitting means for transmitting data by dividing the same into a plurality of blocks and effecting retransmission of block data in response to a retransmission request from a reception side;
control means for shifting from transmission of a current block to transmission of an ensuing block when an error in said current block is not corrected even after retransmission is effected a predetermined number of times; and
instructing means for prohibiting a shift by said control means to transmission of said ensuing block.

23. A data communication apparatus comprising:
receiving means for receiving data in units of a page;
detecting means for detecting an error in received data;
reproducing means for reproducing said received data in units of a page;
inhibiting means for inhibiting reproduction of page data when error data is contained in the data of a received page; and
means for making a request for retransmission of error data in accordance with detection by said detecting means, wherein, when an error is detected by said detecting means despite retransmission of error data by a predetermined number of times in response to said retransmission request, said inhibiting means inhibits reproduction of page data contained in said error data.

24. A data communication apparatus according to claim 23, further comprising outputting means for putputting information indicating that an error is contained in said page data.

25. A data communication apparatus which transmits data at a first transmission speed and transmits a signal for procedure of transmission at a second speed lower than said first transmission speed, comprising:
first transmitting means for transmitting data at said first transmission speed;
receiving means for receiving a retransmission request signal of data transmitted by said first transmitting means;
retransmitting means for retransmitting data by said first transmitting means according to said retransmission request signal;
counting means for counting a frequency of retransmission by said retransmitting means;
second transmitting means for transmitting a signal indicating whether to repeat retransmission or to transmit next data when a retransmission request signal is received after retransmission a predetermined number of times; and
transmitting means for transmitting a timing information for transmitting signal by said second transmitting means beforehand.

26. A data communication apparatus according to claim 25, wherein said timing information indicates the upper limit of frequency of retransmission.

* * * * *

UNITED STATES PATENT AND TRADEMARK OFFICE
CERTIFICATE OF CORRECTION

PATENT NO. : 5,031,179
DATED : July 9, 1991
INVENTOR(S) : TAKEHIRO YOSHIDA ET AL.

It is certified that error appears in the above-identified patent and that said Letters Patent is hereby corrected as shown below:

COLUMN 2

Line 46, "if" should be deleted.

COLUMN 6

Line 45, "and transmit errors." should be deleted.

COLUMN 13

Line 23, "or" should read --for--.

COLUMN 15

Line 56, "alernating" should read --alternating--.

COLUMN 18

Line 57, "has" should read --has been--.

COLUMN 20

Line 48, "Step S282," should read --Step S284,--.

COLUMN 26

Line 34, "timiming" should read --timing--.

COLUMN 31

Line 10, "say" should read --way--.
   Line 62, "Step S6446," should read --Step S646--.

UNITED STATES PATENT AND TRADEMARK OFFICE
CERTIFICATE OF CORRECTION

PATENT NO. : 5,031,179
DATED : July 9, 1991
INVENTOR(S) : TAKEHIRO YOSHIDA ET AL.

It is certified that error appears in the above-identified patent and that said Letters Patent is hereby corrected as shown below:

COLUMN 33

Line 53, "Step S118," should read --Step S718,--.
    Line 63, "it" should read --if it--.

COLUMN 37

Line 46, "selected." should read
          --selected are effected.--.

COLUMN 42

Line 13, "put-" should read --out---.

Signed and Sealed this

Sixteenth Day of February, 1993

*Attest:*

STEPHEN G. KUNIN

*Attesting Officer*     *Acting Commissioner of Patents and Trademarks*